United States Patent
Lee et al.

(10) Patent No.: US 10,766,910 B2
(45) Date of Patent: Sep. 8, 2020

(54) NITROGEN-CONTAINING COMPOUND AND COLOR CONVERSION FILM COMPRISING SAME

(71) Applicant: LG CHEM, LTD., Seoul (KR)

(72) Inventors: Milim Lee, Daejeon (KR); Seonkyoung Son, Daejeon (KR); Cheol Jun Song, Daejeon (KR); Hoyong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/337,816

(22) PCT Filed: Nov. 14, 2017

(86) PCT No.: PCT/KR2017/012895
§ 371 (c)(1),
(2) Date: Mar. 28, 2019

(87) PCT Pub. No.: WO2018/093120
PCT Pub. Date: May 24, 2018

(65) Prior Publication Data
US 2019/0225627 A1    Jul. 25, 2019

(30) Foreign Application Priority Data

Nov. 18, 2016   (KR) .................. 10-2016-0154165
Nov. 10, 2017   (KR) .................. 10-2017-0149778

(51) Int. Cl.
*C07F 5/02*    (2006.01)
*F21V 9/30*    (2018.01)
(Continued)

(52) U.S. Cl.
CPC ............ *C07F 5/022* (2013.01); *C07F 7/0812* (2013.01); *C09K 11/02* (2013.01); *C09K 11/06* (2013.01);
(Continued)

(58) Field of Classification Search
CPC .............. C07F 5/022; F21V 9/30; F21V 9/40
See application file for complete search history.

(56) References Cited

U.S. PATENT DOCUMENTS 6,337,536 B1    1/2002   Matsubara et al.
2016/0118598 A1 4/2016  Baba et al.
(Continued)

FOREIGN PATENT DOCUMENTS

CN   103865290 A  *  6/2014 ............... C07F 5/02
CN   103865290 A     6/2014
(Continued)

OTHER PUBLICATIONS

Ruifa Jin and Wenmin Xiao, Rational design of organoboron heteroarene derivatives as luminescent and charge transport materials for organic light-emitting diodes, New J. Chem., 2015, 39, 8188-8194. (Year: 2015).*
(Continued)

*Primary Examiner* — Bijan Ahvazi
(74) *Attorney, Agent, or Firm* — Rothwell, Figg, Ernst & Manbeck, P.C.

(57) ABSTRACT

The present specification relates to a compound containing nitrogen, and a color conversion film, a backlight unit, and a display device, including the same.

9 Claims, 1 Drawing Sheet

(51) Int. Cl.
  *F21V 9/40* (2018.01)
  *C07F 7/08* (2006.01)
  *C09K 11/02* (2006.01)
  *C09K 11/06* (2006.01)
  *F21V 8/00* (2006.01)

(52) U.S. Cl.
  CPC .............. *F21V 9/30* (2018.02); *F21V 9/40* (2018.02); *G02B 6/005* (2013.01); *C09K 2211/1007* (2013.01); *C09K 2211/1011* (2013.01); *C09K 2211/1014* (2013.01); *C09K 2211/1018* (2013.01); *G02B 6/0031* (2013.01); *G02B 6/0061* (2013.01)

(56) References Cited

U.S. PATENT DOCUMENTS

| | | | |
|---|---|---|---|
| 2017/0349822 | A1 | 12/2017 | Lee et al. |
| 2019/0225627 | A1 | 7/2019 | Lee et al. |

FOREIGN PATENT DOCUMENTS

| | | | |
|---|---|---|---|
| CN | 105925004 | A | 2/2016 |
| EP | 0971421 | A2 | 1/2000 |
| JP | 2011-241160 | A | 12/2011 |
| JP | 2019-532042 | A | 11/2019 |
| JP | 2019-536737 | A | 12/2019 |
| KR | 20150138163 | A | 12/2015 |
| KR | 10-1590299 | B1 | 7/2016 |
| TW | 201629073 | A | 8/2016 |

OTHER PUBLICATIONS

Jin, R, et al., "Rational Design of Organoboron Heteroarene Derivatives as Luminescent and Charge Transport Materials for Organic Light-emitting Diodes", New Journal of Chemistry, 2015, vol. 39, No. 10, pp. 8188-8194.

Cheng, C. et al., "Diversity-oriented Facile Access to Highly Fluorescent Membrane-permeable Benz[c,d]indole N-heteroarene BF2 Dyes", Organic letters, 2015, vol. 17, No. 2, pp. 278-281.

Shimizu, S. et al., "Benzo[c,d]indole-Containing Aza-Bodipy Dyes: Asymmetrization-Induced Solid-State Emission and Aggregation-Induced Emission Enhancement as New Properties of a Well-Known Chromophore", Chem. Eur. J. 2015, 21, 12996-13003.

International Search Report issued for PCT Application No. PCT/KR2017/012895 dated Feb. 19, 2018, 9 pages.

International Search Report issued for PCT Application No. PCT/KR2017/012896 dated Jan. 23, 2018, 9 pages.

\* cited by examiner

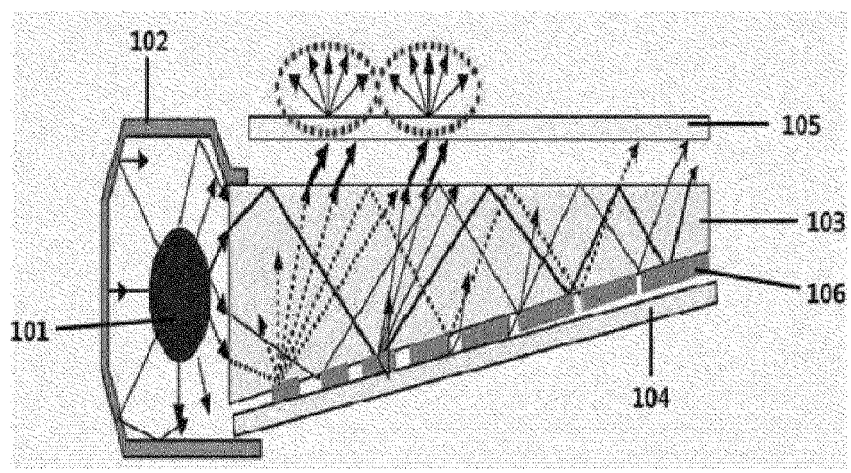

NITROGEN-CONTAINING COMPOUND AND COLOR CONVERSION FILM COMPRISING SAME

TECHNICAL FIELD

The present specification relates to a compound containing nitrogen, and a color conversion film, a backlight unit, and a display device, including the same. This application is a 35 U.S.C. § 371 National Phase Entry Application from PCT/KR2017/012895, filed on Nov. 14, 2017, and designating the United States, which claims priority to and the benefit of Korean Patent Application Nos. 10-2016-0154165 and 10-2017-0149778 filed in the Korean Intellectual Property Office on Nov. 18, 2016 and Nov. 10, 2017, respectively, the entire contents of which are incorporated herein by reference.

TECHNICAL FIELD

The present specification relates to a compound containing nitrogen, and a color conversion film, a backlight unit, and a display device, including the same. This application claims priority to and the benefit of Korean Patent Application Nos. 10-2016-0154165 and 10-2017-0149778 filed in the Korean Intellectual Property Office on Nov. 18, 2016 and Nov. 10, 2017, respectively, the entire contents of which are incorporated herein by reference.

BACKGROUND ART

The existing light emitting diodes (LEDs) are obtained by mixing a green phosphor and a red phosphor with a blue light emitting diode or mixing a yellow phosphor and a blue-green phosphor with a UV light emission light emitting diode. However, in this method, it is difficult to control colors, and accordingly, the color rendition is not good. Therefore, the color gamut deteriorates.

In order to overcome the deterioration in the color gamut and reduce the production costs, methods of implementing green and red colors have been recently attempted by using a method of producing a quantum dot in the form of a film and combining the same with a blue LED. However, cadmium-based quantum dots have safety problems, and the other quantum dots have much lower efficiencies than those of the cadmium-based quantum dots. Further, quantum dots have low stability against oxygen and water, and have a disadvantage in that the performance thereof significantly deteriorates when the quantum dots are aggregated. In addition, when quantum dots are produced, it is difficult to constantly maintain the size thereof, and thus, the production cost is high.

CITATION LIST

Patent Document

Korean Patent Application Laid-Open No. 2000-0011622

DISCLOSURE

Technical Problem

The present specification provides a compound containing nitrogen, and a color conversion film, a backlight unit, and a display device, including the same.

Technical Solution

An exemplary embodiment of the present specification provides a compound represented by the following Chemical Formula 1.

[Chemical Formula 1]

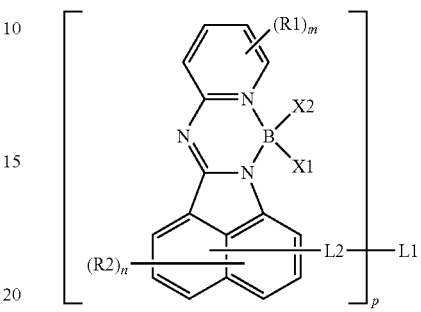

In Chemical Formula 1, p is 2, and structures in the parenthesis are the same as each other, L1 and L2 are the same as or different from each other, and are each independently a direct bond; —$SiR_{101}R_{102}$—; —$SO_2$—; —O—; —$NR_{103}$—; —C(=O)O—; a substituted or unsubstituted alkylene group; a substituted or unsubstituted cycloalkylene group; a substituted or unsubstituted arylene group; or a substituted or unsubstituted divalent heterocyclic group, R1 and R2 are the same as or different from each other, and are each independently hydrogen; deuterium; a halogen group; a cyano group; a nitro group; a carbonyl group; a carboxyl group (—COOH); an ether group; a hydroxy group; —C(=O)$NR_{104}R_{105}$; —C(=O)$OR_{106}$; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted silyl group; a substituted or unsubstituted amine group; a substituted or unsubstituted alkylamine group; a substituted or unsubstituted arylamine group; a substituted or unsubstituted aryl group; or a substituted or unsubstituted heterocyclic group, or adjacent groups may be bonded to each other to form a ring, m is an integer of 0 to 4, and when m is 2 or more, R1's are the same as or different from each other, n is an integer of 0 to 5, and when n is 2 or more, R2's are the same as or different from each other, X1 and X2 are the same as or different from each other, and are each independently a halogen group; a cyano group; an ether group; an ester group; —C(=O)$OR_{107}$; a substituted or unsubstituted alkyl group; a substituted or unsubstituted alkynyl group; a substituted or unsubstituted alkoxy group; a substituted or unsubstituted aryloxy group; a substituted or unsubstituted aryl group; or a substituted or unsubstituted heterocyclic group, or X1 and X2 are bonded to each other to form a substituted or unsubstituted ring, and $R_{101}$ to $R_{107}$ are the same as or different from each other, and are each independently hydrogen; deuterium; a substituted or unsubstituted alkyl group; a substituted or unsubstituted fluoroalkyl group; a substituted or unsubstituted aryl group; or a substituted or unsubstituted heterocyclic group.

Another exemplary embodiment of the present specification provides a color conversion film including: a resin matrix; and the compound represented by Chemical Formula 1, which is dispersed in the resin matrix.

Still another exemplary embodiment of the present specification provides a backlight unit including the color conversion film.

Yet another exemplary embodiment of the present specification provides a display device including the backlight unit.

Advantageous Effects

A compound according to an exemplary embodiment of the present specification has better processability and light fastness than a compound having an aza-BODIPY structure in the related art. Therefore, by using the compound described in the present specification as a fluorescent material of a color conversion film, it is possible to provide a color conversion film which has excellent brightness and color gamut and excellent light fastness and heat resistance.

BRIEF DESCRIPTION OF DRAWINGS

FIG. 1 is a schematic view in which a color conversion film according to an exemplary embodiment of the present specification is applied to a backlight.

EXPLANATION OF REFERENCE NUMERALS AND SYMBOLS

101: Side chain-type light source
102: Reflective plate
103: Light guide plate
104: Reflective layer
105: Color conversion film
106: Light dispersion pattern

BEST MODE FOR CARRYING OUT THE INVENTION

Hereinafter, the present specification will be described in more detail.

An exemplary embodiment of the present specification provides the compound represented by Chemical Formula 1.

When one part "includes" one constituent element in the present specification, unless otherwise specifically described, this does not mean that another constituent element is excluded, but means that another constituent element may be further included.

When one member is disposed "on" another member in the present specification, this includes not only a case where the one member is brought into contact with another member, but also a case where still another member is present between the two members.

Examples of the substituents in the present specification will be described below, but are not limited thereto.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present specification, the term "substituted or unsubstituted" means being substituted with one or two or more substituents selected from the group consisting of deuterium; a halogen group; a cyano group; a nitro group; a carbonyl group; a carboxyl group (—COOH); an ether group; an ester group; a hydroxy group; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted silyl group; a substituted or unsubstituted aryl group; and a substituted or unsubstituted heterocyclic group or being substituted with a substituent to which two or more substituents are linked among the substituents exemplified above, or having no substituent. For example, "the substituent to which two or more substituents are linked" may be a biphenyl group. That is, the biphenyl group may also be an aryl group, and may be interpreted as a substituent to which two phenyl groups are linked.

In the present specification,

means a moiety bonded to another substituent or a bonding portion.

In the present specification, a halogen group may be fluorine, chlorine, bromine, or iodine.

In the present specification, the number of carbon atoms of a carbonyl group is not particularly limited, but is preferably 1 to 30. Specifically, the carbonyl group may be —C(=O)R200 or a compound having the following structure, and R200 is hydrogen, a substituted or unsubstituted alkyl group, a substituted or unsubstituted cycloalkyl group, or a substituted or unsubstituted aryl group, but is not limited thereto.

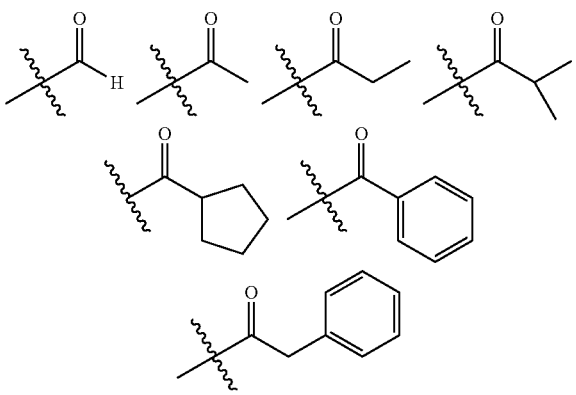

In the present specification, for an ether group, the oxygen of the ether may be substituted with a straight, branched, or cyclic alkyl group having 1 to 25 carbon atoms; or a monocyclic or polycyclic aryl group having 6 to 30 carbon atoms.

In the present specification, for an ester group, the oxygen of the ester group may be substituted with a straight, branched, or cyclic alkyl group having 1 to 25 carbon atoms; an alkenyl group; a monocyclic or polycyclic aryl group having 6 to 30 carbon atoms; or a heterocyclic group having 2 to 30 carbon atoms. Specifically, the ester group may be —C(=O)OR201, —OC(=O)R202, or a compound having the following structure, and R201 and R202 are the same as or different from each other, and are each independently hydrogen, a substituted or unsubstituted alkyl group, a substituted or unsubstituted fluoroalkyl group, a substituted or unsubstituted cycloalkyl group, or a substituted or unsubstituted aryl group, but are not limited thereto.

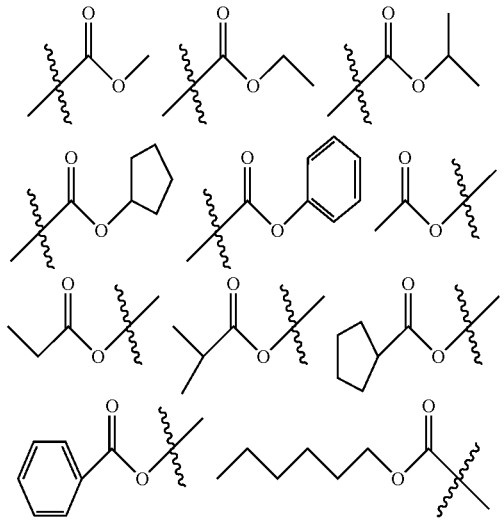

In the present specification, the alkyl group may be straight or branched, and the number of carbon atoms thereof is not particularly limited, but is preferably 1 to 30. Specific examples thereof include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, and the like, but are not limited thereto.

In the present specification, a cycloalkyl group is not particularly limited, but has preferably 3 to 30 carbon atoms, and specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like, but are not limited thereto.

In the present specification, the alkoxy group may be straight, branched, or cyclic. The number of carbon atoms of the alkoxy group is not particularly limited, but is preferably 1 to 30. Specific examples thereof include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but are not limited thereto.

In the present specification, the alkenyl group may be straight or branched, and the number of carbon atoms thereof is not particularly limited, but is preferably 2 to 30. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, an amine group may be selected from the group consisting of —NH$_2$; a monoalkylamine group; a dialkylamine group; an N-alkylarylamine group; a monoarylamine group; a diarylamine group; an N-arylheteroarylamine group; an N-alkylheteroarylamine group; a monoheteroarylamine group, and a diheteroarylamine group, and the number of carbon atoms thereof is not particularly limited, but is preferably 1 to 30. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a ditolylamine group, an N-phenyltolylamine group, a triphenylamine group, an N-phenylbiphenylamine group, an N-phenylnaphthylamine group, an N-biphenylnaphthylamine group, an N-naphthylfluorenylamine group, an N-phenylphenanthrenylamine group, an N-biphenylphenanthrenylamine group, an N-phenylfluorenylamine group, an N-phenyl terphenylamine group, an N-phenanthrenylfluorenylamine group, an N-biphenylfluorenylamine group, and the like, but are not limited thereto.

In the present specification, specific examples of a silyl group include a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group, and the like, but are not limited thereto.

In the present specification, an aryl group is not particularly limited, but has preferably 6 to 30 carbon atoms, and the aryl group may be monocyclic or polycyclic.

The number of carbon atoms thereof is preferably 6 to 30. Specific examples of the monocyclic aryl group include a phenyl group, a biphenyl group, a terphenyl group, and the like, but are not limited thereto.

In the present specification, when the aryl group is a polycyclic aryl group, the number of carbon atoms thereof is not particularly limited, but is preferably 10 to 30. Specific examples of the polycyclic aryl group include a naphthyl group, an anthracenyl group, a phenanthryl group, a triphenyl group, a pyrenyl group, a perylenyl group, a chrysenyl group, a fluorenyl group, dihydroanthracene ( 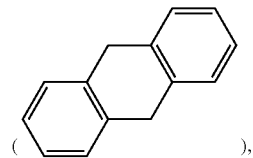 [SMILES: c1ccc2c(c1)Cc1ccccc1C2] ), and the like, but are not limited thereto.

In the present specification, the fluorenyl group may be substituted, and adjacent substituents may be bonded to each other to form a ring.

In the present specification, the fluorenyl group may be substituted, and adjacent substituents may be bonded to each other to form a ring.

When the fluorenyl group is substituted, examples of the fluorenyl group include

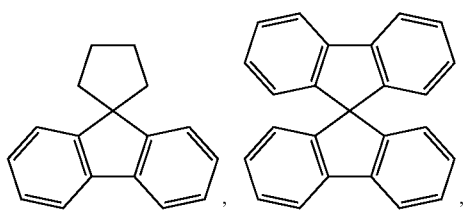

and the like. However, the fluorenyl group is not limited thereto.

In the present specification, the aryl group of the aryloxy group, the arylthioxy group, and the arylsulfoxy group is the same as the above-described examples of the aryl group. Specifically, examples of the aryloxy group include a phenoxy group, a p-tolyloxy group, an m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group, and the like, examples of the arylthioxy group include a phenylthioxy group, a 2-methylphenylthioxy group, a 4-tert-butylphenylthioxy group, and the like, and examples of the arylsulfoxy group include a benzenesulfoxy group, a p-toluenesulfoxy group, and the like, but the examples are not limited thereto.

In the present specification, a heterocyclic group includes one or more atoms other than carbon, that is, one or more heteroatoms, and specifically, the heteroatom may include one or more atoms selected from the group consisting of O, N, Se, S, and the like. The number of carbon atoms thereof is not particularly limited, but is preferably 2 to 30, and the heterocyclic group may be monocyclic or polycyclic. Examples of the heterocyclic group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), an isoxazolyl group, a thiadiazolyl group, a phenothiazinyl group, a dibenzofuranyl group, a xanthenyl group

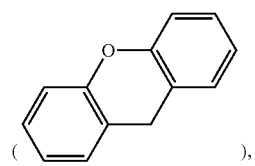 [SMILES: c1ccc2c(c1)Cc1ccccc1O2]

a phenoxathinyl group

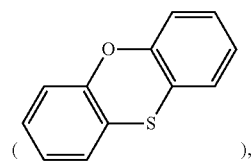 [SMILES: c1ccc2c(c1)Oc1ccccc1S2]

a dihydroacridine group

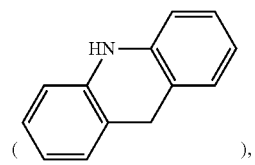

and the like, but are not limited thereto.

In the present specification, a heterocyclic group may be monocyclic or polycyclic, may be an aromatic ring, an aliphatic ring, or a fused ring of the aromatic ring and the aliphatic ring, and may be selected from the examples of the heterocyclic group.

In the present specification, the "adjacent" group may mean a substituent substituted with an atom directly linked to an atom in which the corresponding substituent is substituted, a substituent disposed sterically closest to the corresponding substituent, or another substituent substituted with an atom in which the corresponding substituent is substituted. For example, two substituents substituted at the ortho position in a benzene ring and two substituents substituted with the same carbon in an aliphatic ring may be interpreted as groups which are "adjacent" to each other.

In the present specification, the term "adjacent groups are bonded to each other to form a ring" among the substituents means that a substituent is bonded to an adjacent group to form a substituted or unsubstituted hydrocarbon ring; or a substituted or unsubstituted hetero ring.

In an exemplary embodiment of the present specification, Chemical Formula 1 is represented by any one of the following Chemical Formulae 2 to 7.

[Chemical Formula 2]

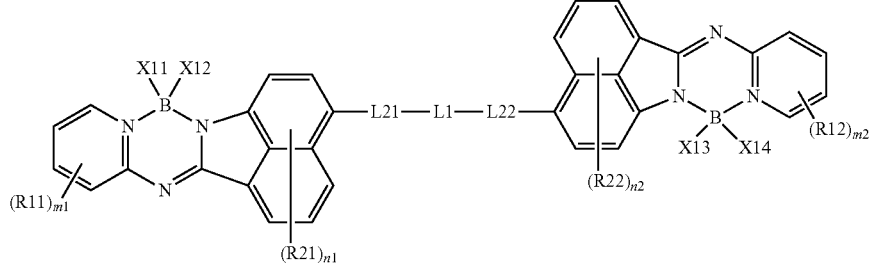

[Chemical Formula 3]

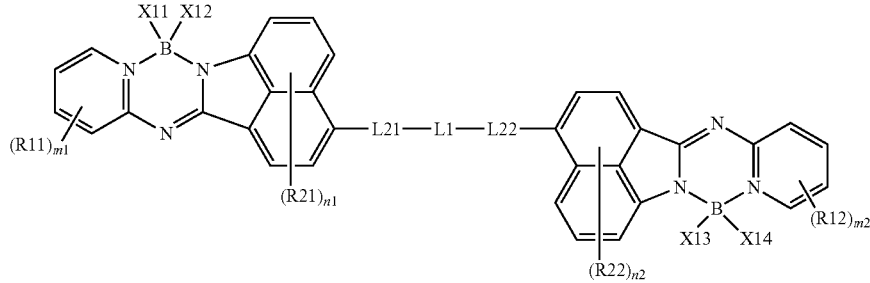

[Chemical Formula 4] [Chemical Formula 5]

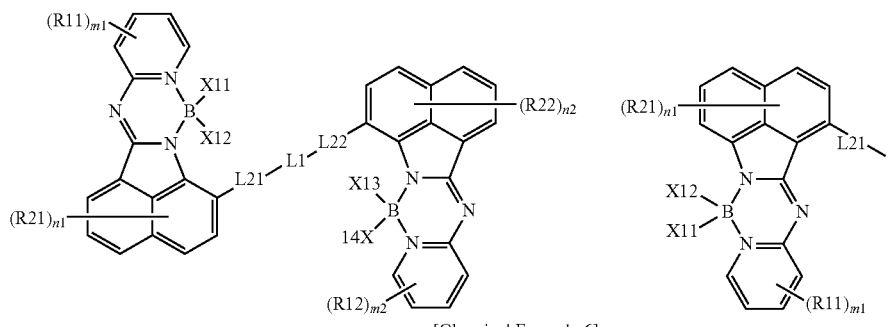

[Chemical Formula 6] [Chemical Formula 7]

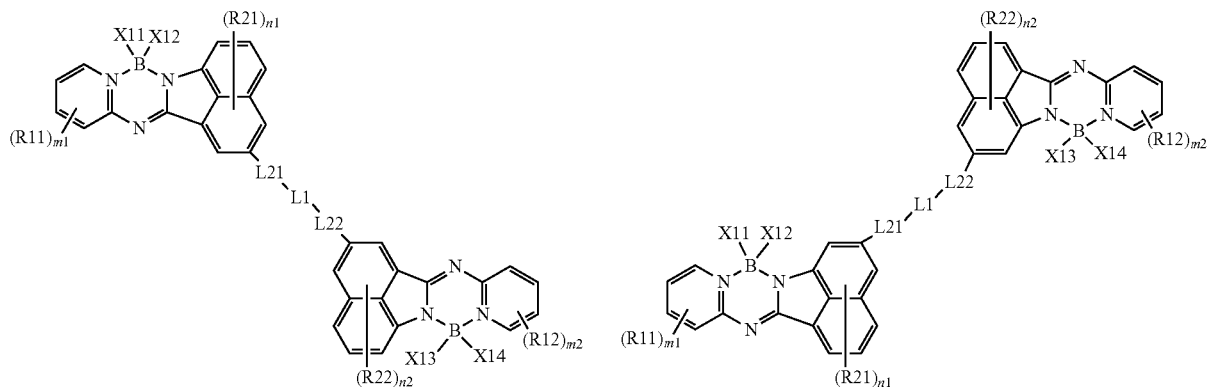

In Chemical Formulae 2 to 7,

L1 is the same as the definition in Chemical Formula 1,

L21 and L22 are the same as the definition of L2 of Chemical Formula 1, and L21 and L22 are the same as or different from each other, the definitions of R11, R12, R21, and R22 are the same as those of R1 and R2 of Chemical Formula 1, R11 and R12 are the same as each other, and R21 and R22 are the same as each other, the definitions of m1 and m2 are the same as the definition of m of Chemical Formula 1, and m1 and m2 are the same as each other, the definitions of n1 and n2 are the same as the definition of n of Chemical Formula 1, and n1 and n2 are the same as each other, and the definitions of X11 to X14 are the same as the definitions of X1 and X2 of Chemical Formula 1, X11 is the same as X14, and X12 is the same as X13.

In an exemplary embodiment of the present specification, L1 and L2 are the same as or different from each other, and are each independently a direct bond; $-SiR_{101}R_{102}-$; $-SO_2-$; $-O-$; $-NR_{103}-$; $-C(=O)O-$; a substituted or unsubstituted alkylene group having 1 to 20 carbon atoms; a substituted or unsubstituted cycloalkylene group having 3 to 20 carbon atoms; a substituted or unsubstituted arylene group having 6 to 30 carbon atoms; or a substituted or unsubstituted divalent heterocyclic group having 2 to 30 carbon atoms.

In an exemplary embodiment of the present specification, L1 and L2 are the same as or different from each other, and are each independently a direct bond; —SiR$_{101}$R$_{102}$—; —SO$_2$—; —O—; —NR$_{103}$—; —C(=O)O—; a substituted or unsubstituted methylene group; a substituted or unsubstituted ethylene group; a substituted or unsubstituted propylene group; a substituted or unsubstituted butylene group; a substituted or unsubstituted pentanylene group; a substituted or unsubstituted cyclohexanylene group; a substituted or unsubstituted phenylene group; a substituted or unsubstituted biphenylene group; a substituted or unsubstituted naphthylene group; a substituted or unsubstituted anthracenylene group; a substituted or unsubstituted phenanthrenylene group; a substituted or unsubstituted pyrenylene group; a substituted or unsubstituted fluorenylene group; a substituted or unsubstituted spirobifluorenylene group; a substituted or unsubstituted pyridinylene group; a substituted or unsubstituted pyrimidinylene group; a substituted or unsubstituted pyrrolene group; a substituted or unsubstituted furanylene group; a substituted or unsubstituted thiophenylene group; a substituted or unsubstituted oxazolylene group; a substituted or unsubstituted triazolylene group; a substituted or unsubstituted indolene group; a substituted or unsubstituted benzoxadiazolene group; a substituted or unsubstituted triazolene group; a substituted or unsubstituted benzothiadiazolene group; a substituted or unsubstituted benzoxadiazolylene group; a substituted or unsubstituted dibenzofuranylene group; a substituted or unsubstituted carbazolylene group; a substituted or unsubstituted xanthenylene group; a substituted or unsubstituted dihydroantharcenylene group; a substituted or unsubstituted dihydroacridinylene group; or a substituted or unsubstituted phenoxathinylene group.

In an exemplary embodiment of the present specification, L1 and L2 are the same as or different from each other, and are each independently a direct bond; —SiR$_{101}$R$_{102}$—; —SO$_2$—; —O—; —NR$_{103}$—; —C(=O)O—; a methylene group substituted with a phenyl group; an ethylene group; a propylene group; a butylene group; a pentanylene group; a cyclohexanylene group; a phenylene group unsubstituted or substituted with a halogen group, a carboxyl group, an alkoxy group, a cyano group or a fluoroalkyl group; a naphthylene group; an anthracenylene group unsubstituted or substituted with an aryl group; a phenanthrenylene group; a pyrenylene group; a fluorenylene group unsubstituted or substituted with an alkyl group, an aryl group or an alkylaryl group; a spirobifluorenylene group; a pyridinylene group; a pyrrolene group; a furanylene group; a thiophenylene group; an oxazolylene group; a triazolylene group; an indolene group; a benzoxadiazolene group; a triazolene group; a benzothiadiazolene group; a benzoxadiazolylene group; a dibenzofuranylene group; a carbazolylene group unsubstituted or substituted with an alkyl group or an aryl group; a xanthenylene group substituted with an alkyl group; a dihydroanthracenylene group substituted with an alkyl group; a dihydroacridinylene group substituted with an alkyl group; or a phenoxathinylene group.

In an exemplary embodiment of the present specification, L1 and L2 are the same as or different from each other, and are each independently a direct bond; —SiR$_{101}$R$_{102}$—; —SO$_2$—; —O—; —NR$_{103}$—; —C(=O)O—; a methylene group substituted with a phenyl group; an ethylene group; a propylene group; a butylene group; a pentanylene group; a cyclohexanylene group; a phenylene group unsubstituted or substituted with fluorine, a carboxyl group, a butoxy group, a cyano group or a trifluoromethyl group; a naphthylene group; an anthracenylene group unsubstituted or substituted with a phenyl group; a phenanthrenylene group; a pyrenylene group; a fluorenylene group unsubstituted or substituted with a methyl group, a hexyl group, a phenyl group or a butylphenyl group; a spirobifluorenylene group; a pyridinylene group; a pyrrolene group; a furanylene group; a thiophenylene group; an oxazolylene group; a triazolylene group; an indolene group; a benzoxadiazolene group; a triazolene group; a benzothiadiazolene group; a benzoxadiazolylene group; a dibenzofuranylene group; a carbazolylene group unsubstituted or substituted with a decyl group, an oxyl group, a phenyl group or a biphenyl group; a xanthenylene group substituted with a methyl group; a dihydroanthracenylene group substituted with a methyl group; a dihydroacridinylene group substituted with a methyl group; or a phenoxathinylene group.

In an exemplary embodiment of the present specification, R$_{101}$ to R$_{103}$ are the same as or different from each other, and are each independently hydrogen; deuterium; a substituted or unsubstituted alkyl group having 1 to 20 carbon atoms; or a substituted or unsubstituted aryl group having 6 to 30 carbon atoms.

In an exemplary embodiment of the present specification, R$_{101}$ to R$_{103}$ are the same as or different from each other, and are each independently hydrogen; deuterium; a substituted or unsubstituted alkyl group having 1 to 5 carbon atoms; or a substituted or unsubstituted aryl group having 6 to 20 carbon atoms.

In an exemplary embodiment of the present specification, R$_{101}$ to R$_{103}$ are the same as or different from each other, and are each independently hydrogen; deuterium; a substituted or unsubstituted methyl group; or a substituted or unsubstituted phenyl group.

In an exemplary embodiment of the present specification, R$_{101}$ to R$_{103}$ are the same as or different from each other, and are each independently hydrogen; deuterium; a methyl group; or a phenyl group.

In an exemplary embodiment of the present specification, X1 and X2 are the same as or different from each other, and are each independently a halogen group; a cyano group; an ether group; an ester group; a substituted or unsubstituted alkyl group; a substituted or unsubstituted alkynyl group; a substituted or unsubstituted alkoxy group; a substituted or unsubstituted aryloxy group; a substituted or unsubstituted aryl group; or a substituted or unsubstituted heterocyclic group, or X1 and X2 are bonded to each other to form a substituted or unsubstituted ring.

In an exemplary embodiment of the present specification, X1 and X2 are the same as or different from each other, and are each independently a halogen group; a cyano group; an ether group; an ester group; a substituted or unsubstituted alkyl group having 1 to 20 carbon atoms; a substituted or unsubstituted alkynyl group having 2 to 20 carbon atoms; a substituted or unsubstituted alkoxy group having 1 to 20 carbon atoms; a substituted or unsubstituted aryloxy group having 6 to 30 carbon atoms; a substituted or unsubstituted aryl group having 6 to 30 carbon atoms; or a substituted or unsubstituted heterocyclic group having 2 to 30 carbon atoms, or X1 and X2 are bonded to each other to form a substituted or unsubstituted ring having 3 to 30 carbon atoms.

In an exemplary embodiment of the present specification, X1 and X2 are the same as or different from each other, and are each independently a halogen group; a cyano group; a substituted or unsubstituted aryloxy group; a substituted or unsubstituted alkoxy group; a substituted or unsubstituted aryl group; a substituted or unsubstituted alkynyl group; —OC(=O)R$_{107}$ or —C(=O)OR$_{108}$, and R$_{107}$ and R$_{108}$ are the same as or different from each other, and are each independently hydrogen; deuterium; a substituted or unsubstituted alkyl group; a substituted or unsubstituted fluoroalkyl group; a substituted or unsubstituted aryl group; or a substituted or unsubstituted heterocyclic group.

In an exemplary embodiment of the present specification, X1 and X2 are the same as or different from each other, and are each independently a halogen group; a cyano group; a substituted or unsubstituted aryloxy group having 6 to 30 carbon atoms; a substituted or unsubstituted alkoxy group having 1 to 20 carbon atoms; a substituted or unsubstituted aryl group having 6 to 30 carbon atoms; a substituted or unsubstituted alkynyl group having 2 to 20 carbon atoms; —OC(=O)R$_{107}$ or —C(=O)OR$_{108}$, and R$_{107}$ and R$_{108}$ are hydrogen; deuterium; a substituted or unsubstituted alkyl group having 1 to 20 carbon atoms; or a substituted or unsubstituted fluoroalkyl group having 1 to 20 carbon atoms.

In an exemplary embodiment of the present specification, X1 and X2 are the same as or different from each other, and are each independently a halogen group; a cyano group; a substituted or unsubstituted aryloxy group; a substituted or unsubstituted alkoxy group; a substituted or unsubstituted aryl group; a substituted or unsubstituted alkynyl group; —OC(=O) R$_{107}$ or —C(=O) OR$_{108}$, and R$_{107}$ and R$_{108}$ are hydrogen; deuterium; an alkyl group; or a fluoroalkyl group.

In an exemplary embodiment of the present specification, X1 and X2 are the same as or different from each other, and are each independently fluorine; chlorine; a cyano group; a substituted or unsubstituted phenoxy group; a substituted or unsubstituted methoxy group; a substituted or unsubstituted phenyl group; a substituted or unsubstituted ethynyl group; —OC(=O) R$_{107}$ or —C(=O) OR$_{108}$, and R$_{107}$ and R$_{108}$ are hydrogen; deuterium; an alkyl group; or a fluoroalkyl group.

In an exemplary embodiment of the present specification, X1 and X2 are the same as or different from each other, and are each independently fluorine; chlorine; a cyano group; a phenoxy group unsubstituted or substituted with a nitro group; a methoxy group; a phenyl group; an ethynyl group unsubstituted or substituted with a silyl group; or —OC(=O)R$_{107}$, and R$_{107}$ is a trifluoromethyl group.

In an exemplary embodiment of the present specification, X1 and X2 are the same as or different from each other, and are each independently fluorine; chlorine; a cyano group; a phenoxy group unsubstituted or substituted with a nitro group; a methoxy group; a phenyl group; an ethynyl group unsubstituted or substituted with a trimethylsilyl group; or —OC(=O}R$_{107}$, and R$_{107}$ is a trifluoromethyl group.

In an exemplary embodiment of the present specification, X1 and X2 are the same as or different from each other, and are each independently fluorine; chlorine; a cyano group; a phenoxy group substituted with a nitro group; a methoxy group; a phenyl group; an ethynyl group substituted with a trimethylsilyl group; or —OC(=O)R$_{107}$, and R$_{107}$ is a trifluoromethyl group.

In an exemplary embodiment of the present specification, n is 0 or 1.

In an exemplary embodiment of the present specification, n is 0.

In an exemplary embodiment of the present specification, m is 0, 1, or 2.

In an exemplary embodiment of the present specification, m is 0, 1, or 2.

In an exemplary embodiment of the present specification, R1 is hydrogen; deuterium; a halogen group; a cyano group; a nitro group; a carbonyl group; a carboxyl group (—COOH); an ether group; a hydroxy group; —C(=O)NR$_{104}$R$_{105}$; —C(=O)OR$_{106}$; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted silyl group; a substituted or unsubstituted amine group; a substituted or unsubstituted alkylamine group; a substituted or unsubstituted arylamine group; a substituted or unsubstituted aryl group; or a substituted or unsubstituted heterocyclic group, or adjacent groups may be bonded to each other to form a ring.

In an exemplary embodiment of the present specification, R1 is hydrogen; deuterium; fluorine; a carboxyl group; a hydroxy group; a cyano group; —C(=O)NR$_{104}$R$_{105}$; —C(=O)OR$_{106}$; a substituted or unsubstituted aryloxy group; a substituted or unsubstituted amine group; a substituted or unsubstituted arylamine group; a substituted or unsubstituted aryl group; a substituted or unsubstituted alkyl group; a substituted or unsubstituted silyl group; a substituted or unsubstituted alkoxy group; or a substituted or unsubstituted heterocyclic group.

In an exemplary embodiment of the present specification, R1 is hydrogen; deuterium; fluorine; a carboxyl group; a hydroxy group; a cyano group; —C(=O)NR$_{104}$R$_{105}$; —C(=O)OR$_{106}$; a substituted or unsubstituted phenoxy group; a substituted or unsubstituted butylamine group; a substituted or unsubstituted diphenylamine group; a substituted or unsubstituted phenyl group; a substituted or unsubstituted naphthyl group; a substituted or unsubstituted anthracenyl group; a substituted or unsubstituted pyrenyl group; a substituted or unsubstituted bipyridine group; a substituted or unsubstituted carbazole group; a substituted or unsubstituted trifluoromethyl group; a substituted or unsubstituted methyl group; a substituted or unsubstituted silyl group; a substituted or unsubstituted fluorenyl group; a substituted or unsubstituted spirobifluorenyl group; a substituted or unsubstituted ethoxy group; a substituted or unsubstituted indole group; a substituted or unsubstituted triazaindene group; a substituted or unsubstituted triazole group; a substituted or unsubstituted dihydroacridine group; a substituted or unsubstituted xanthene group; or a substituted or unsubstituted dihydroanthracene group.

In an exemplary embodiment of the present specification, R1 is hydrogen; deuterium; fluorine; a carboxyl group; a hydroxy group; a cyano group; —C(=O)NR$_{104}$R$_{105}$; —C(=O)OR$_{106}$; a phenoxy group; a butylamine group; a diphenylamine group; a phenyl group unsubstituted or substituted with a halogen group, a carboxyl group, an arylalkyl group, an alkyl group, an amine group, a fluoroalkyl group or a heterocyclic group; a naphthyl group; an anthracenyl group; a pyrenyl group; a bipyridine group; a carbazole group unsubstituted or substituted with an alkyl group; a trifluoromethyl group; a methyl group unsubstituted or substituted with an aryl group; a silyl group unsubstituted or substituted with an alkyl group or an aryl group; a fluorenyl group unsubstituted or substituted with an alkyl group or an aryl group; a spirobifluorenyl group; an ethoxy group unsubstituted or substituted with a heterocyclic group; an indole group unsubstituted or substituted with a carboxyl group; a triazaindene group; a triazole group substituted with an aryl group; a dihydroacridine group unsubstituted or substituted with an alkyl group; a xanthene group unsubstituted or substituted with an alkyl group; or a dihydroanthracene group unsubstituted or substituted with an alkyl group.

In an exemplary embodiment of the present specification, R1 is hydrogen; deuterium; fluorine; a carboxyl group; a hydroxy group; a cyano group; —C(=O)NR$_{104}$R$_{105}$; —C(=O)OR$_{106}$; a phenoxy group; a butylamine group; a diphenylamine group; a phenyl group unsubstituted or substituted with fluorine, a phenethyl group, a carboxyl group, a carbazole group, a butyl group, a diphenylamine group, or a trifluoromethyl group; a naphthyl group; an anthracenyl group; a pyrenyl group; a bipyridine group; a carbazole group unsubstituted or substituted with a butyl group; a trifluoromethyl group; a tetraphenylmethyl group; a tetraphenylsilyl group; a triphenylsilyl group; a dimethylfluorenyl group; a spirobifluorenyl group; an ethoxy group substituted with a carbazole group; an indole group unsubstituted or substituted with a carboxyl group; a triazaindene group; a triazole group substituted with a phenyl group; a dimethyldihydroacridine group; a dimethylxanthene group; or a tetramethyldihydroanthracene group.

In an exemplary embodiment of the present specification, R$_{104}$ and R$_{106}$ are the same as or different from each other, and are each independently hydrogen or a substituted or unsubstituted alkyl group.

In an exemplary embodiment of the present specification, R$_{104}$ to R$_{106}$ are the same as or different from each other, and are each independently hydrogen or a substituted or unsubstituted alkyl group having 1 to 20 carbon atoms.

In an exemplary embodiment of the present specification, R$_{104}$ to R$_{106}$ are the same as or different from each other, and are each independently hydrogen, a substituted or unsubstituted methyl group, a substituted or unsubstituted ethyl group, a substituted or unsubstituted propyl group, or a substituted or unsubstituted butyl group.

In an exemplary embodiment of the present specification, R$_{104}$ to R$_{106}$ are the same as or different from each other, and are each independently hydrogen, a methyl group, an ethyl group, a propyl group, or a butyl group.

In an exemplary embodiment of the present specification, R$_{104}$ to R$_{106}$ are the same as or different from each other, and are each independently hydrogen; a propyl group; or a butyl group.

In an exemplary embodiment of the present specification, Chemical Formula 1 is selected from the following structural formulae.

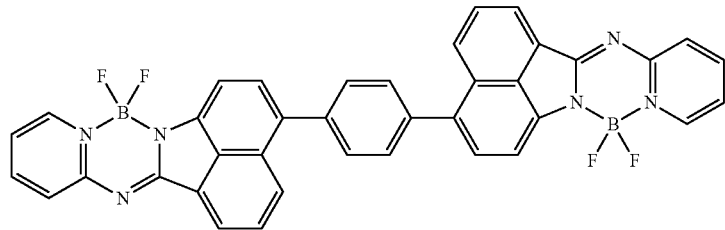

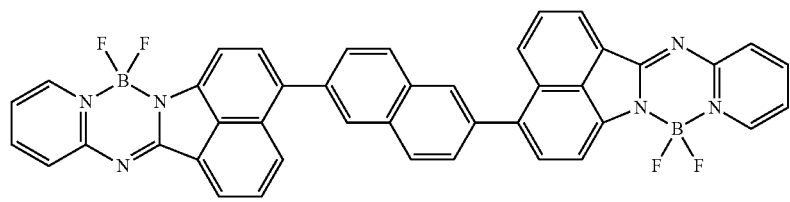

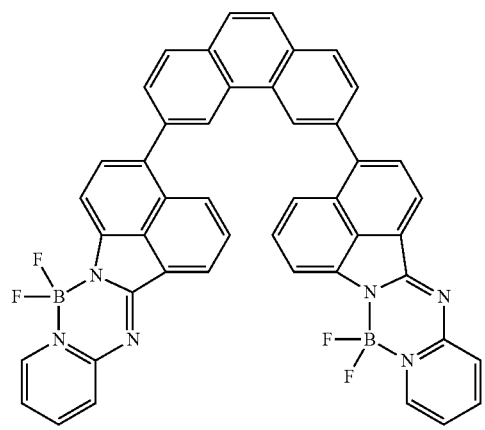

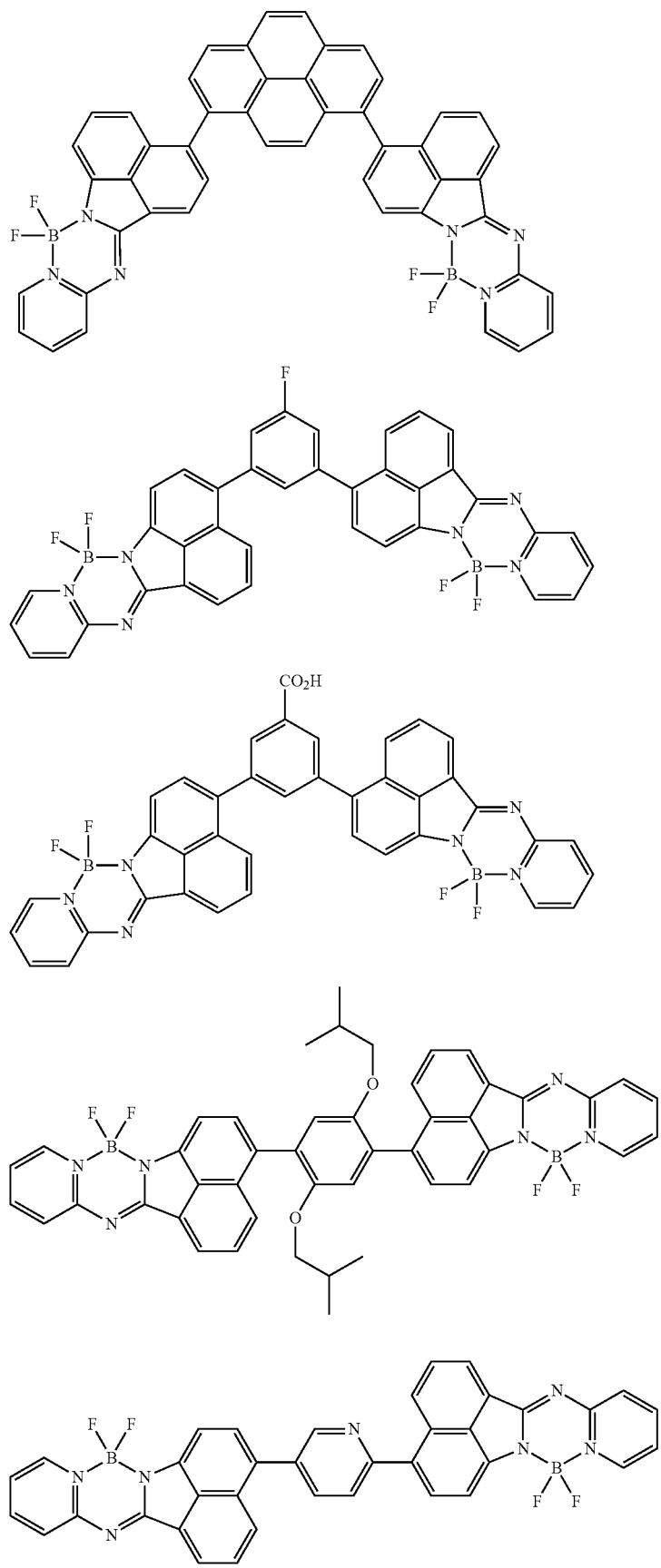

-continued
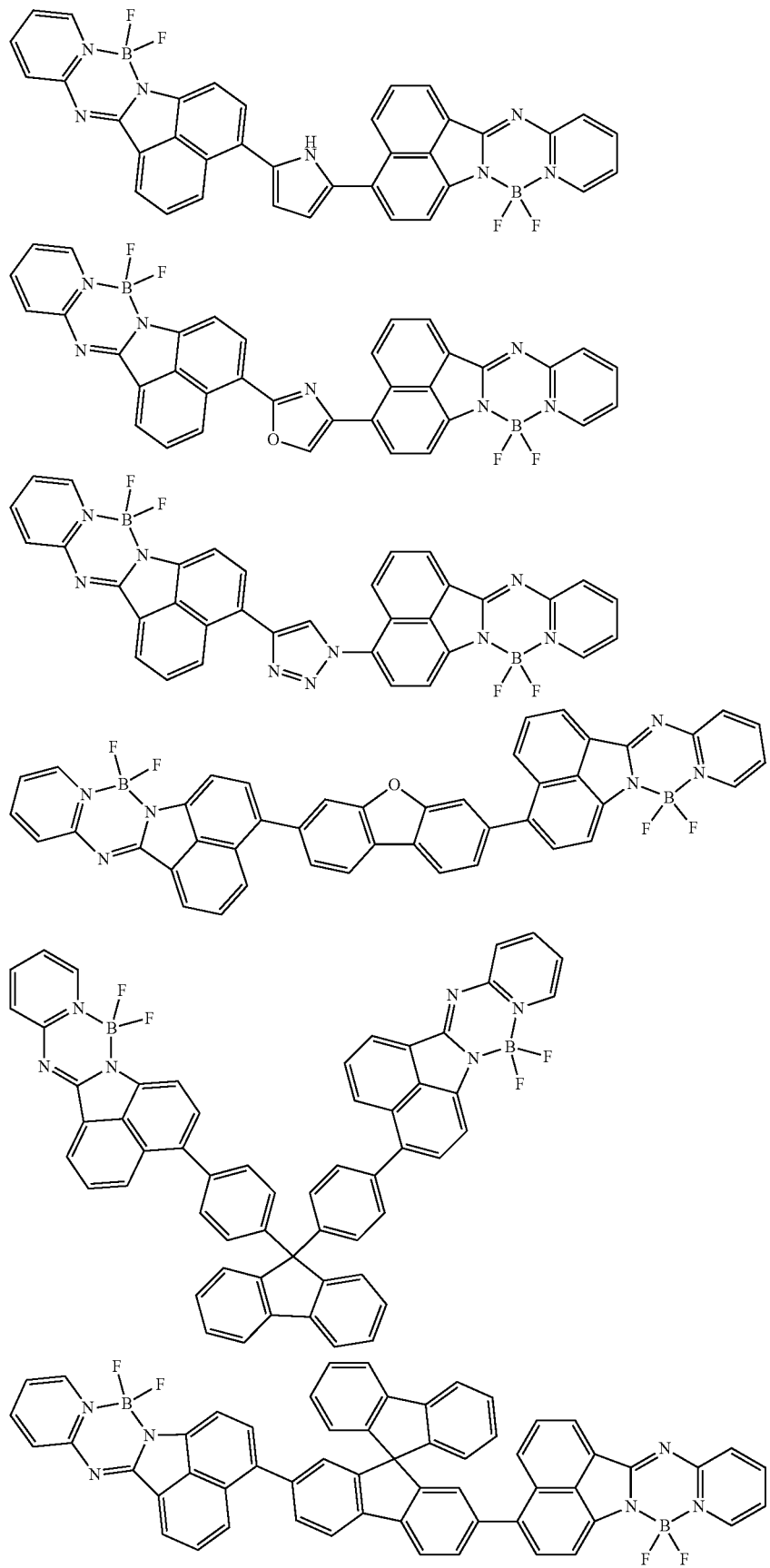

-continued
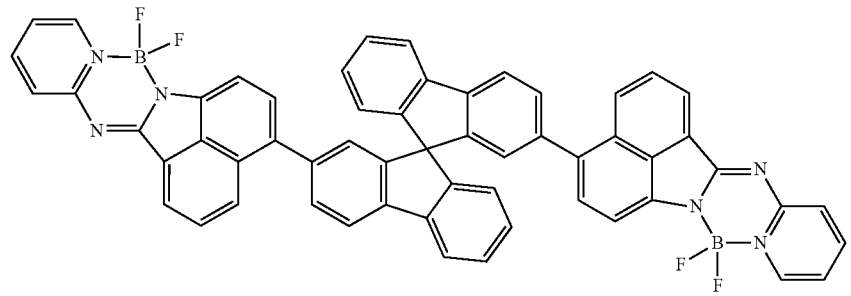
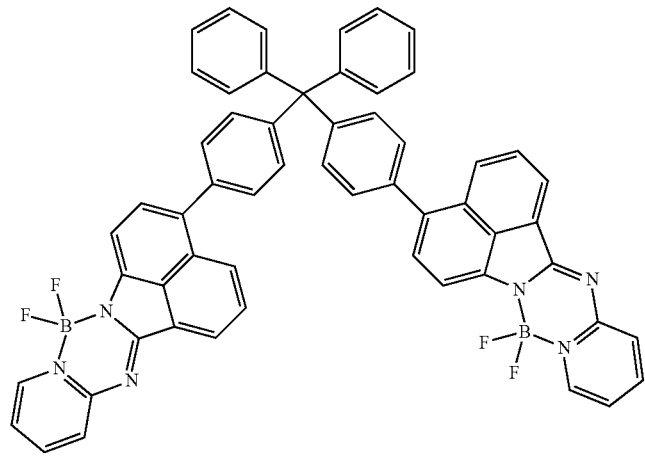
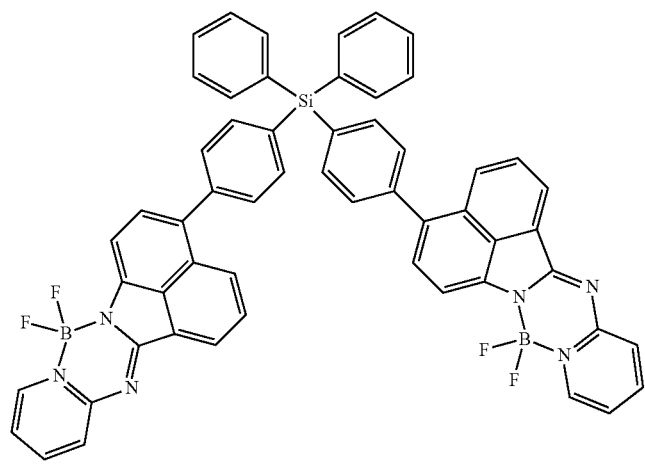
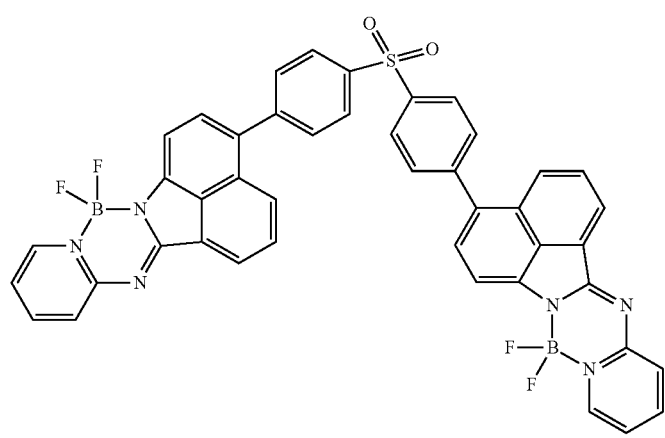

-continued
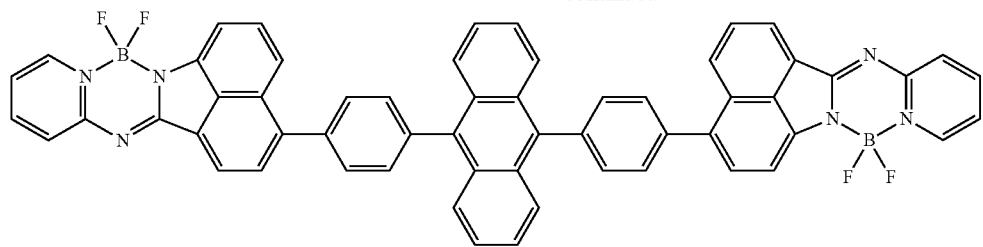
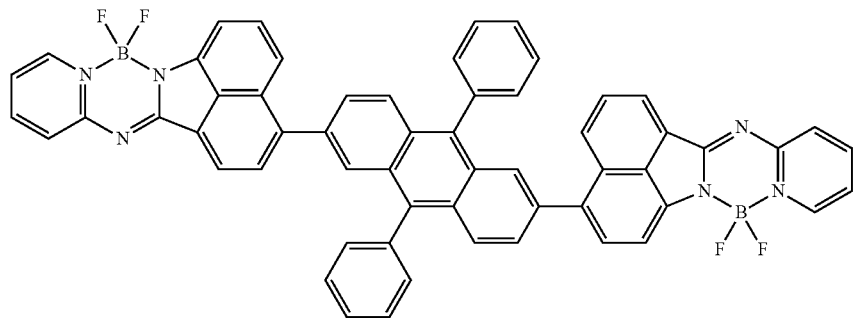
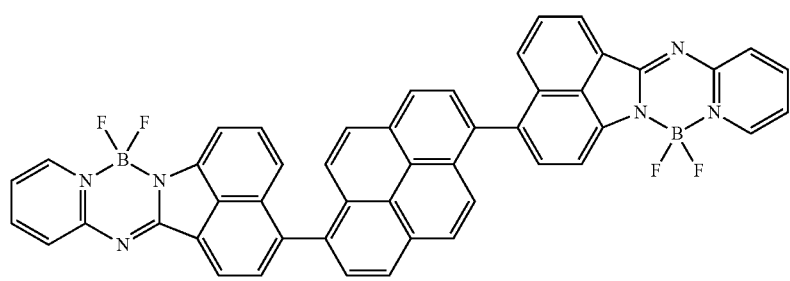
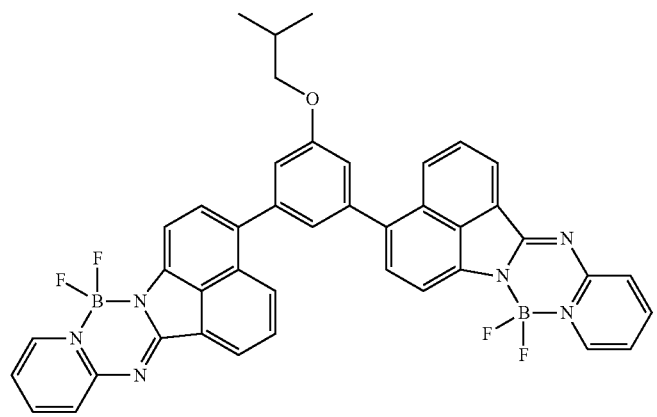
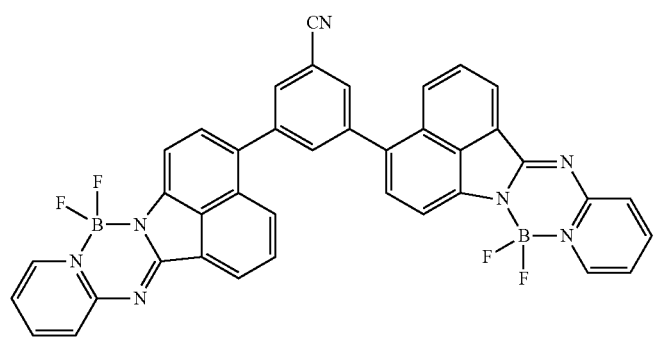

-continued
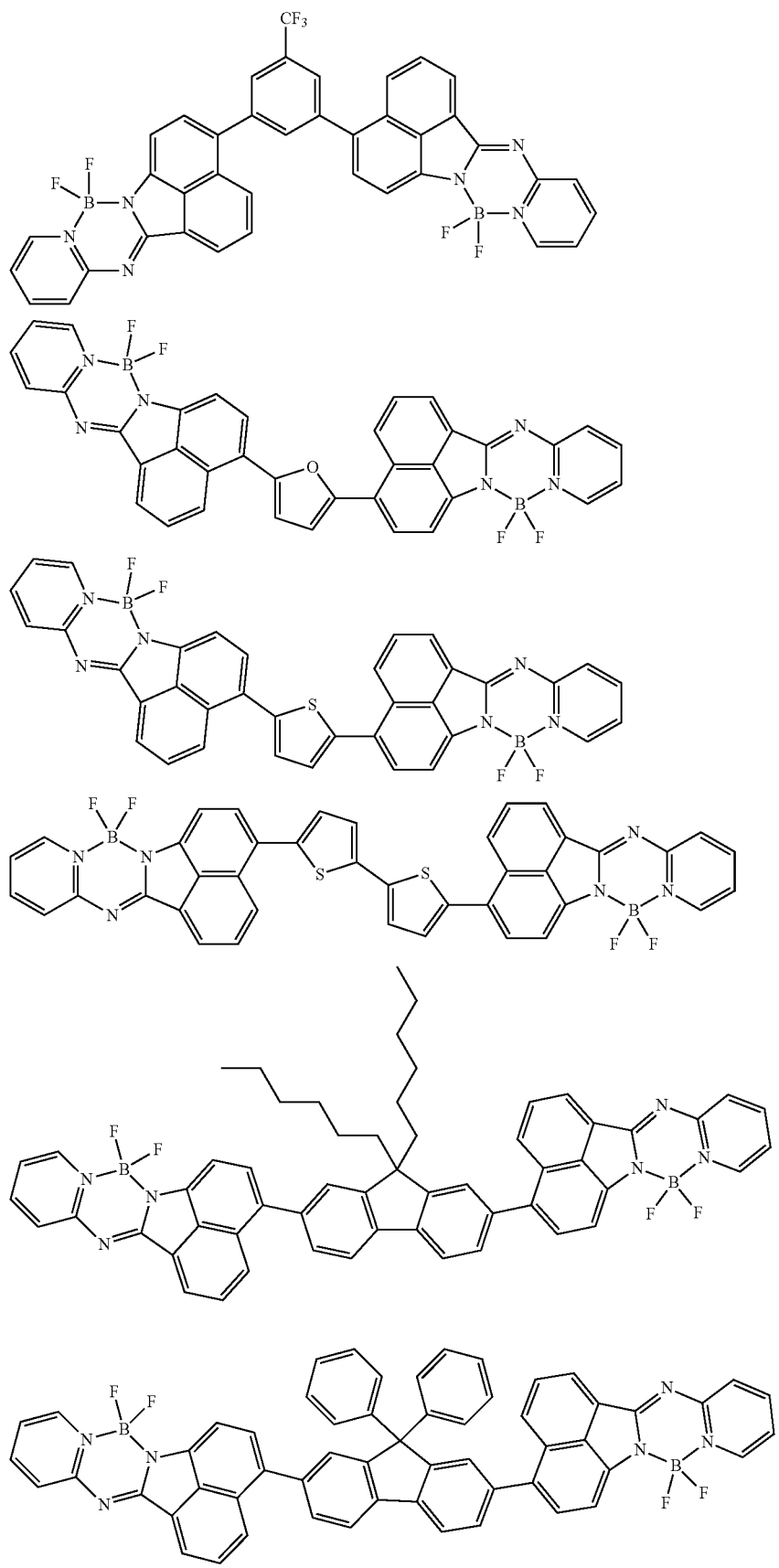

-continued
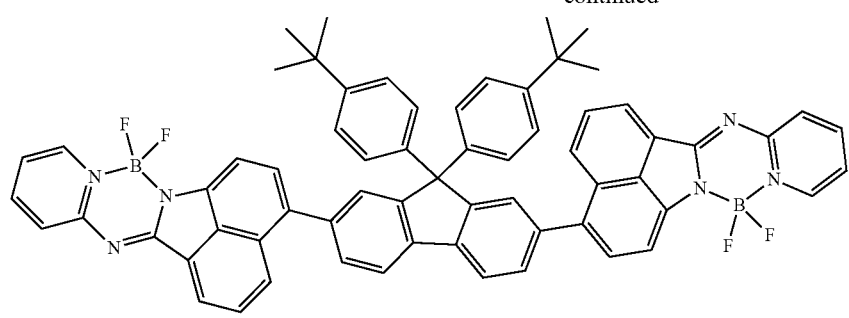
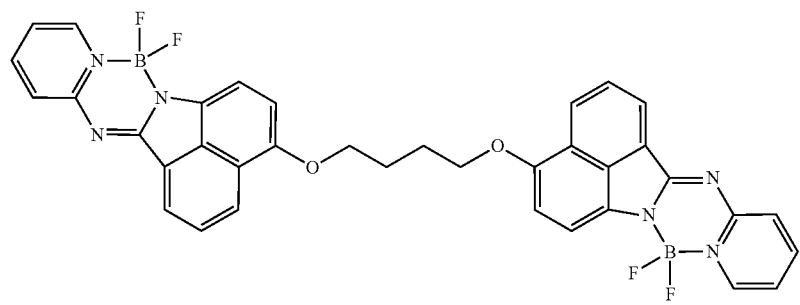
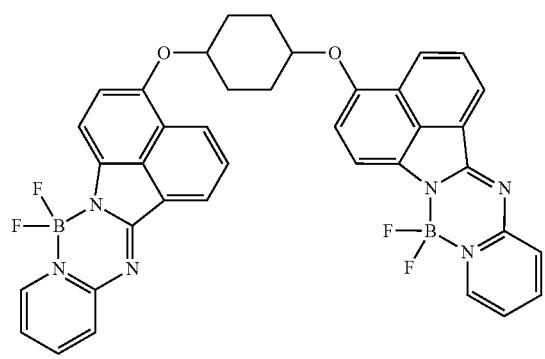
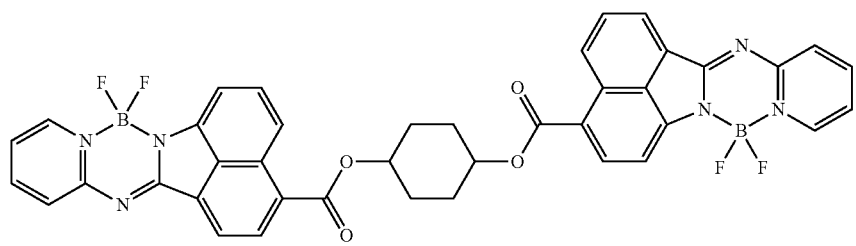
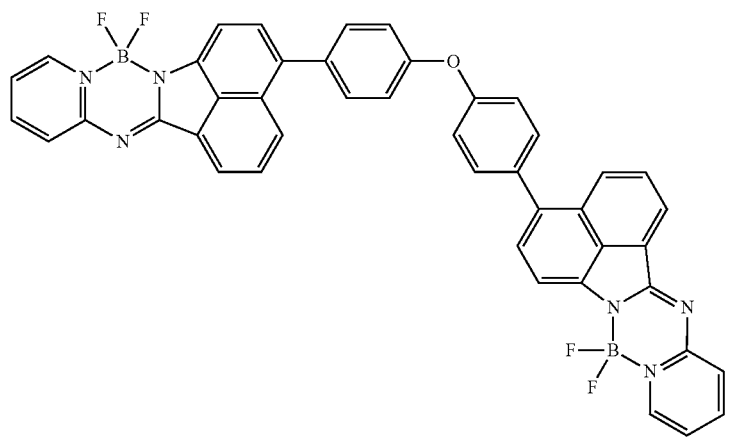

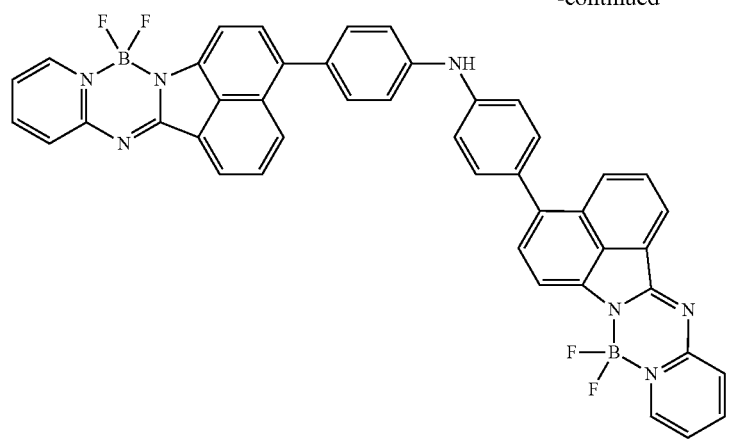

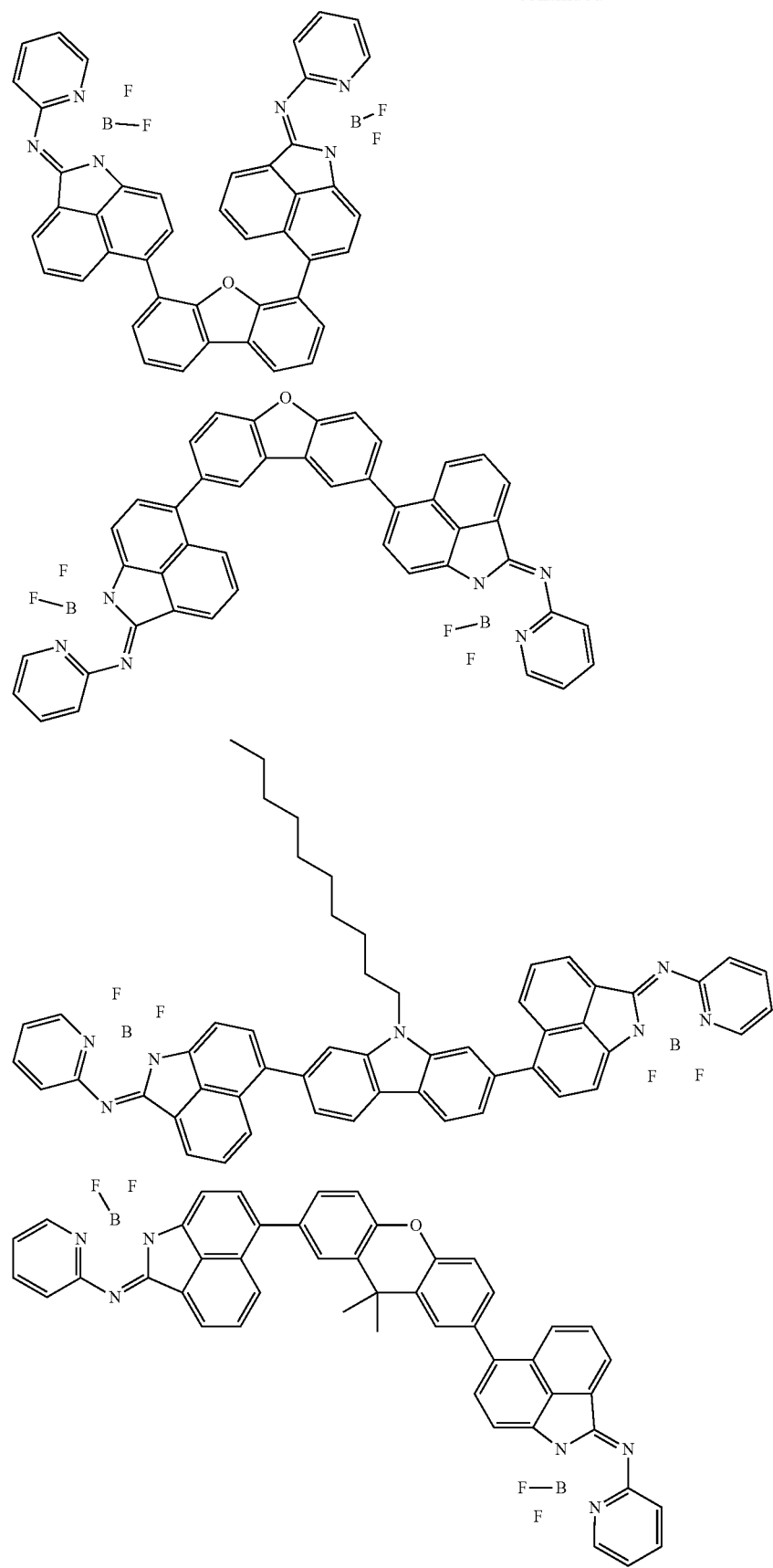

-continued
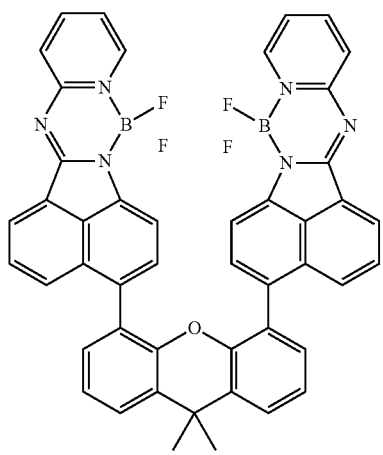
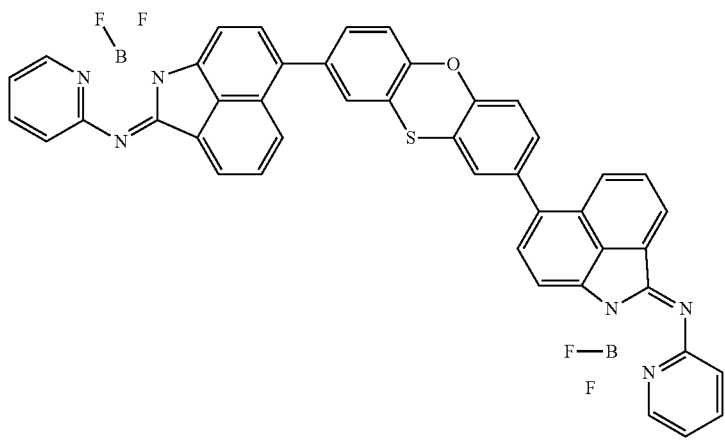
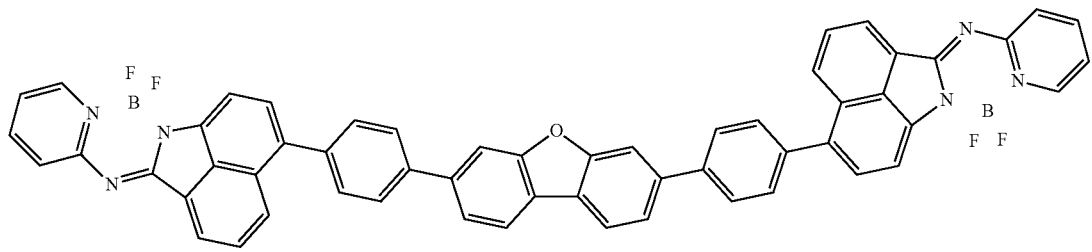
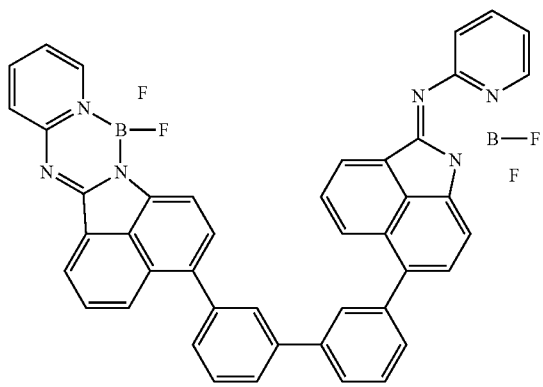

-continued
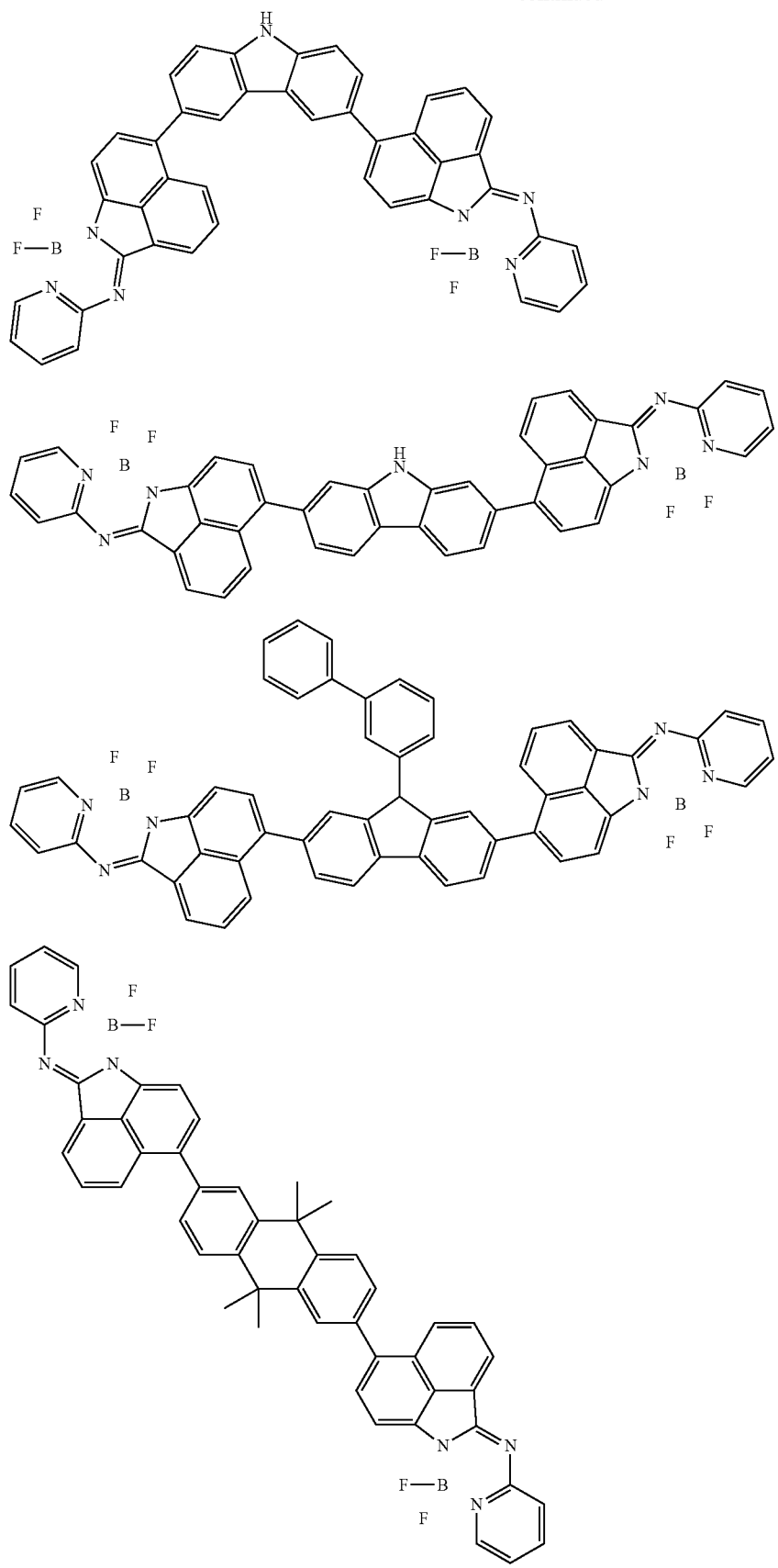

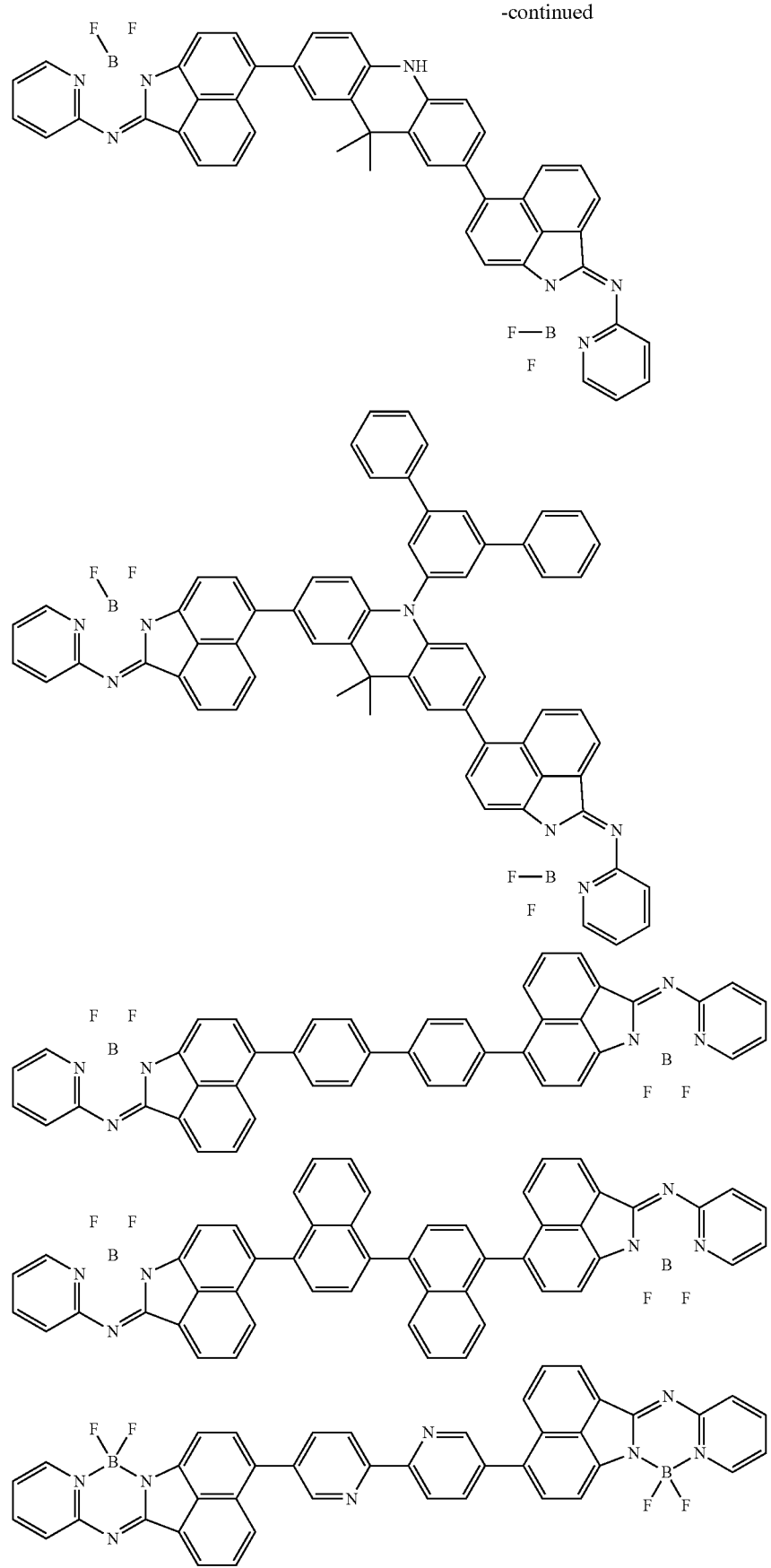

-continued
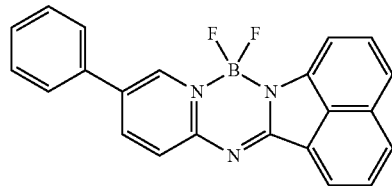
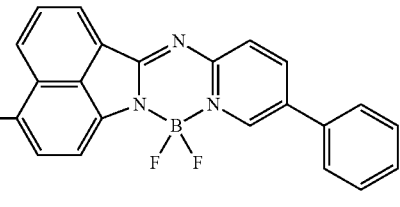
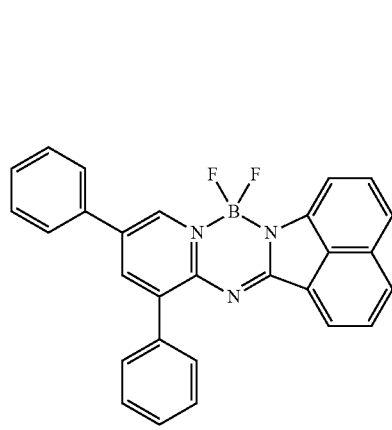
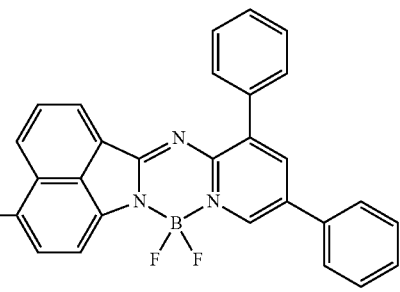
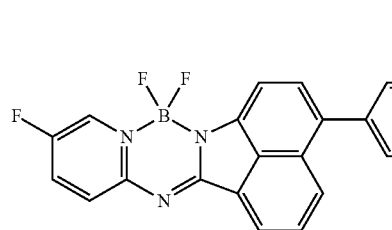
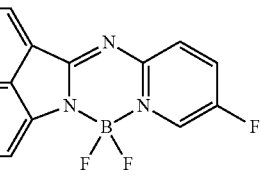
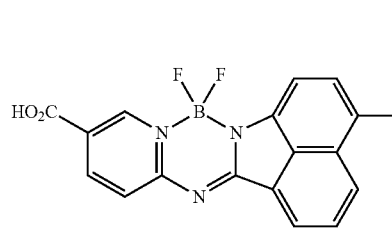
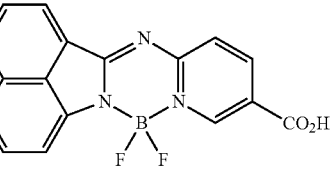
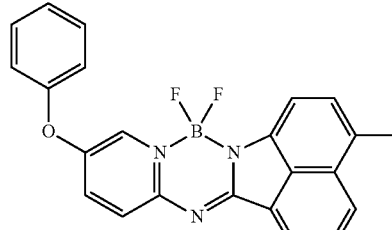
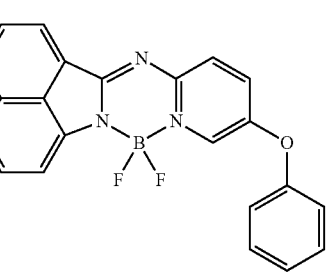
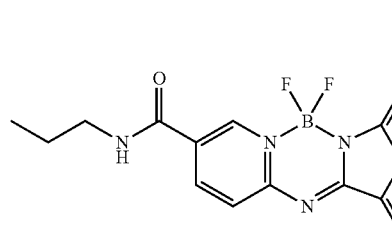
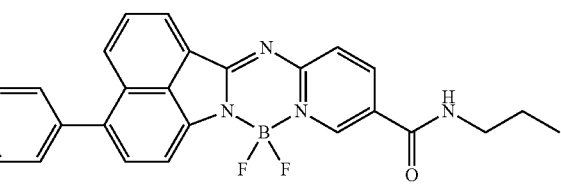

-continued
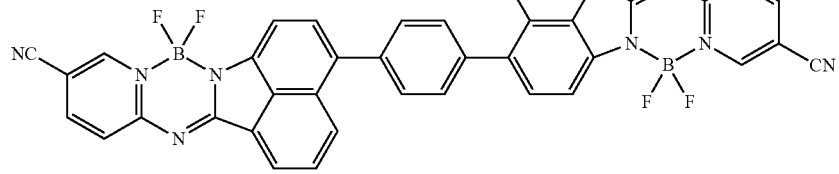
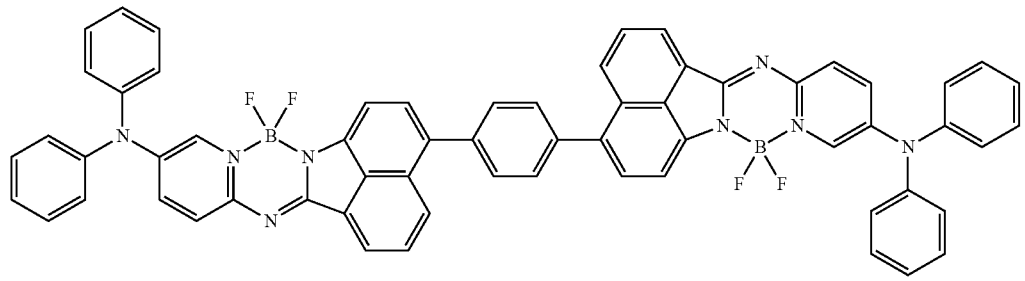
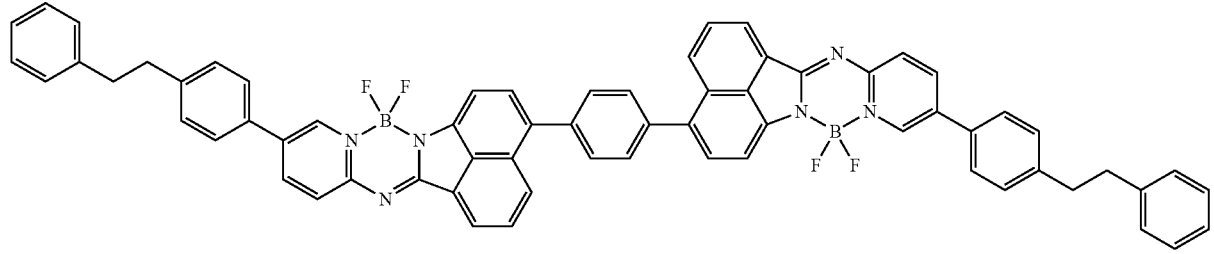
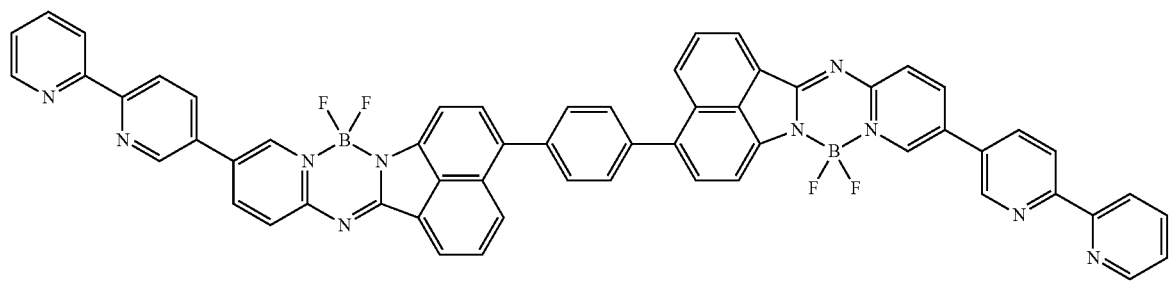
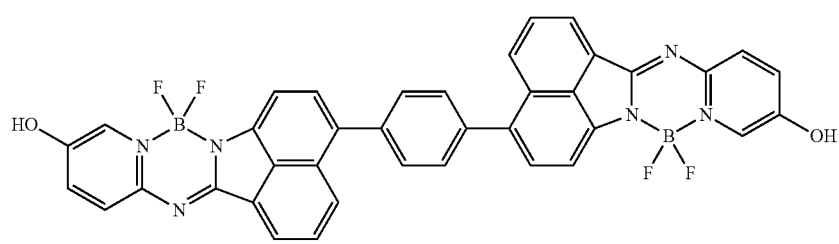
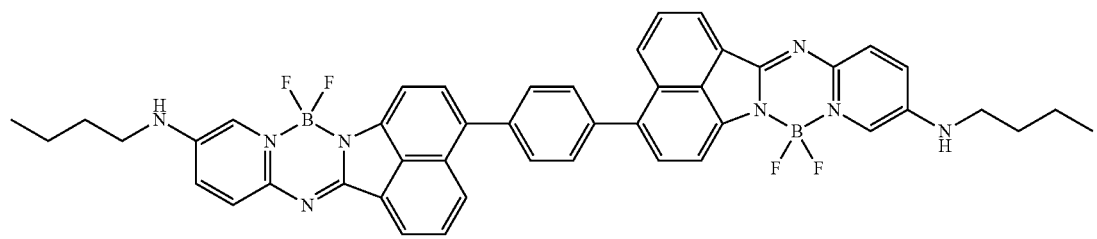

-continued
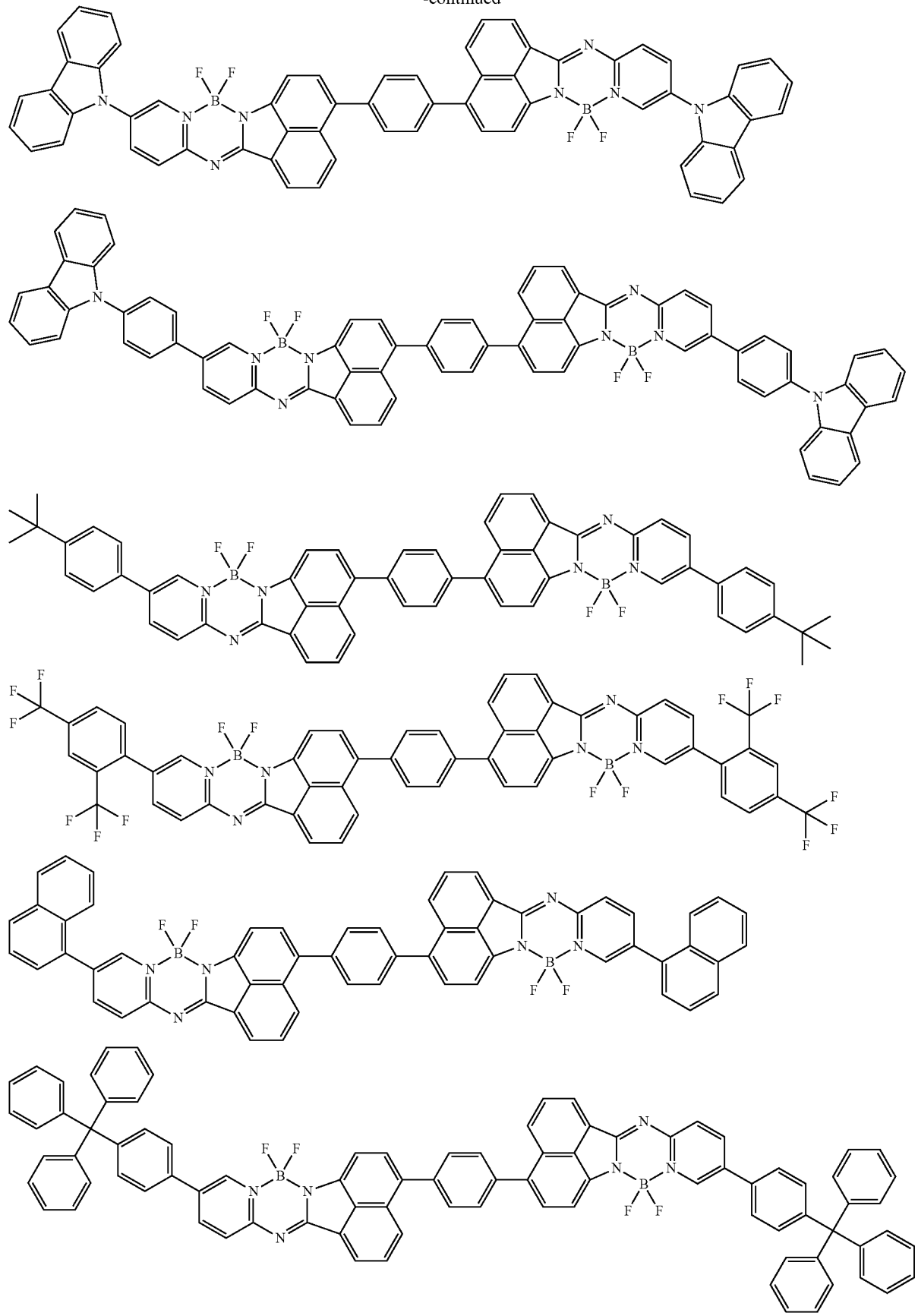

-continued
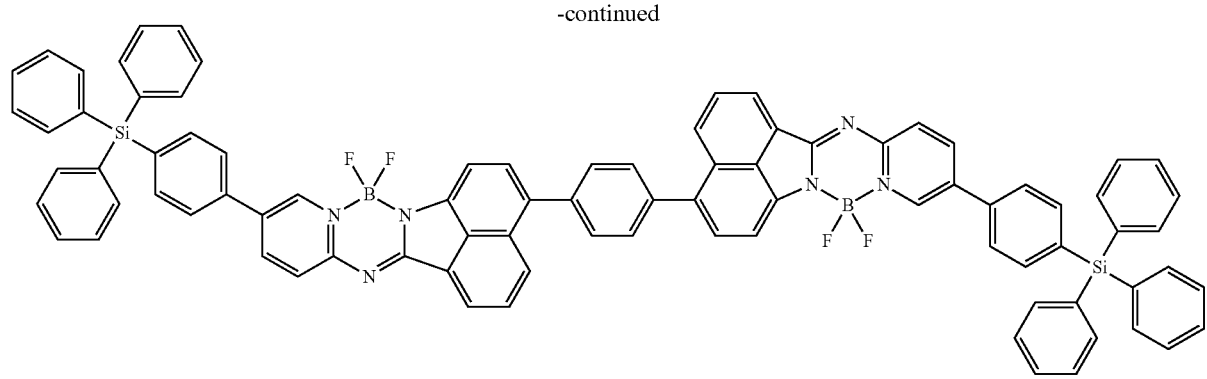
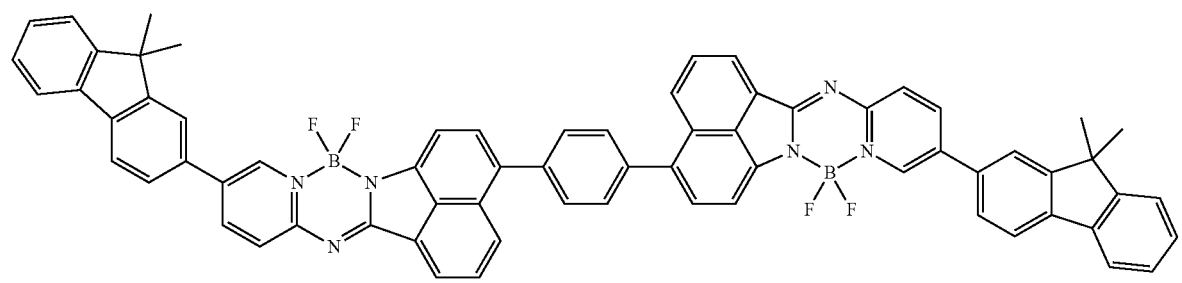
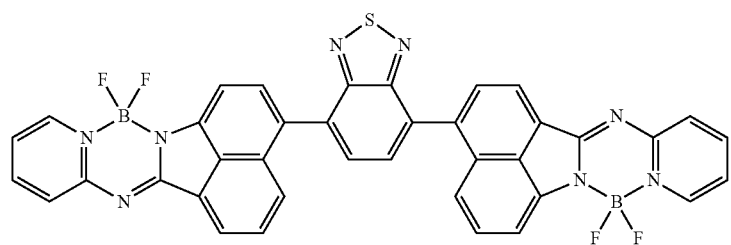
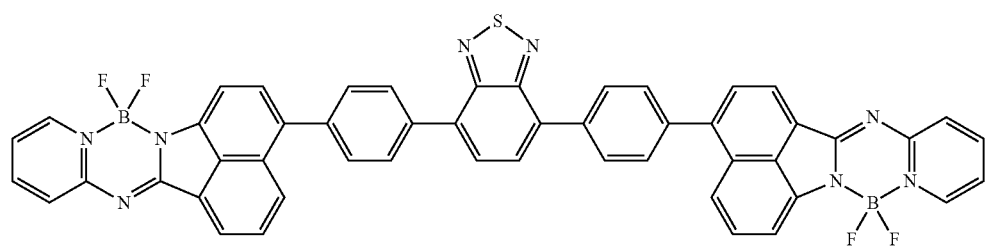
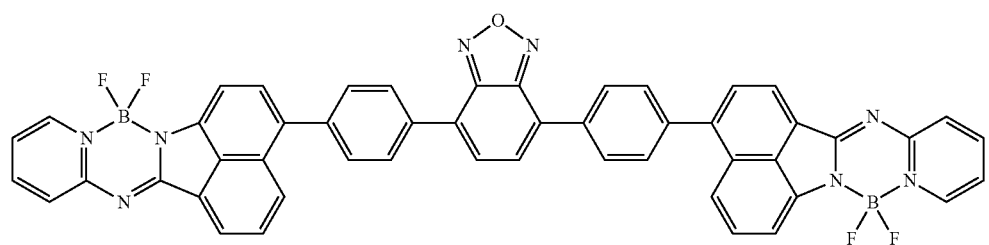

-continued
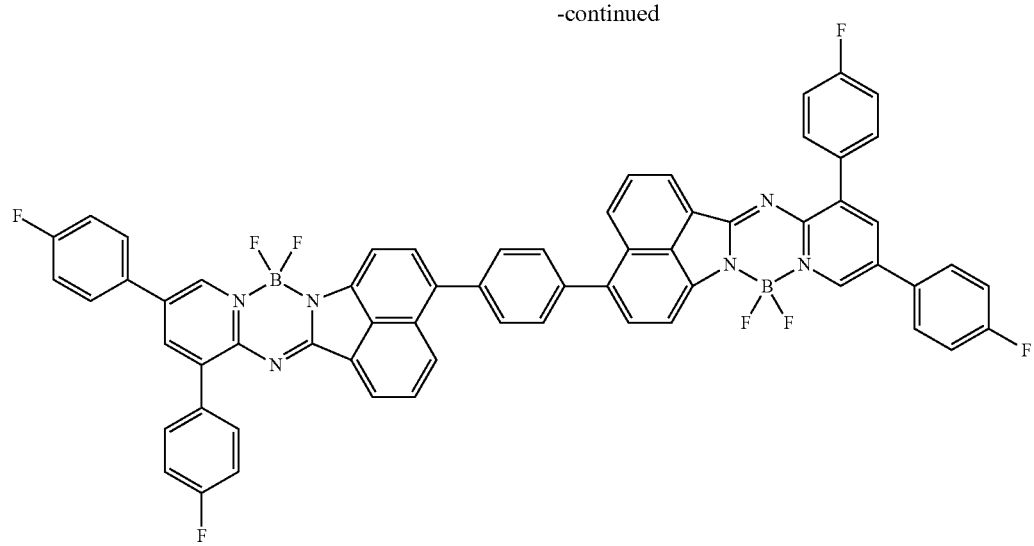
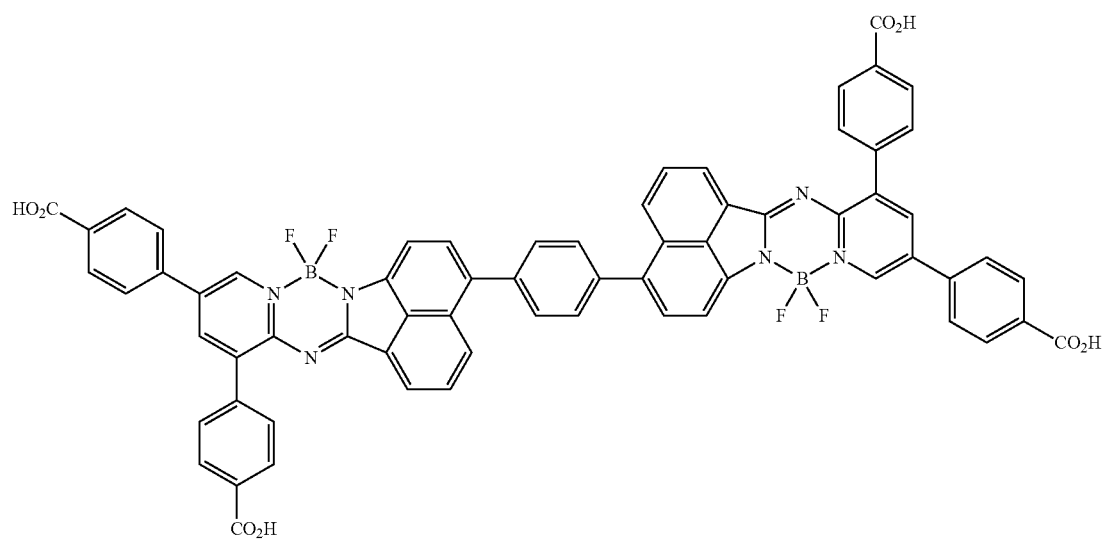
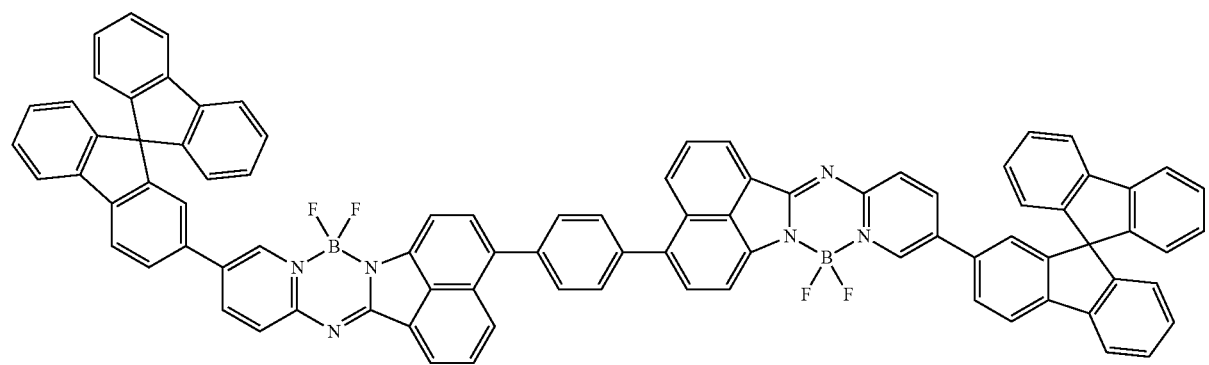

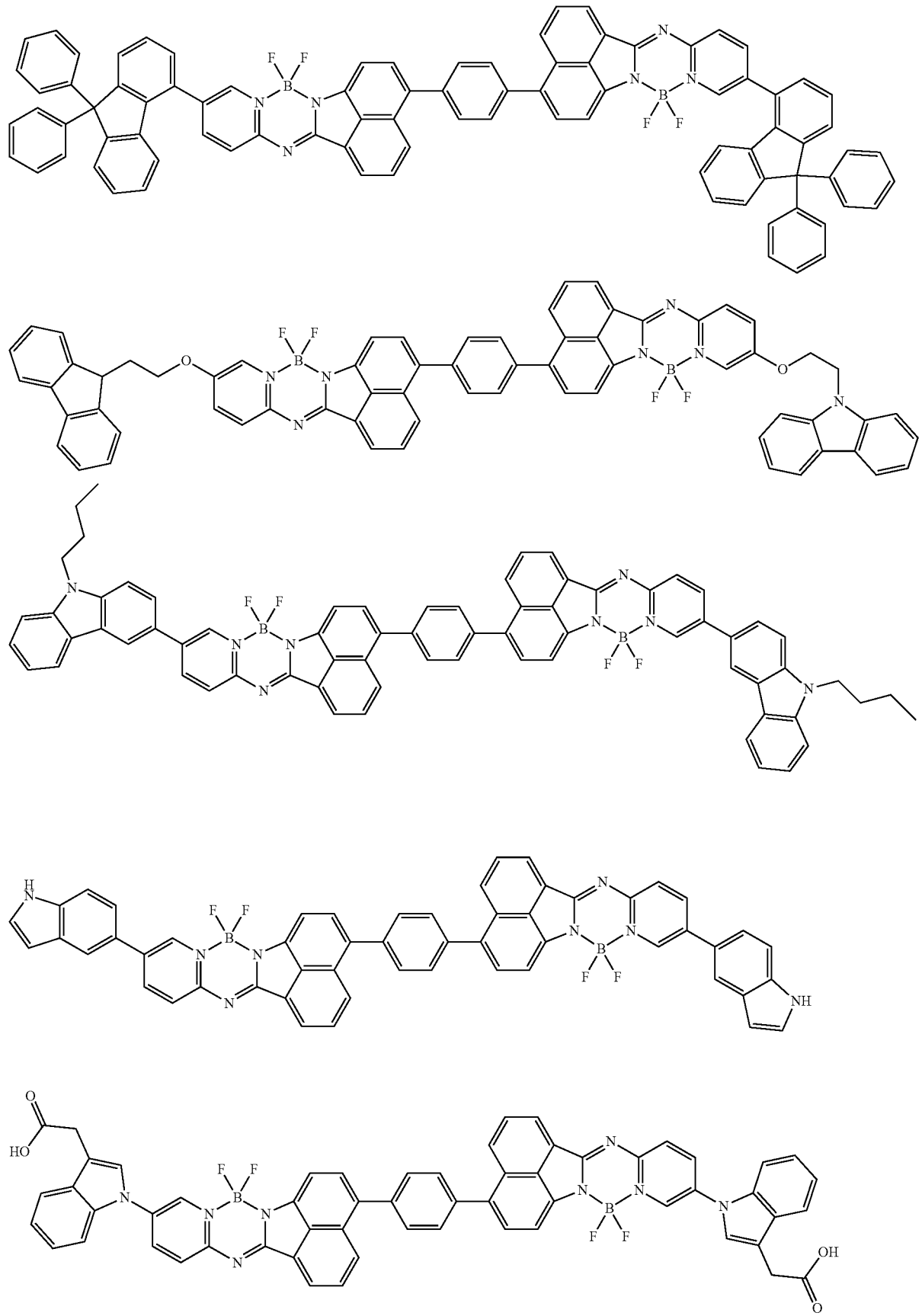

-continued
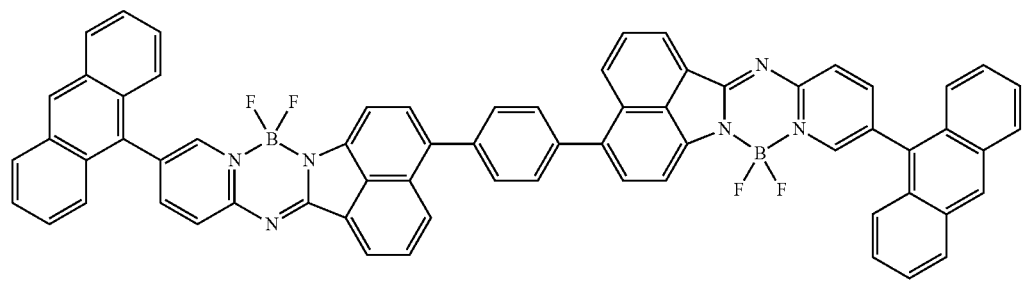
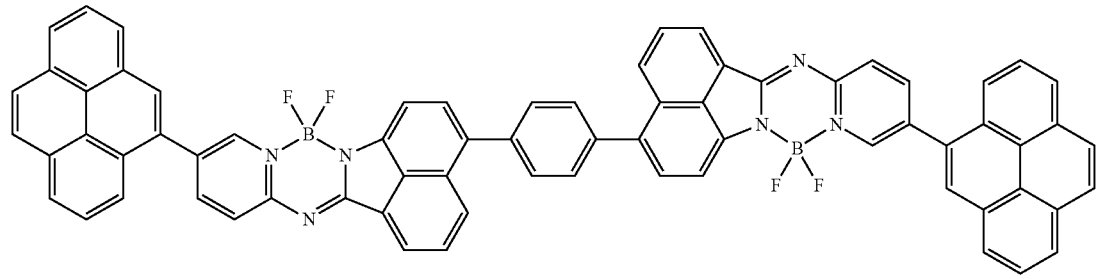
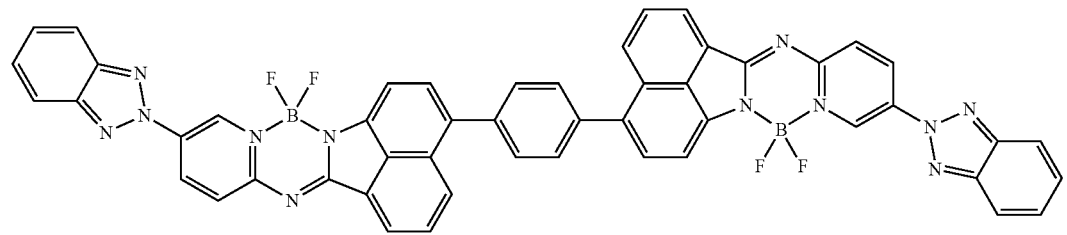
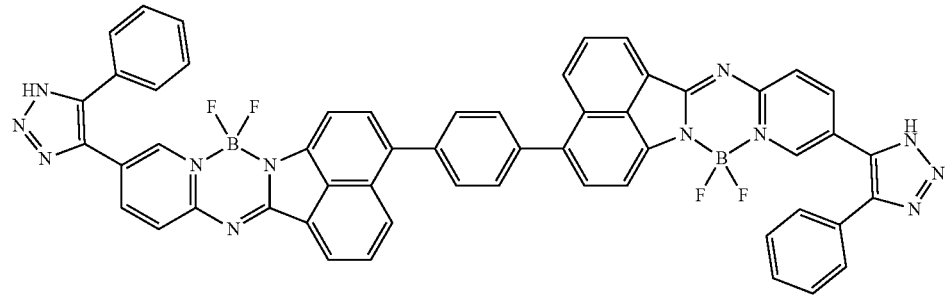
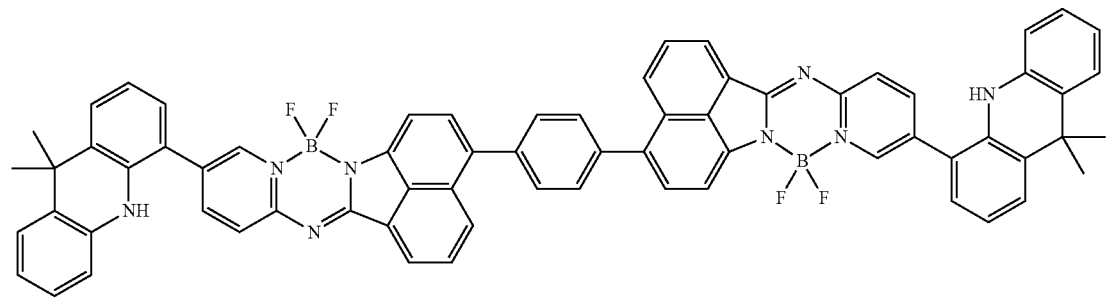
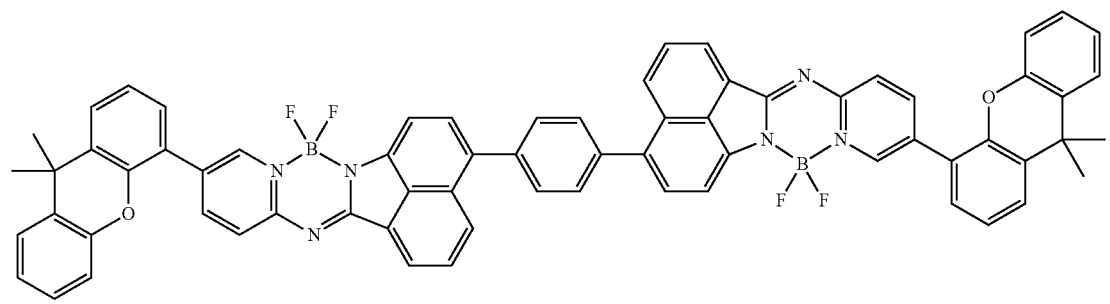

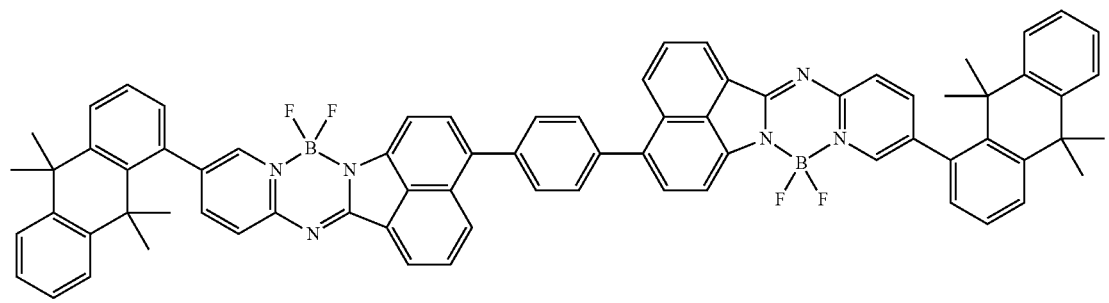

-continued
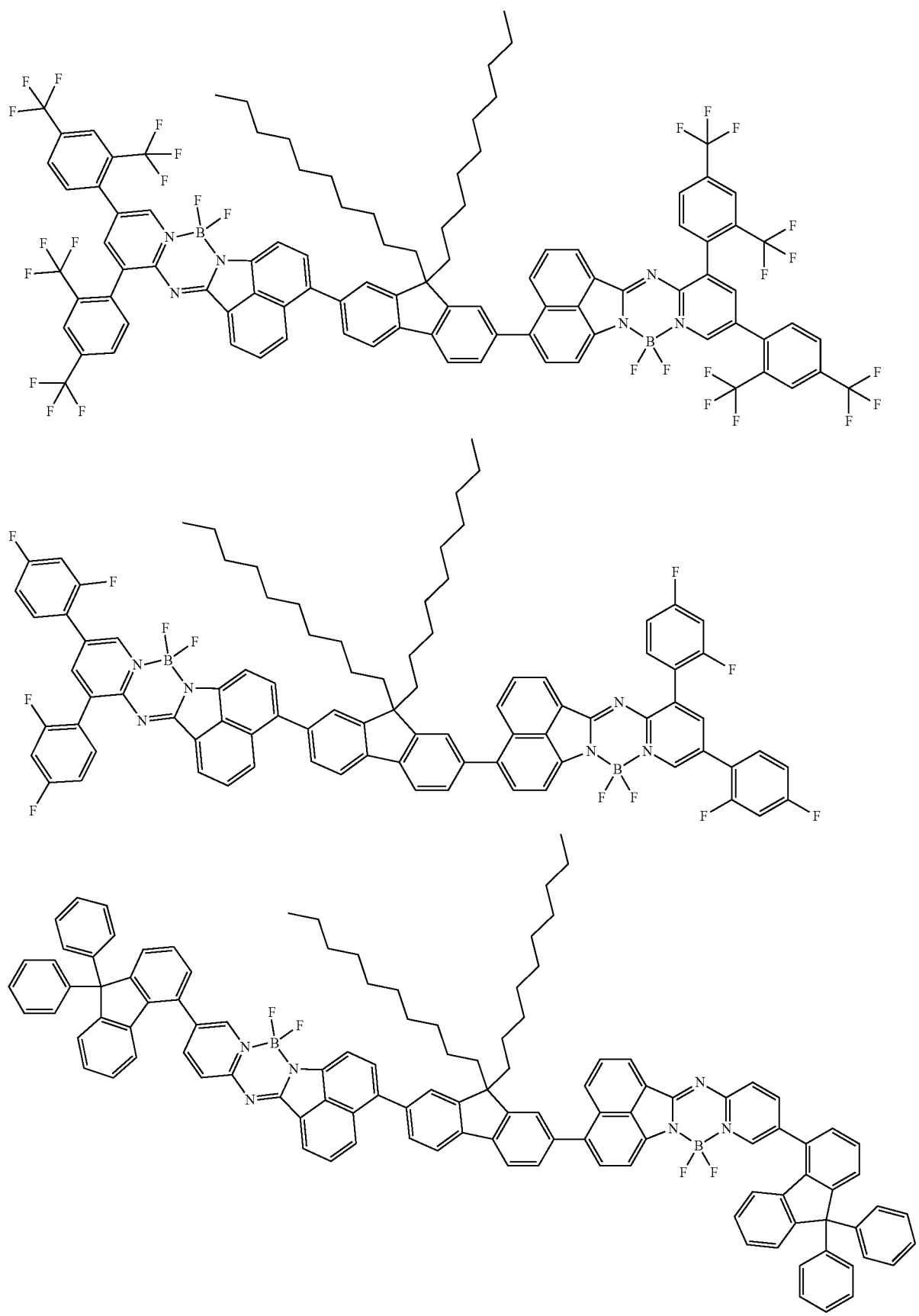

-continued
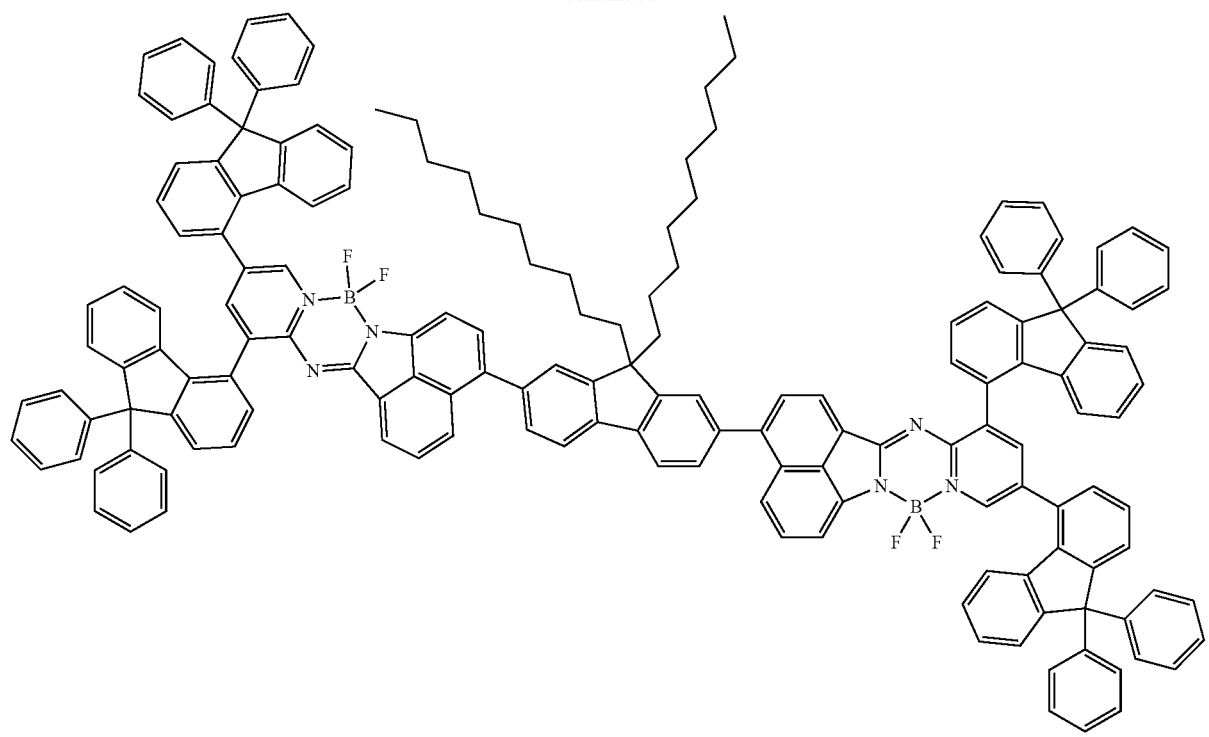
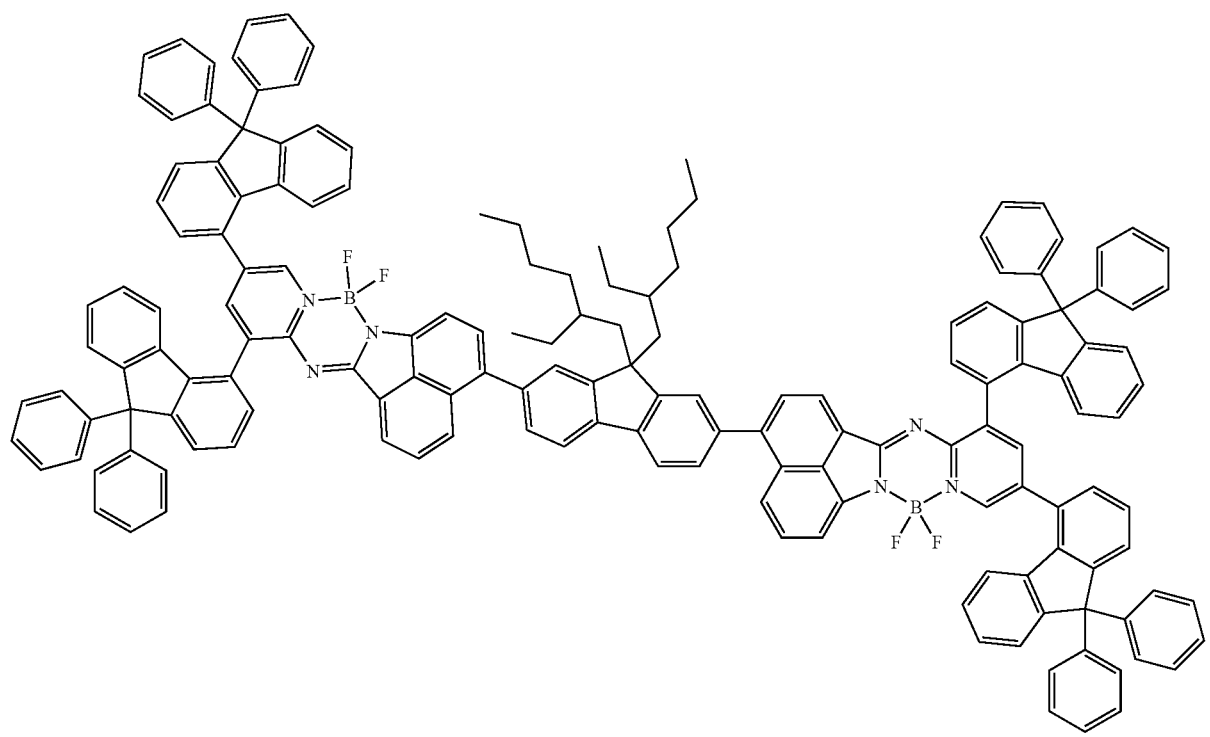

-continued
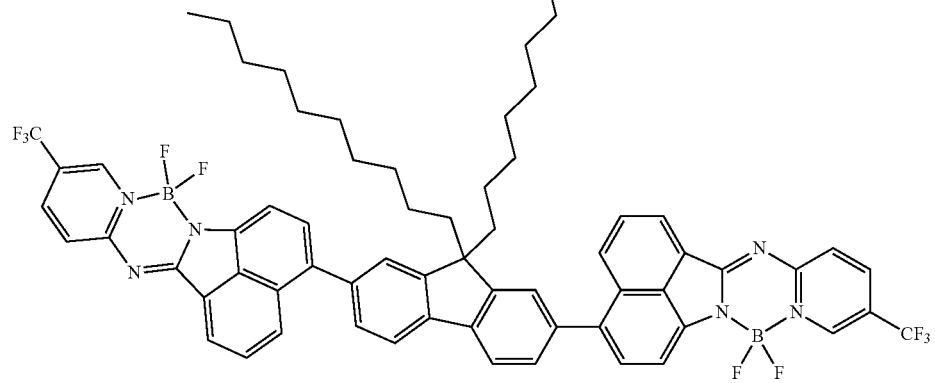
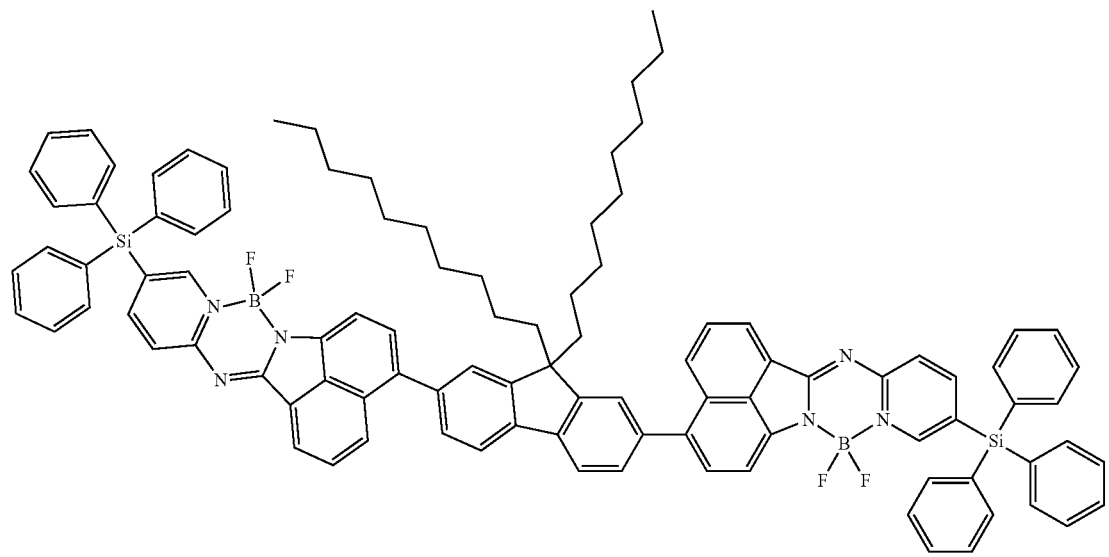
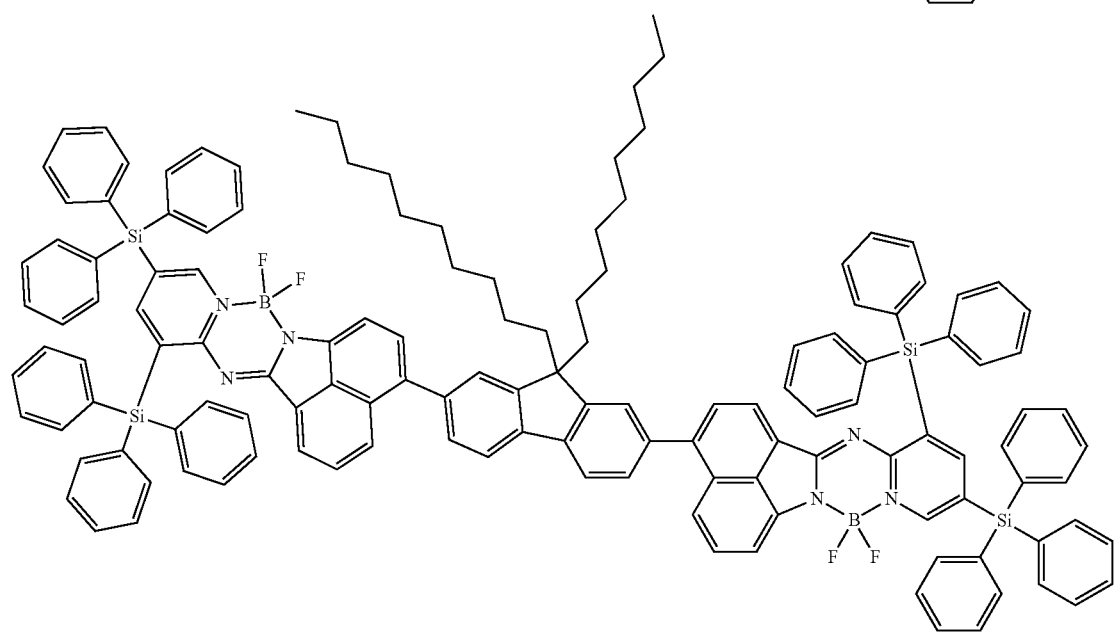

-continued
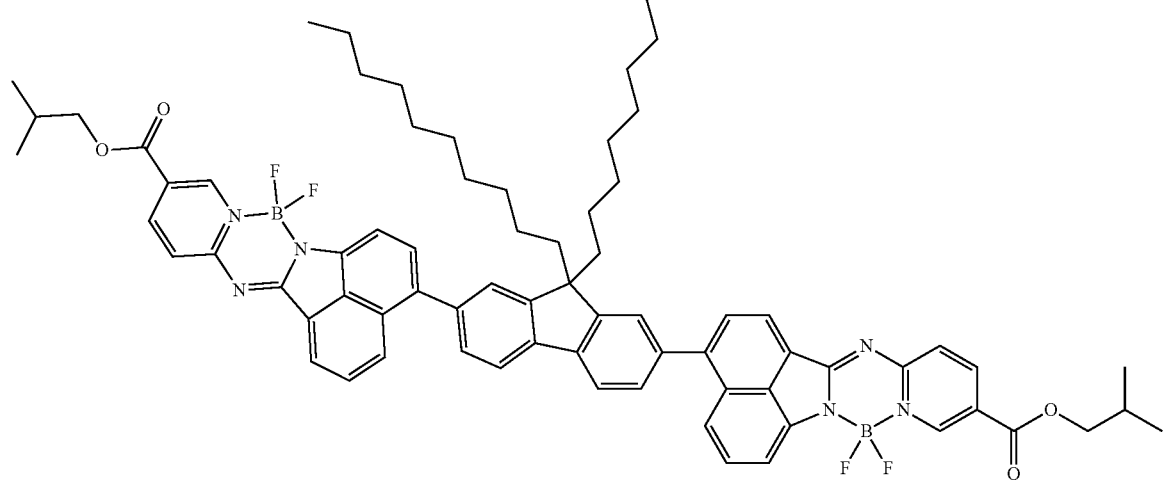
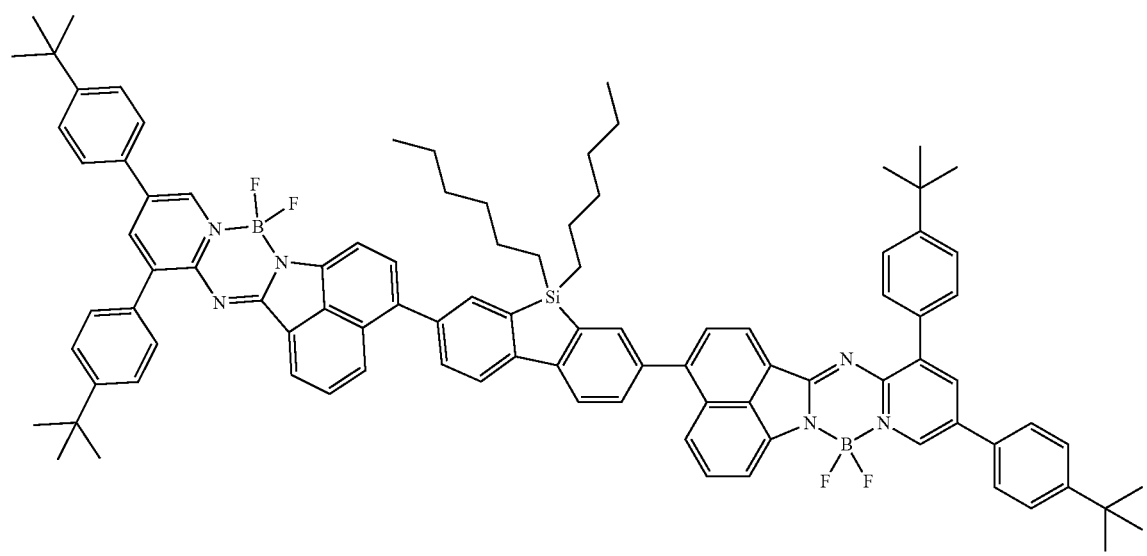
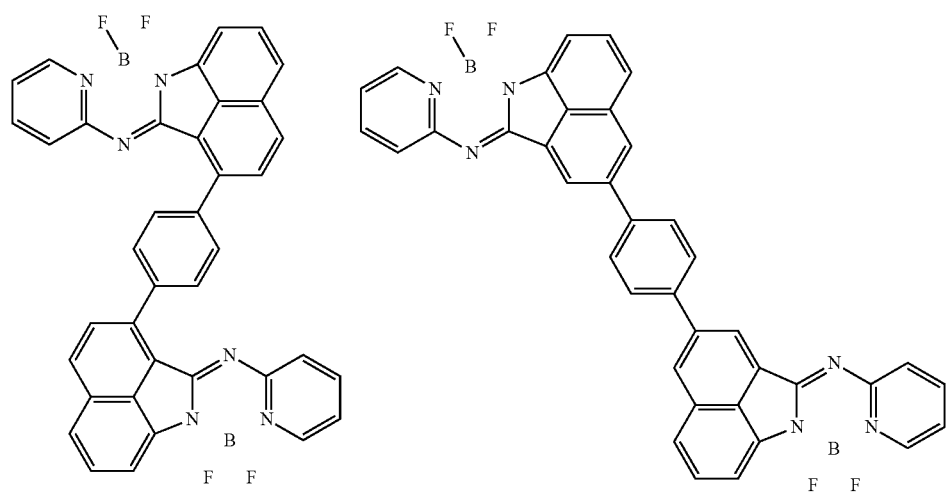

-continued
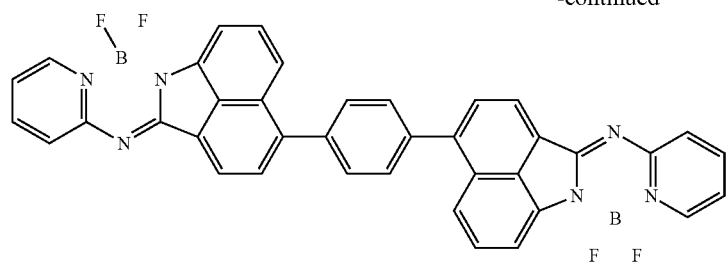
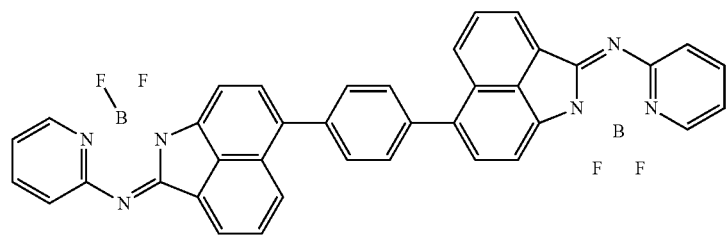
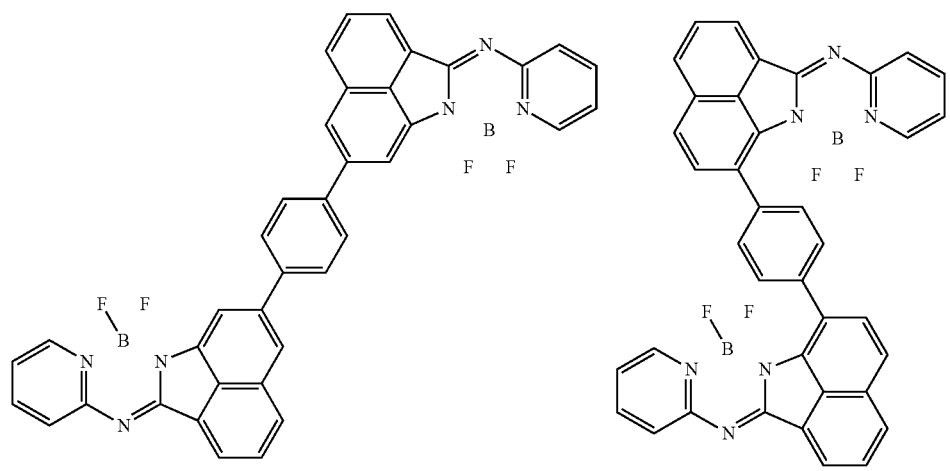
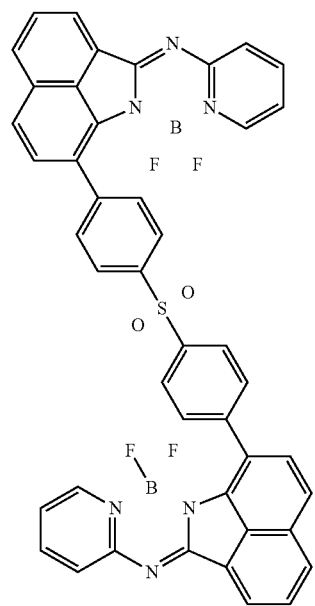

-continued
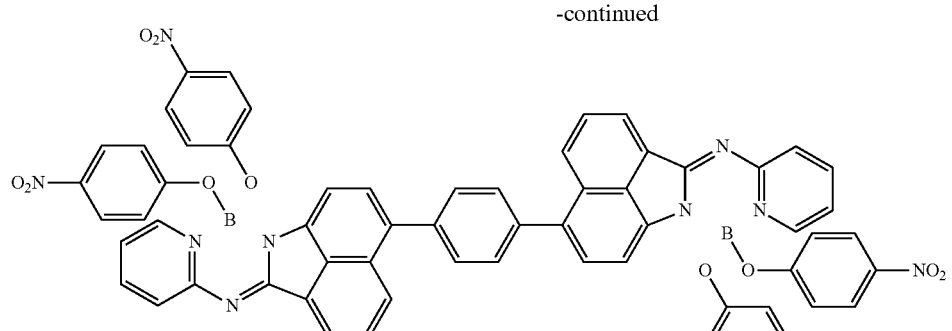
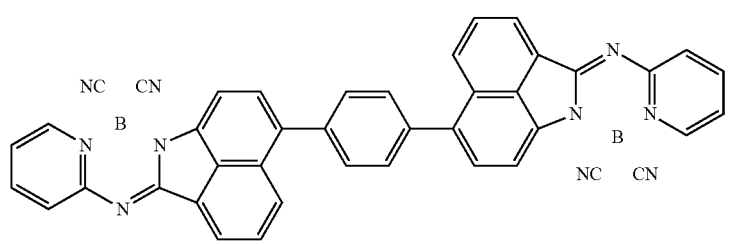
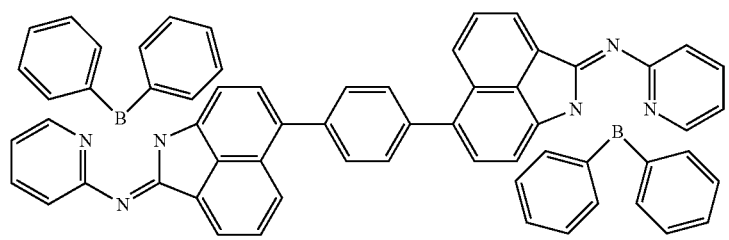
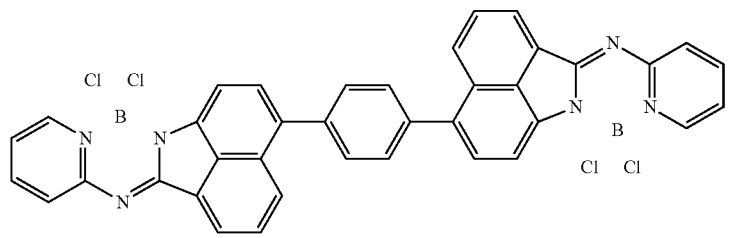
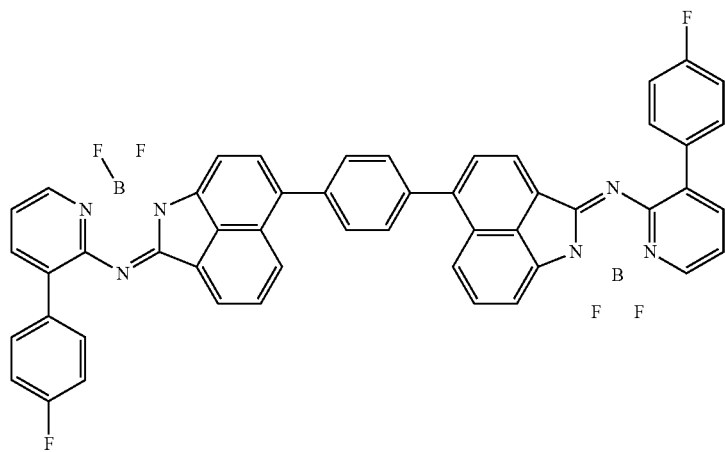

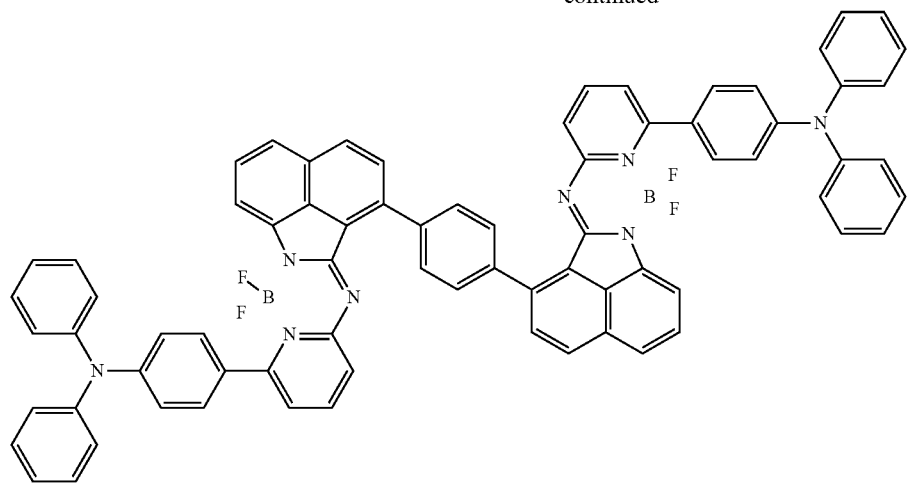
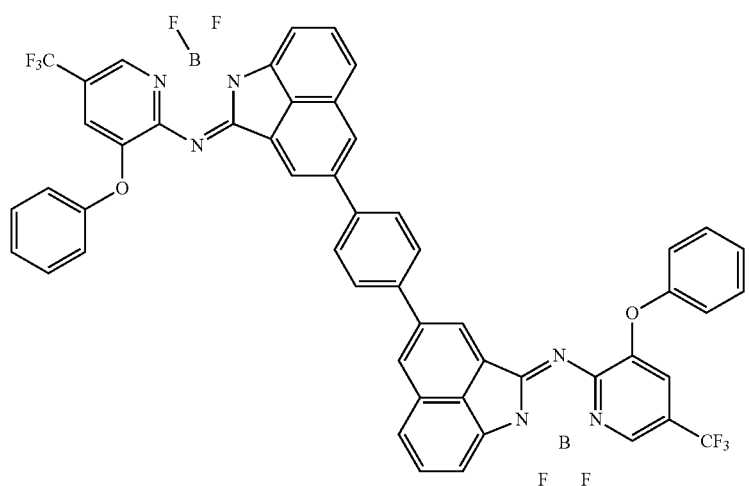
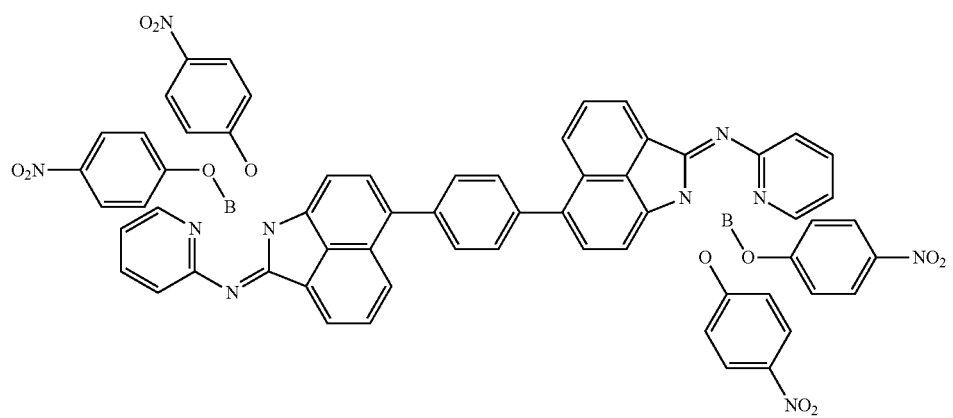

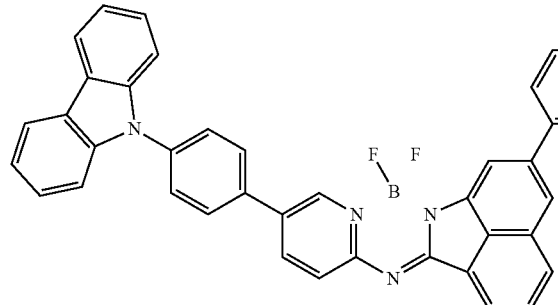

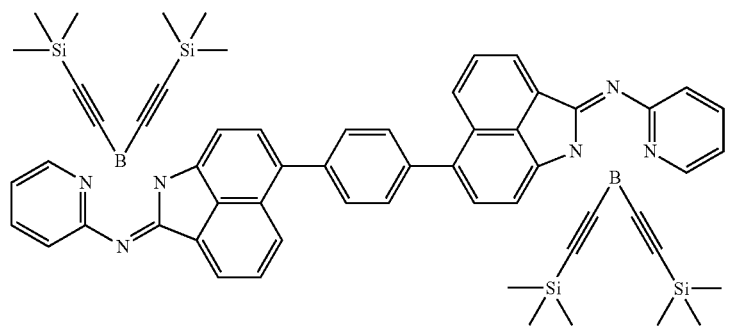

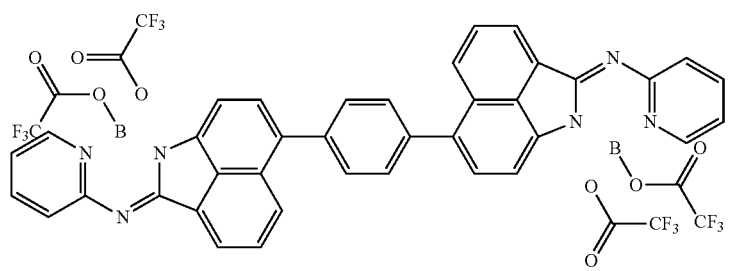

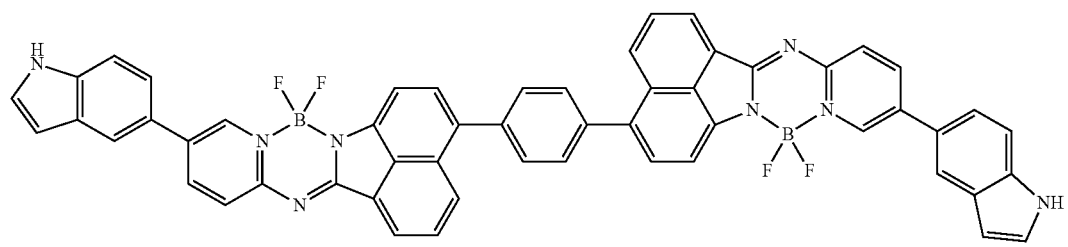

The compound according to an exemplary embodiment of the present application may be prepared by a preparation method to be described below.

For example, a core structure of the compound of Chemical Formula 1 may be prepared as in the following Reaction Formulae 1 and 2. The substituent may be bonded by a method known in the art, and the kind and position of the substituent or the number of substituents may be changed according to the technology known in the art.

[Reaction Formula 1]

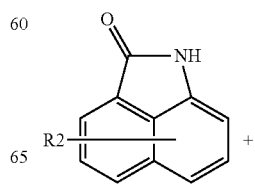

-continued

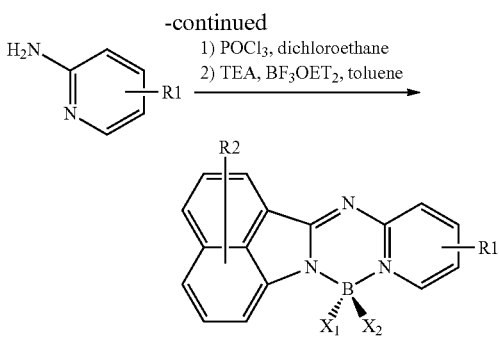

1.5 equivalents of aminopyrimidine and 1 equivalent of benzo[c,d]indol-2(1H)-one are put into a solvent, and the resulting mixture is heated and stirred at 90° C. under nitrogen. After benzo[c,d]indol-2(1H)-one disappears, the product is cooled down. After water is poured to the product and the resulting product is stirred for 30 minutes, extraction is performed by using chloroform, and the moisture is removed over anhydrous magnesium sulfate. After the residue is concentrated through distillation under reduced pressure, the resulting product is dissolved in toluene, TEA and $BF_3OET_2$ are put thereinto while the solution was stirred, and when the reaction is terminated in 1 hour at 120° C., the resulting product is cooled down and extraction is performed with $CHCl_3$, the moisture is removed over anhydrous magnesium sulfate, and then the residue is concentrated through distillation under reduced pressure and is purified through recrystallization.

[Reaction Formula 2]

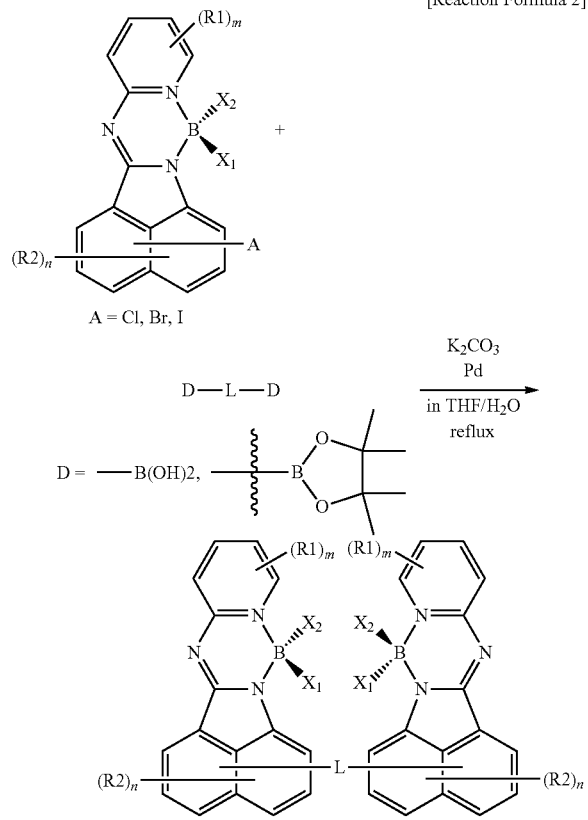

An exemplary embodiment of the present specification provides a color conversion film including: a resin matrix; and the compound represented by Chemical Formula 1, which is dispersed in the resin matrix.

The content of the compound represented by Chemical Formula 1 in the color conversion film may be within a range of 0.001 to 10 wt %.

The color conversion film may also include one or two or more of the compounds represented by Chemical Formula 1.

The color conversion film may further include an additional fluorescent material in addition to the compound represented by Chemical Formula 1. When a light source which emits blue light is used, it is preferred that the color conversion film includes both a fluorescent material which emits green light and a fluorescent material which emits red light. Further, when a light source which emits blue light and green light is used, the color conversion film may include only a fluorescent material which emits red light. However, the color conversion film is not limited thereto, and even when a light source which emits blue light is used, the color conversion film may include only a compound, which emits red light, in the case where a separate film including a fluorescent material which emits green light is stacked. Conversely, even when a light source which emits blue light is used, the color conversion film may include only a compound, which emits green light, in the case where a separate film including a fluorescent material which emits red light is stacked.

The color conversion film may further include a resin matrix; and an additional layer including a compound which is dispersed in the resin matrix and emits light having a wavelength different from that of the compound represented by Chemical Formula 1. The compound which emits light having a wavelength different from that of the compound represented by Chemical Formula 1 may also be the compound expressed as Chemical Formula 1, and may also be another publicly-known fluorescent material.

It is preferred that a material for the resin matrix is a thermoplastic polymer or a thermosetting polymer. Specifically, as the material for the resin matrix, it is possible to use a poly(meth)acrylic material such as polymethylmethacrylate (PMMA), a polycarbonate (PC)-based material, a polystyrene (PS)-based material, a polyarylene (PAR)-based material, a polyurethane (TPU)-based material, a styrene-acrylonitrile (SAN)-based material, a polyvinylidenefluoride (PVDF)-based material, a modified-polyvinylidenefluoride (modified-PVDF)-based material, and the like.

According to an exemplary embodiment of the present specification, the color conversion film according to the above-described exemplary embodiment additionally includes light diffusion particles. By dispersing light diffusion particles in the color conversion film instead of a light diffusion film used in the related art in order to improve brightness, an attaching process may be omitted, and higher brightness may be exhibited as compared to the case where a separate light diffusion film is used.

As the light diffusion particle, a resin matrix and a particle having a high refractive index may be used, and it is possible to use, for example, $TiO_2$, silica, borosilicate, alumina, sapphire, air or another gas, air- or gas-filled hollow beads or particles (for example, air/gas-filled glass or polymer); polymer particles including polystyrene, polycarbonate, polymethylmethacrylate, acryl, methyl methacrylate, styrene, a melamine resin, a formaldehyde resin, or a melamine and formaldehyde resin, or any suitable combination thereof.

The particle diameter of the light diffusion particles may be within a range of 0.1 μm to 5 μm, for example, within a range of 0.3 μm to 1 μm. The content of the light diffusion particles may be determined, if necessary, and may be, for example, within a range of about 1 part by weight to about 30 parts by weight based on 100 parts by weight of the resin matrix.

The color conversion film according to the above-described exemplary embodiment may have a thickness of 2 μm to 200 μm. In particular, the color conversion film may exhibit high brightness even in a small thickness of 2 μm to 20 μm. This is because the content of the fluorescent material molecule included in a unit volume is higher than that of a quantum dot.

A base material may be provided on one surface of the color conversion film according to the above-described exemplary embodiment. The base material may function as a support when preparing the color conversion film. The kind of base material is not particularly limited, and the material or thickness of the base material is not limited as long as the base material is transparent and may function as the support. Here, transparency means that the transmittance of visible light is 70% or more. For example, as the base material, a PET film may be used.

The above-described color conversion film may be prepared by coating a resin solution, in which the above-described compound represented by Chemical Formula 1 is dissolved, on a base material and drying the resin solution, or extruding the above-described compound represented by Chemical Formula 1 together with the resin to produce a film.

Since the above-described compound represented by Chemical Formula 1 is dissolved in the resin solution, the compound represented by Chemical Formula 1 is uniformly distributed in the solution. This is different from a process of preparing a quantum dot film, which requires a separate dispersing process.

The preparation method of the resin solution in which the compound represented by Chemical Formula 1 is dissolved is not particularly limited as long as the above-described compound represented by Chemical Formula 1 and the resin are dissolved in the solution.

According to an example, the resin solution in which the compound represented by Chemical Formula 1 is dissolved may be prepared by a method including: dissolving the compound represented by Chemical Formula 1 in a solvent to prepare a first solution, dissolving a resin in a solvent to prepare a second solution, and mixing the first solution with the second solution. When the first solution and the second solution are mixed, it is preferred to uniformly mix the solutions. However, the method is not limited thereto, and it is possible to use a method of simultaneously adding a compound represented by Chemical Formula 1 and a resin to a solvent to dissolve the compound and the resin, a method of dissolving the compound represented by Chemical Formula 1 in a solvent, and subsequently adding the resin thereto to dissolve the resin, a method of dissolving the resin in a solvent, and subsequently adding the compound represented by Chemical Formula 1 thereto to dissolve the compound, and the like.

As the resin included in the solution, it is possible to use the above-described resin matrix material, a monomer which is curable by the resin matrix resin, or a mixture thereof. Examples of the monomer which is curable by the resin matrix resin include a (meth)acrylic monomer, and the monomer may be formed of a resin matrix material by UV curing. When a curable monomer is used as described above, an initiator required for curing may be further added, if necessary.

The solvent is not particularly limited, and is not particularly limited as long as the solvent does not adversely affect the coating process and may be removed by a subsequent drying. As a non-limiting example of the solvent, it is possible to use toluene, xylene, acetone, chloroform, various alcohol-based solvents, methyl ethyl ketone (MEK), methyl isobutyl ketone (MIBK), ethyl acetate (EA), butyl acetate, dimethylformamide (DMF), dimethylacetamide (DMAc), dimethylsulfoxide (DMSO), N-methyl-pyrrolidone (NMP), and the like, and one or a mixture of two or more may be used. When the first solution and the second solution are used, the solvents included in each of the solutions may also be the same as or different from each other. Even when different solvents are used in the first solution and the second solution, it is preferred that these solvents have compatibility so as to be mixed with each other.

For the process of coating the resin solution, in which the compound represented by Chemical Formula 1 is dissolved, on a base material, a roll-to-roll process may be used. For example, the roll-to-roll process may be performed by a process of unwinding a base material from a roll on which the base material is wound, coating a resin solution, in which the compound represented by Chemical Formula 1 is dissolved, on one surface of the base material, drying the resin solution, and then winding the base material again on the roll. When the roll-to-roll process is used, it is preferred that the viscosity of the resin solution is determined within a range in which the process may be implemented, and the viscosity may be determined within a range of, for example, 200 to 2,000 cps.

As the coating method, various publicly-known methods may be used, and for example, a die coater may also be used, and various bar-coating methods such as a comma coater and a reverse comma coater may also be used.

After the coating, a drying process is performed. The drying process may be performed under conditions required for removing the solvent. For example, it is possible to obtain a color conversion film including a fluorescent material including the compound represented by Chemical Formula 1, which has desired thickness and concentration, on a base material by carrying out the drying in an oven located close to a coater under a condition to sufficiently evaporate a solvent, in a direction in which the base material progresses during the coating process.

When the monomer which is curable by the resin matrix resin is used as a resin included in the solution, curing, for example, UV curing may be performed before the drying or simultaneously with the drying.

When the compound represented by Chemical Formula 1 is extruded with a resin to produce a film, an extrusion method known in the art may be used, and for example, a color conversion film may be prepared by extruding the compound represented by Chemical Formula 1 with a resin such as a polycarbonate (PC)-based resin, a poly(meth)acrylic resin, and a styrene-acrylonitrile (SAN)-based resin.

According to an exemplary embodiment of the present specification, a protective film or a barrier film may be provided on at least one surface of the color conversion film. As the protective film and the barrier film, films known in the art may be used.

An exemplary embodiment of the present specification provides a backlight unit including the above-described color conversion film. The backlight unit may have a backlight unit configuration known in the art, except that the backlight unit includes the color conversion film. FIG. 1 illustrates a schematic view of a backlight unit structure according to an example. The backlight unit according to FIG. 1 includes a side chain-type light source 101, a reflective plate 102 which surrounds the light source, a light guide plate 103 which guides light directly emitted from the light source, or reflected from the reflective plate, a reflective layer 104 which is provided on one surface of the light guide plate, and a color conversion film 105 which is provided on a surface opposite to a surface of the light guide plate facing the reflective layer. A portion marked with 106 in FIG. 1 is a light dispersion pattern 106 of the light guide plate. The light incident inside the light guide plate has an irregular light distribution due to the repetition of an optical process such as reflection, total reflection, refraction, and transmission, and a 2-dimensional light dispersion pattern may be used in order to guide the irregular light distribution to have a uniform luminance. However, the scope of the present invention is not limited by FIG. 1, and not only a side chain-type light source but also a direct-type light source may also be used as the light source, and the reflective plate or the reflective layer may be omitted or may also be replaced with another configuration, if necessary, and an additional film, for example, a light diffusion film, a light collecting film, a brightness enhancement film, and the like may be further provided, if necessary.

An exemplary embodiment of the present specification provides a display device including the backlight unit. The display device is not particularly limited as long as the display device is a display device including a backlight unit, and may be included in a TV, a monitor of a computer, a laptop computer, a mobile phone, and the like.

MODE FOR INVENTION

Hereinafter, the present specification will be described in detail with reference to Examples for specifically describing the present specification. However, the Examples according to the present specification may be modified in various forms, and it is not interpreted that the scope of the present application is limited to the Examples described in detail below. The Examples of the present application are provided for more completely explaining the present specification to the person with ordinary skill in the art.

Preparation Example 1. Compound 1

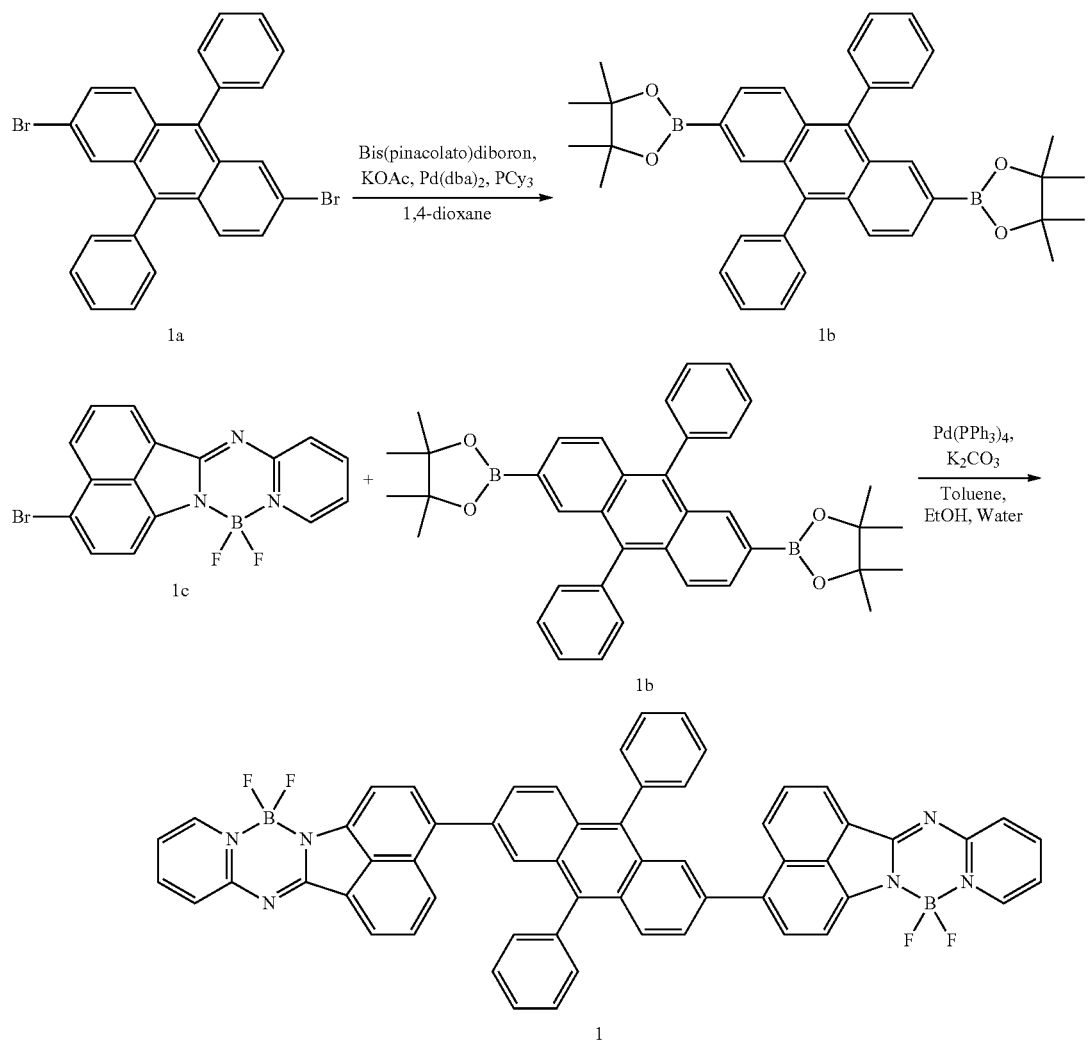

1) Synthesis of Compound 1b 2 g (4.10 mmol, 1 equivalent) of Compound 1a, 2 equivalents of bis(pinacolato)diboron, and 3 equivalents of potassium acetate were stirred under a 1,4-dioxane solvent, and a reaction was performed by using 0.03 equivalent of $Pd(dba)_2$ and 0.06 equivalent of $PCy_3$ as a catalyst. After the reaction was terminated, the resulting product was cooled to room temperature, and the salt was removed through a celite filter. The filtrate was removed through distillation under reduced pressure and recrystallized by using EtOH. Through the recrystallization, 1.7 g (yield 70%) of Compound 1b could be obtained.

2) Synthesis of Compound 1

3.2 g (8.61 mmol, 3 equivalents) of Compound 1c and 1 equivalent of Compound 1b were stirred under toluene and ethanol solvents, 5 equivalents of potassium carbonate were dissolved in water, and the resulting solution was added thereto. A reaction was performed by using 0.1 equivalent of tetrakistriphenylphosphine as a catalyst. After the reaction was terminated, the resulting product was cooled to room temperature, and the product was precipitated as a solid by pouring water to the product. After the produced solid was separated from the solution through a filter, 1.31 g (yield 50%) of Compound 1 could be obtained after recrystallization by using chloroform.

HR LC/MS/MS m/z calcd for $C_{58}H_{34}B_2F_4N_6$(M+): 912.2967; found: 912.2964.

Preparation Example 2. Compound 2

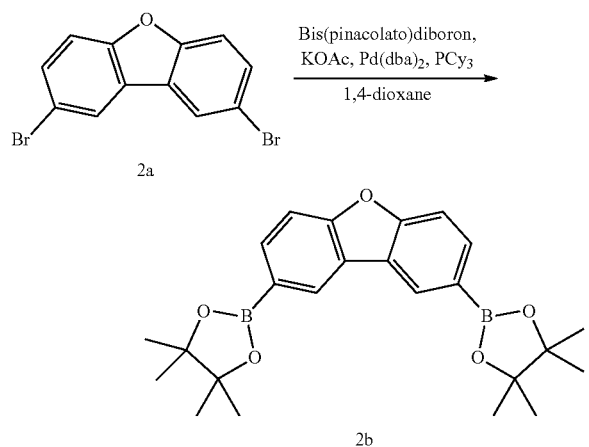

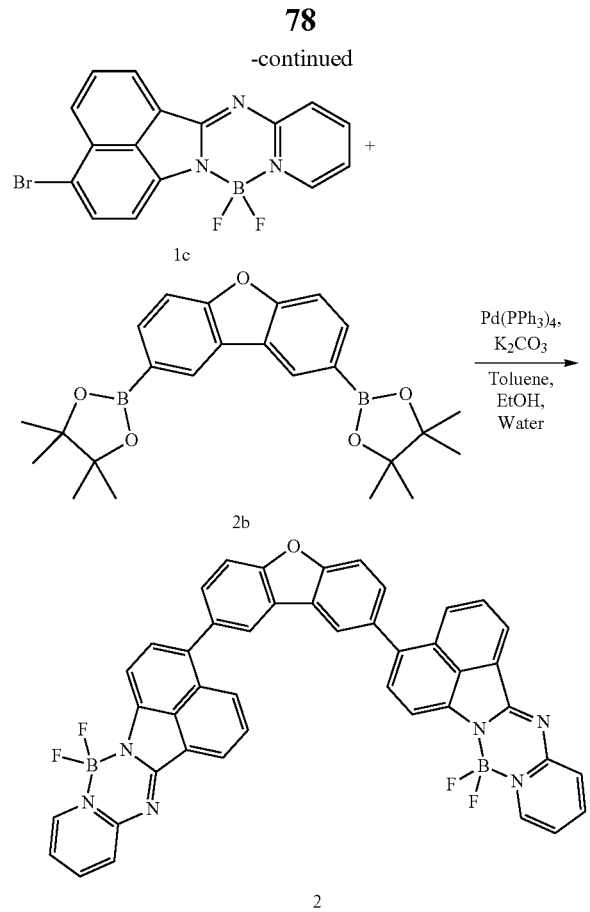

1) Synthesis of Compound 2b

A synthesis was performed in the same manner as in the synthesis of Compound 1b, except that 2.00 g (6.14 mmol, 1 equivalent) of Compound 2a was used instead of using Compound 1a. 2.32 g (yield 90%) of Compound 2b could be obtained.

2) Synthesis of Compound 2

A synthesis was performed in the same manner as in the synthesis of Compound 1, except that 2.32 g (5.52 mmol, 1 equivalent) of Compound 2b was used instead of using Compound 1b. 2.40 g (yield 58%) of Compound 2 could be obtained.

HR LC/MS/MS m/z calcd for $C_{44}H_{24}B_2F_4N_6O$ (M+): 750.2134; found: 750.2140.

Preparation Example 3. Compound 3

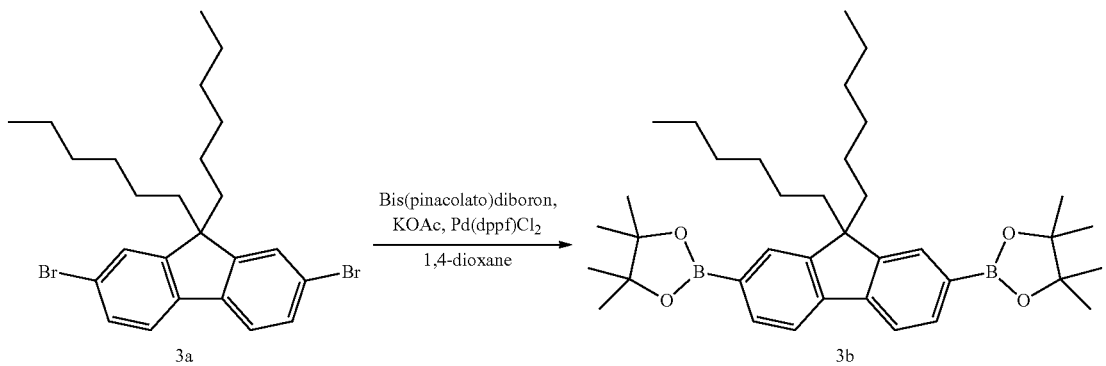

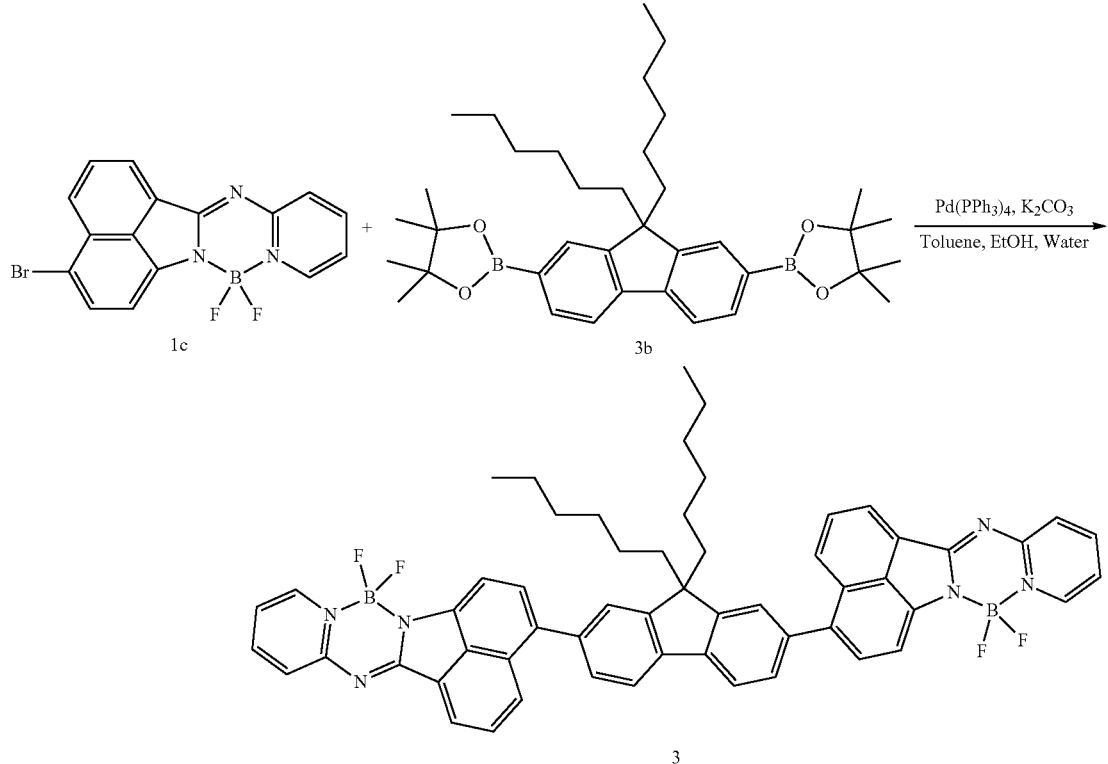

1) Synthesis of Compound 3b

A synthesis was performed in the same manner as in the synthesis of Compound 1b, except that 2.00 g (4.06 mmol, 1 equivalent) of Compound 3a was used instead of using Compound 1a, and Pd(dppf)Cl$_2$ was used instead of Pd(dba)$_2$ and PCy$_3$ as the catalyst. 1.79 g (yield 75%) of Compound 3b could be obtained.

2) Synthesis of Compound 3

A synthesis was performed in the same manner as in the synthesis of Compound 1, except that 1.79 g (3.05 mmol, 1 equivalent) of Compound 3b was used instead of using Compound 1b. 1.71 g (yield 55%) of Compound 3 could be obtained.

HR LC/MS/MS m/z calcd for $C_{57}H_{50}B_2F_4N_6$(M+): 916.4219; found: 916.4225.

Preparation Example 4. Compound 4

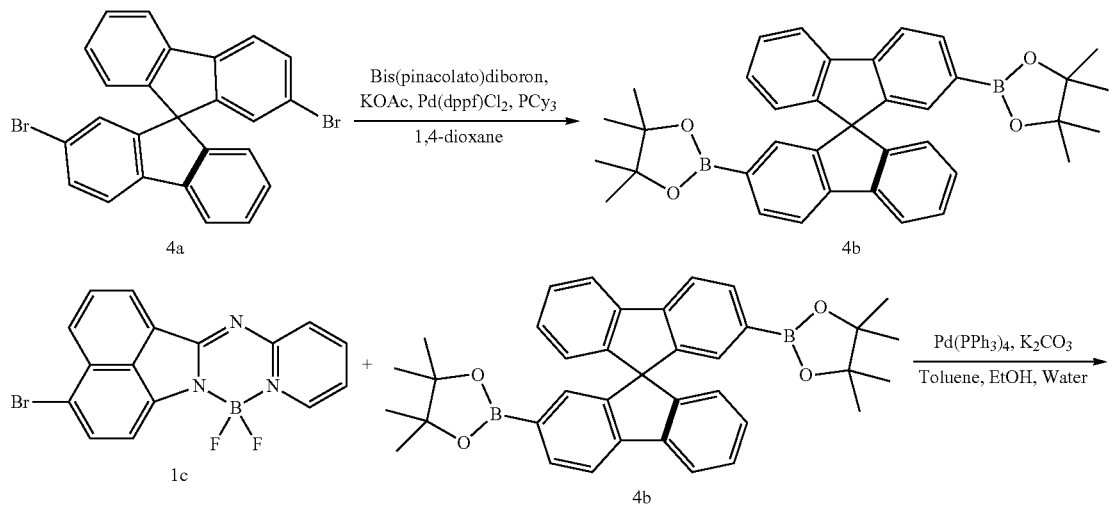

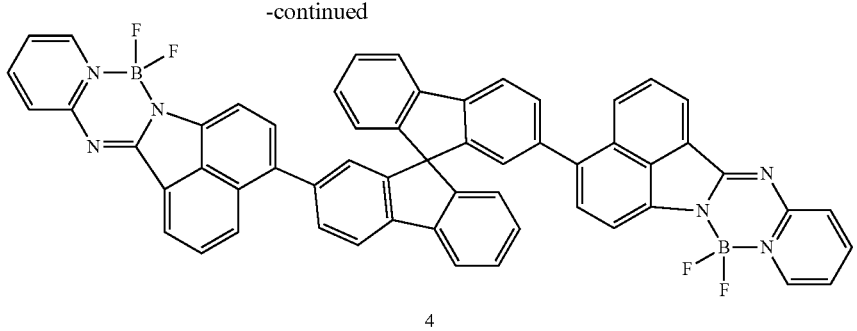

4

1) Synthesis of Compound 4b
A synthesis was performed in the same manner as in the synthesis of Compound 3b, except that 2.00 g (4.22 mmol, 1 equivalent) of Compound 4a was used instead of using Compound 3a. 1.99 g (yield 83%) of Compound 4b could be obtained.

2) Synthesis of Compound 4
A synthesis was performed in the same manner as in the synthesis of Compound 1, except that 1.99 g (3.50 mmol, 1 equivalent) of Compound 4b was used instead of using Compound 1b. 3.96 g (yield 42%) of Compound 4 could be obtained.

HR LC/MS/MS m/z calcd for $C_{57}H_{32}B_2F_4N_6$(M+): 898.2811; found: 898.2805.

Preparation Example 5. Compound 5

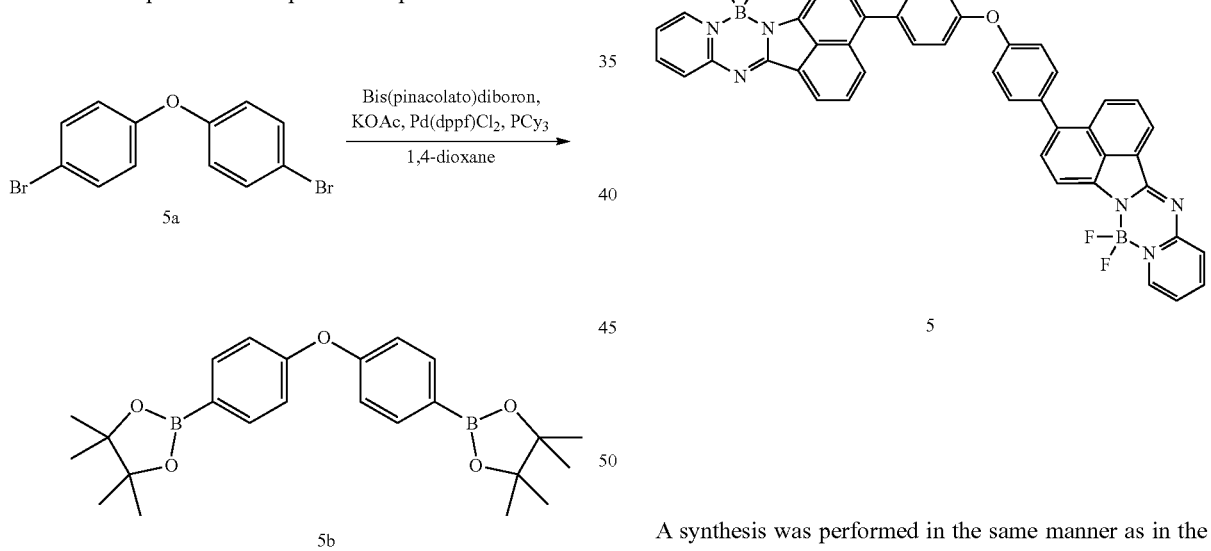

A synthesis was performed in the same manner as in the synthesis of Compound 3b, except that 2.00 g (6.10 mmol, 1 equivalent) of Compound 5a was used instead of using Compound 3a. 1.42 g (yield 55%) of Compound 5b could be obtained.

2) Synthesis of Compound 5
A synthesis was performed in the same manner as in the synthesis of Compound 1, except that 1.42 g (3.35 mmol, 1 equivalent) of Compound 5b was used instead of using Compound 1b. 1.08 g (yield 43%) of Compound 5 could be obtained.

HR LC/MS/MS m/z calcd for $C_{44}H_{26}B_2F_4N_6O$ (M±): 752.2290; found: 752.2289.

Preparation Example 6. Compound 6
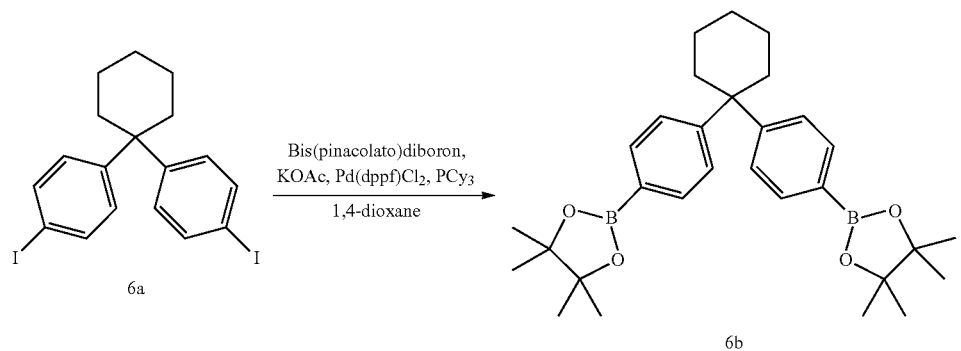
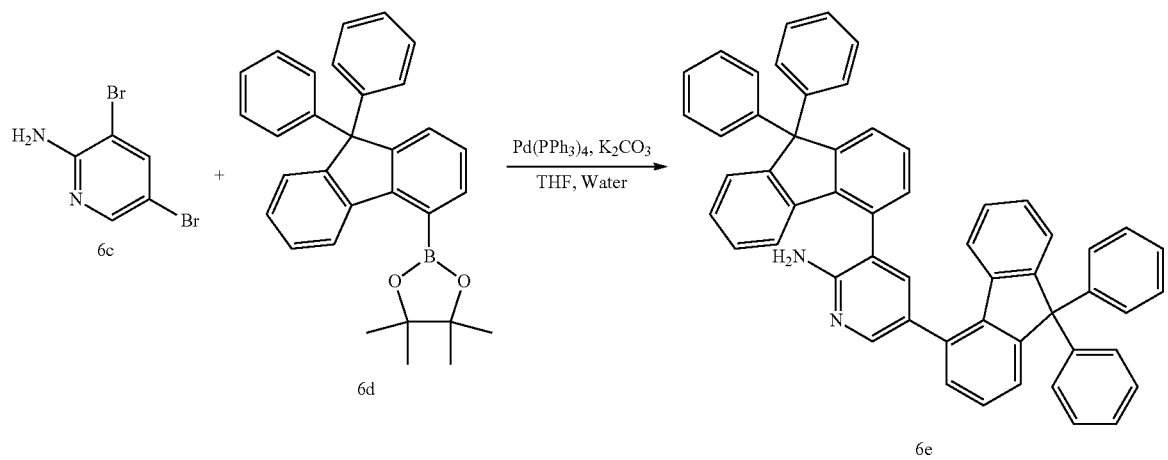
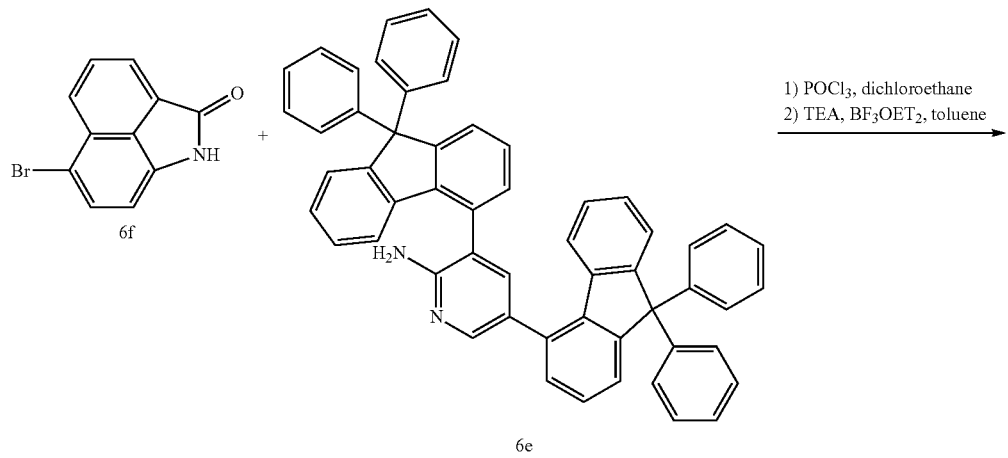

-continued
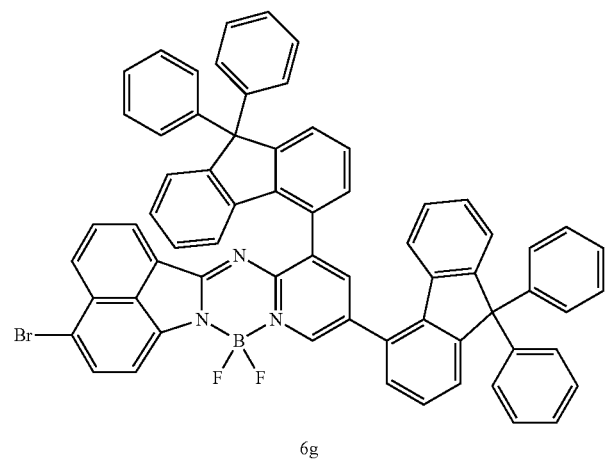
6g
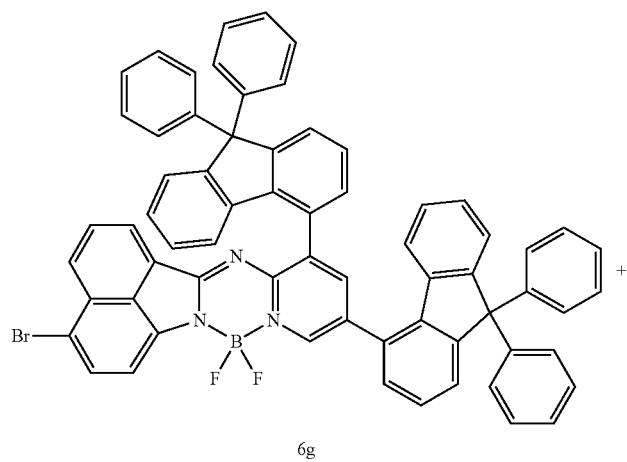
6g
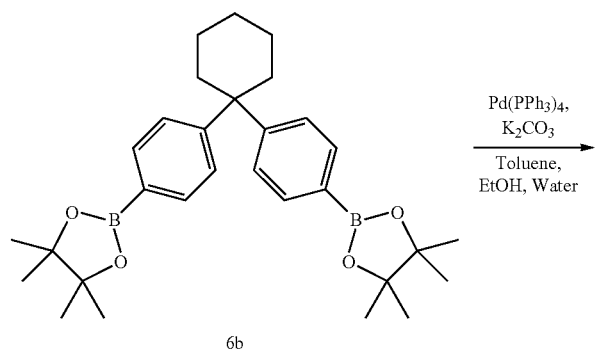
6b

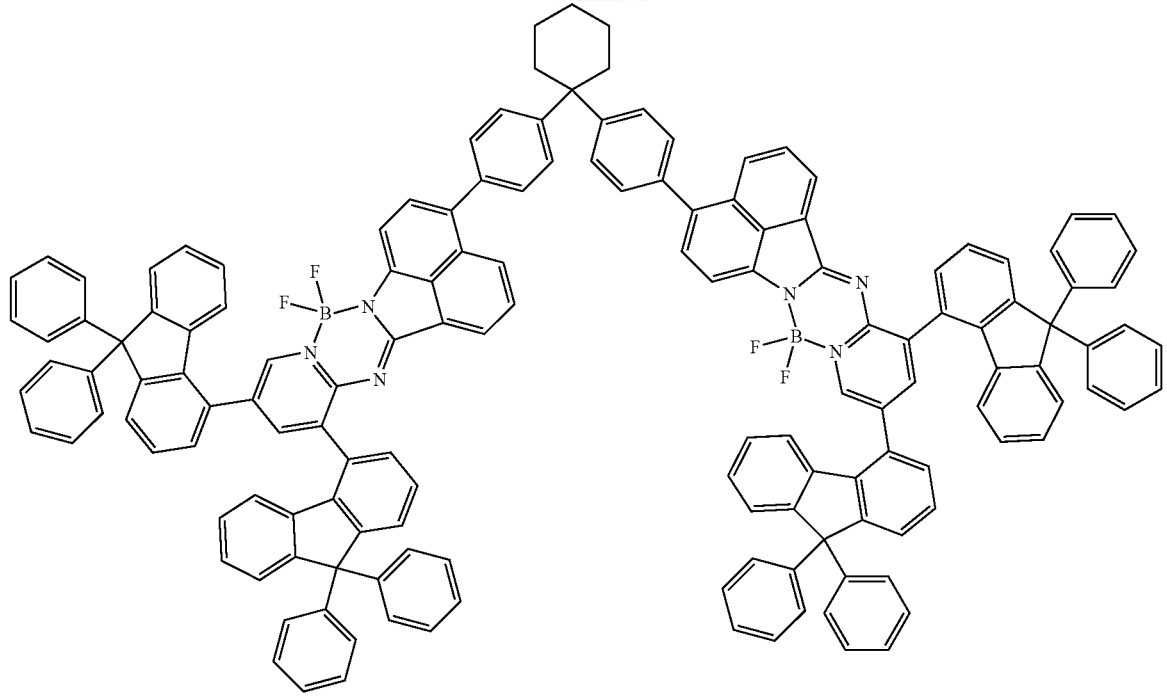

6

1) Synthesis of Compound 6b

A synthesis was performed in the same manner as in the synthesis of Compound 3b, except that 2.00 g (4.10 mmol, 1 equivalent) of Compound 6a was used instead of using Compound 3a. 0.70 g (yield 35%) of Compound 6b could be obtained.

2) Synthesis of Compound 6e 2.00 g (7.94 mmol, 1 equivalent) of Compound 6c and 2.5 equivalents of Compound 6d were stirred under a tetrahydrofuran solvent, 3 equivalents of potassium carbonate were dissolved in water, and the resulting solution was added thereto. A reaction was performed under a nitrogen atmosphere at 80° C. by using 0.1 equivalent of tetrakistriphenylphosphine as a catalyst. After the reaction was terminated, the resulting product was cooled to room temperature, and water was poured to the product. Extraction was performed by using chloroform, and the moisture was removed over anhydrous magnesium sulfate. After the residue was concentrated through distillation under reduced pressure, 4.50 g (yield 78%) of Compound 6e could be obtained through column purification.

3) Synthesis of Compound 6g 3.65 g (yield 90%) of Compound 6g could be obtained by the method of [Reaction Formula 1] using 1.00 g (4.03 mmol, 1 equivalent) of Compound 6f and 1.5 equivalents of 6e.

4) Synthesis of Compound 6

A synthesis was performed in the same manner as in the synthesis of Compound 1, except that 0.70 g (1.43 mmol, 1 equivalent) of Compound 6b was used instead of using Compound 1b, and 2.2 equivalents of Compound 6g were used instead of using Compound 1c. 2.41 g (yield 81%) of Compound 6 could be obtained.

HR LC/MS/MS m/z calcd for $C_{150}H_{100}B_2F_4N_6$(M+): 2082.8132; found: 2082.8140.

Preparation Example 7. Compound 7

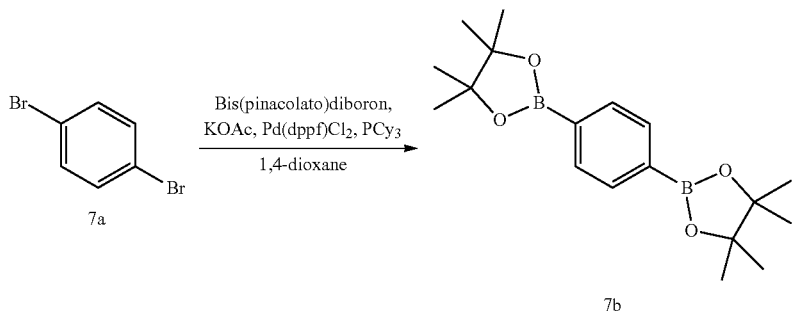

89
-continued
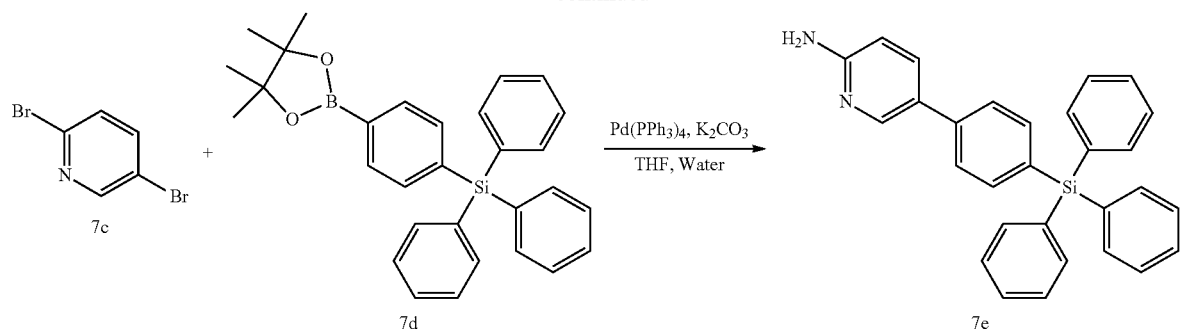
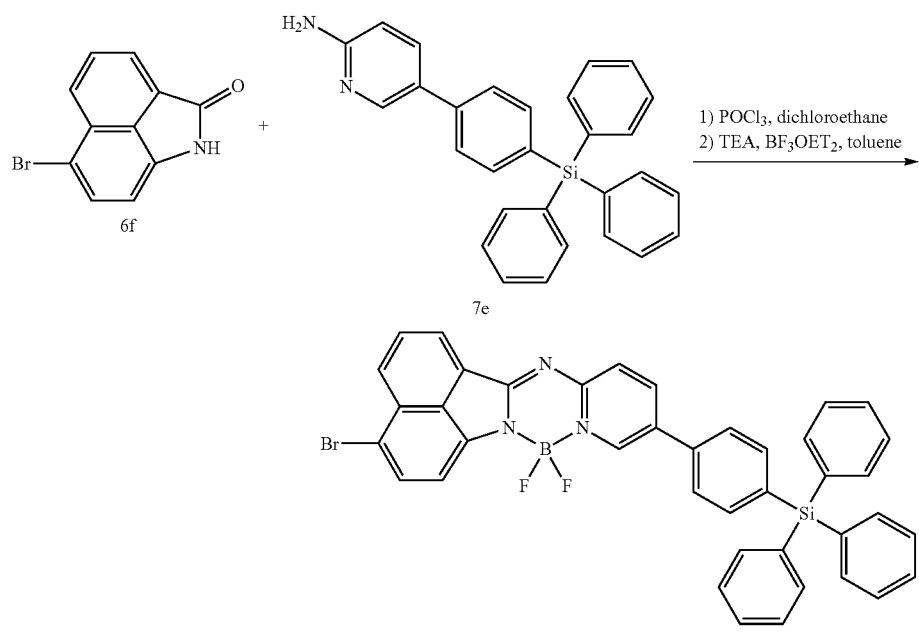
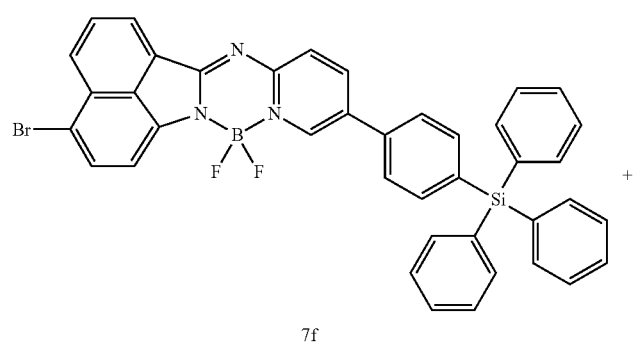
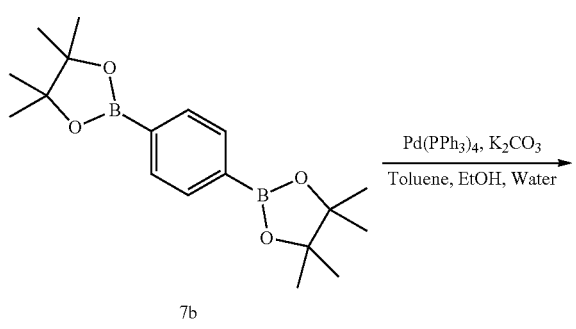

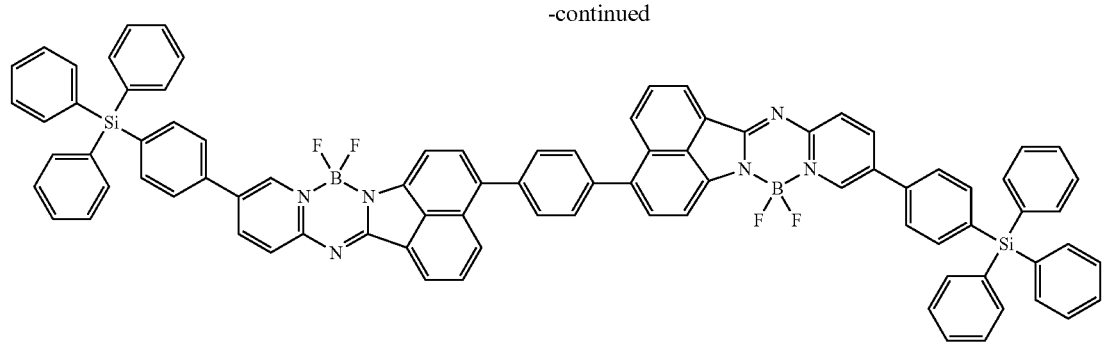

7

1) Synthesis of Compound 7b
A synthesis was performed in the same manner as in the synthesis of Compound 3b, except that 2.00 g (8.48 mmol, 1 equivalent) of Compound 7a was used instead of using Compound 3a. 2.10 g (yield 75%) of Compound 7b could be obtained.

2) Synthesis of Compound 7e
A synthesis was performed in the same manner as in the synthesis of Compound 6e, except that 2.00 g (11.6 mmol, 1 equivalent) of Compound 7c was used instead of using Compound 6c, and 1.5 equivalents of Compound 7d were used instead of Compound 6d. 3.98 g (yield 80%) of Compound 7e could be obtained.

3) Synthesis of Compound 7f
2.42 g (yield 85%) of Compound 7f could be obtained by the method of [Reaction Formula 1] using 1.00 g (4.03 mmol, 1 equivalent) of Compound 6f and 1.5 equivalents of 7e.

4) Synthesis of Compound 7
A synthesis was performed in the same manner as in the synthesis of Compound 1, except that 0.50 g (1.52 mmol, 1 equivalent) of Compound 7b was used instead of using Compound 1b, and 2.2 equivalents of Compound 7f were used instead of using Compound 1c. 1.93 g (yield 48%) of Compound 7 could be obtained.

HR LC/MS/MS m/z calcd for $C_{86}H_{58}B_2F_4N_6Si_2$ (M+): 1328.4384; found: 1328.4380.

Preparation Example 8. Compound 8

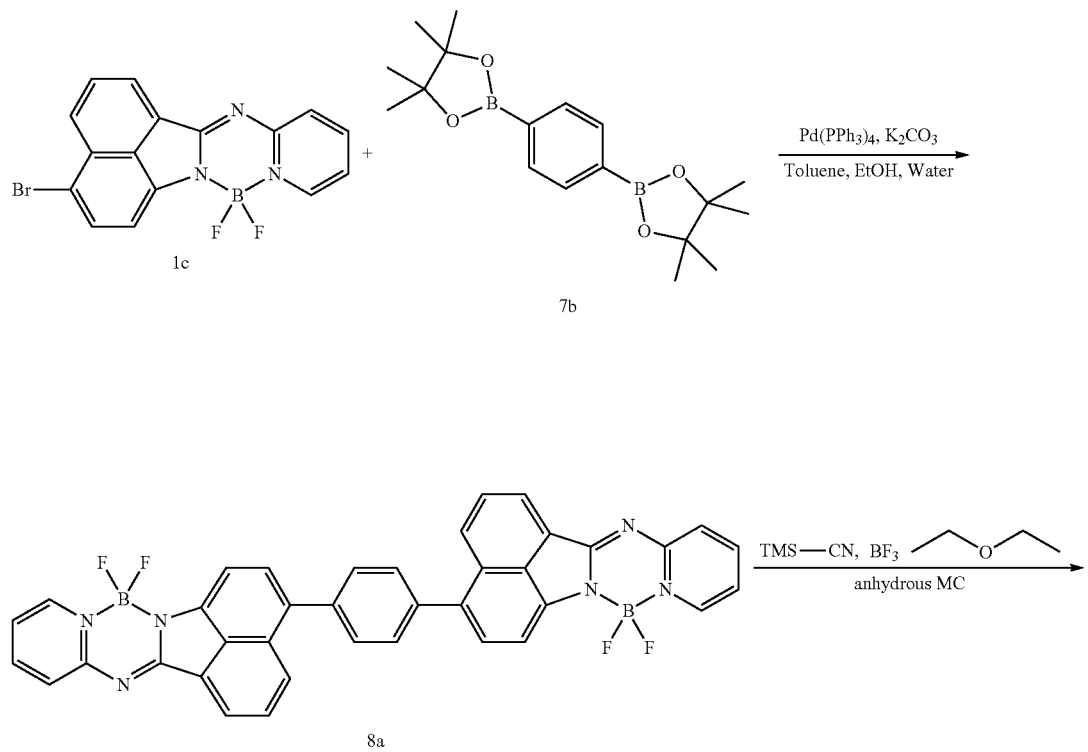

-continued

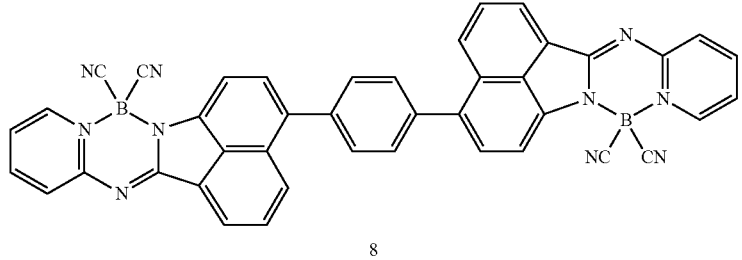

8

1) Synthesis of Compound 8a

A synthesis was performed in the same manner as in the synthesis of Compound 1, except that 1.00 g (3.03 mmol, 1 equivalent) of Compound 7b was used instead of using Compound 1b. 1.04 g (yield 52%) of Compound 8a could be obtained.

2) Synthesis of Compound 8

1.04 g (1.58 mmol, 1 equivalent) of Compound 8a was dissolved in anhydrous methylene chloride, 10 equivalents of trimethylsilylcyanide were put thereinto under a $N_2$ atmosphere, and 2 equivalents of trifluoroboron ethylether were slowly added thereto. The reaction was confirmed through HPLC, and after the reaction was terminated, the product was washed with a sodium bicarbonate solution. After extraction was performed with chloroform and water, the moisture was removed from the organic layer over anhydrous magnesium sulfate. The solvent was removed through distillation under reduced pressure, and the residue was recrystallized by using a chloroform solvent. 0.83 g (yield 76%) of Compound 8 could be obtained.

HR LC/MS/MS m/z calcd for $C_{42}H_{22}B_2N_{10}$ (M+): 688.2215; found: 688.2213.

Preparation Example 9. Compound 9

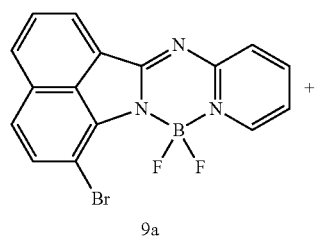

9a

-continued

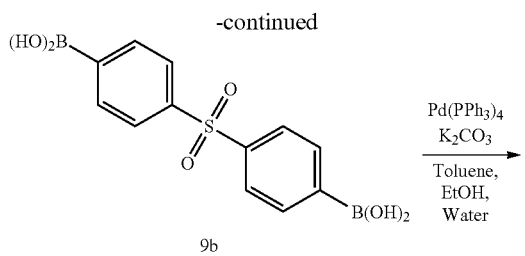

9b

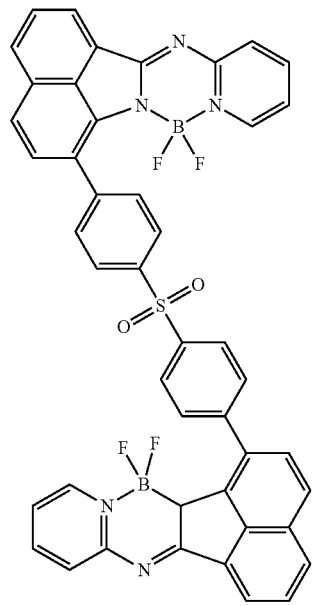

9

1) Synthesis of Compound 9

A synthesis was performed in the same manner as in the synthesis of Compound 1, except that 1.00 g (3.27 mmol, 1 equivalent) of Compound 9b was used instead of using Compound 1b, and 2.2 equivalents of Compound 9a were used instead of using Compound 1c. 1.57 g (yield 60%) of Compound 9 could be obtained.

HR LC/MS/MS m/z calcd for $C_{44}H_{26}B_2F_4N_6O_2S$ (M+): 800.1960; found: 800.1963.

Preparation Example 10. Compound 10
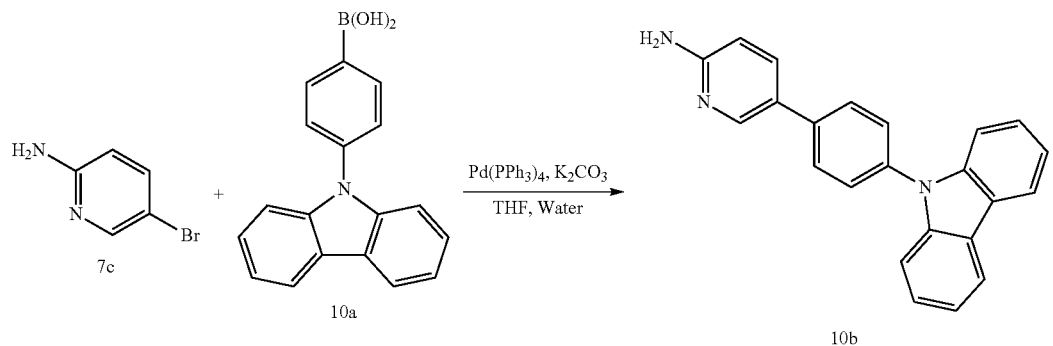
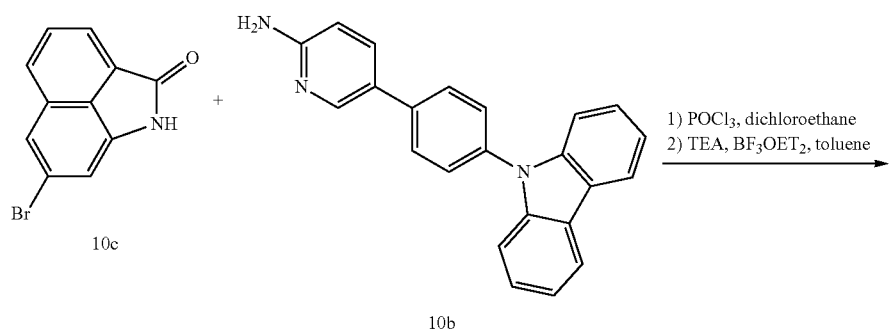
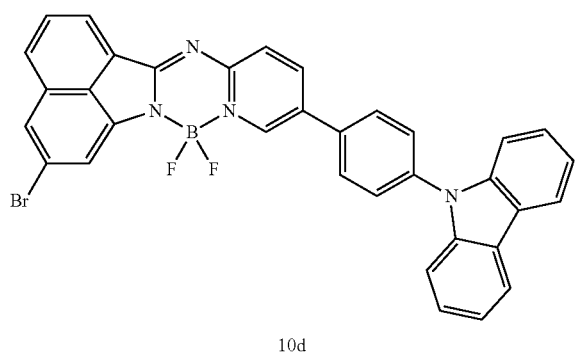
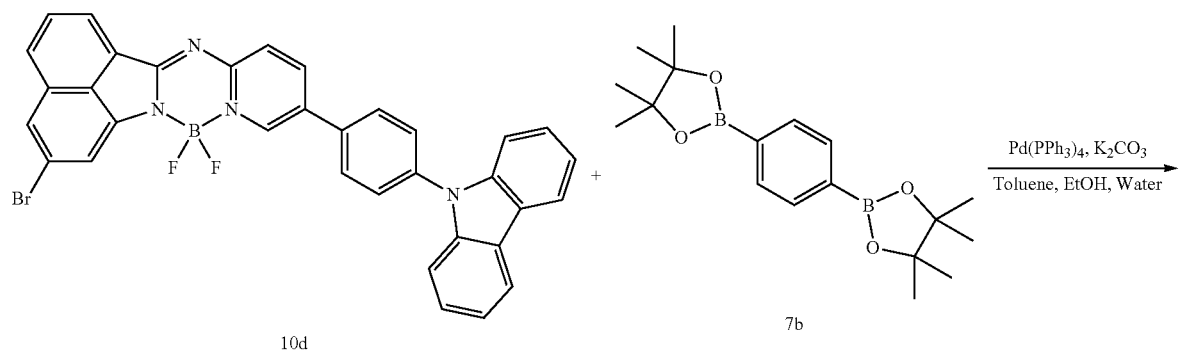

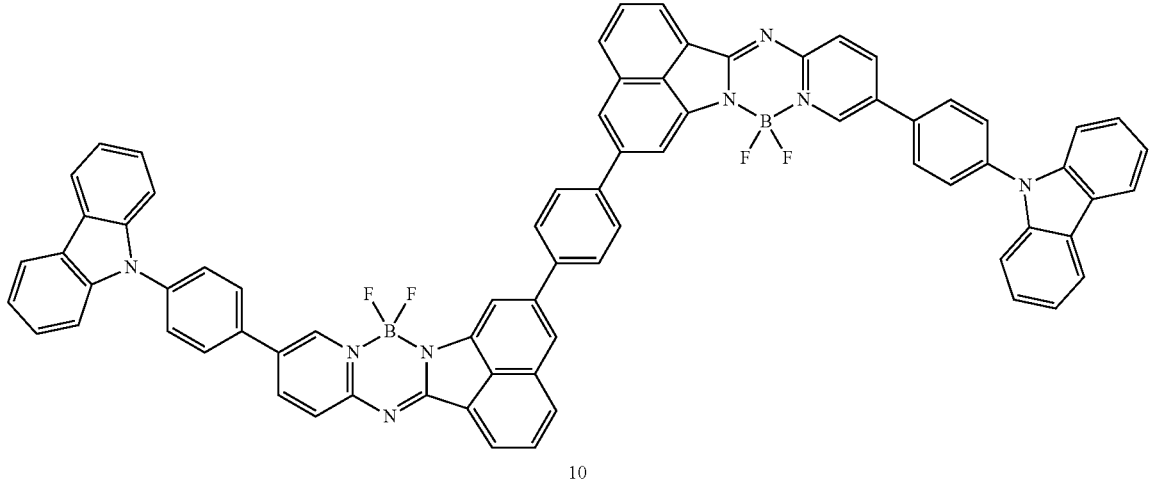

10

1) Synthesis of Compound 10b

A synthesis was performed in the same manner as in the synthesis of Compound 6e, except that 2.00 g (11.6 mmol, 1 equivalent) of Compound 7c was used instead of using Compound 6c, and 1.5 equivalents of Compound 10a were used instead of Compound 6d. 3.03 g (yield 78%) of Compound 10b could be obtained.

2) Synthesis of Compound 10d 1.73 g (yield 70%) of Compound 10d could be obtained by the method of [Reaction Formula 1] using 1.00 g (4.03 mmol, 1 equivalent) of Compound 10c and 1.5 equivalents of 10b.

3) Synthesis of Compound 10

A synthesis was performed in the same manner as in the synthesis of Compound 1, except that 0.40 g (1.21 mmol, 1 equivalent) of Compound 7b was used instead of using Compound 1b, and 2.2 equivalents of Compound 10d were used instead of using Compound 1c. 1.01 g (yield 73%) of Compound 10 could be obtained.

HR LC/MS/MS m/z calcd for $C_{74}H_{44}B_2F_4N_8$(M+): 1142.3811; found: 1142.3808.

Preparation Example 11. Synthesis Example 11

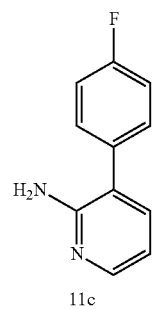

11c

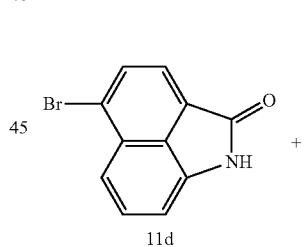

11d

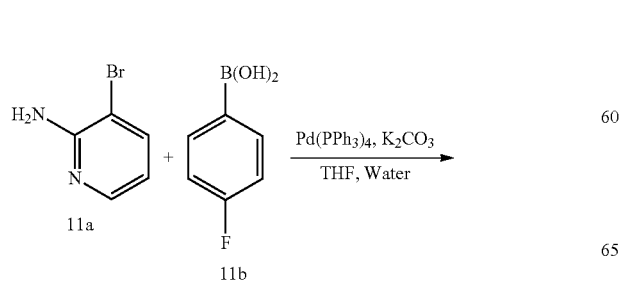

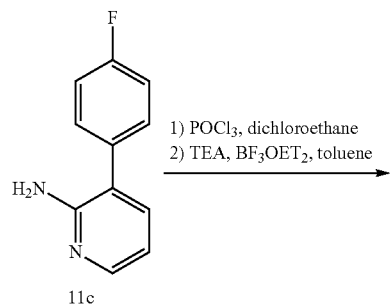

-continued

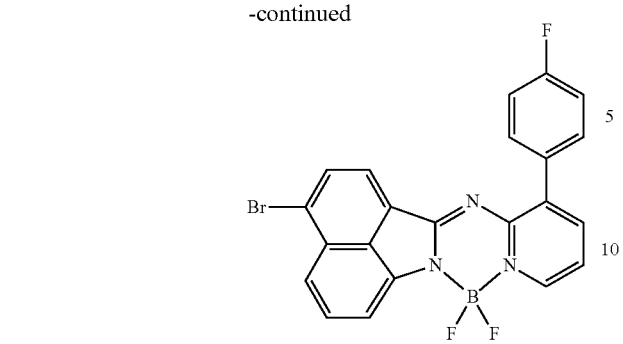

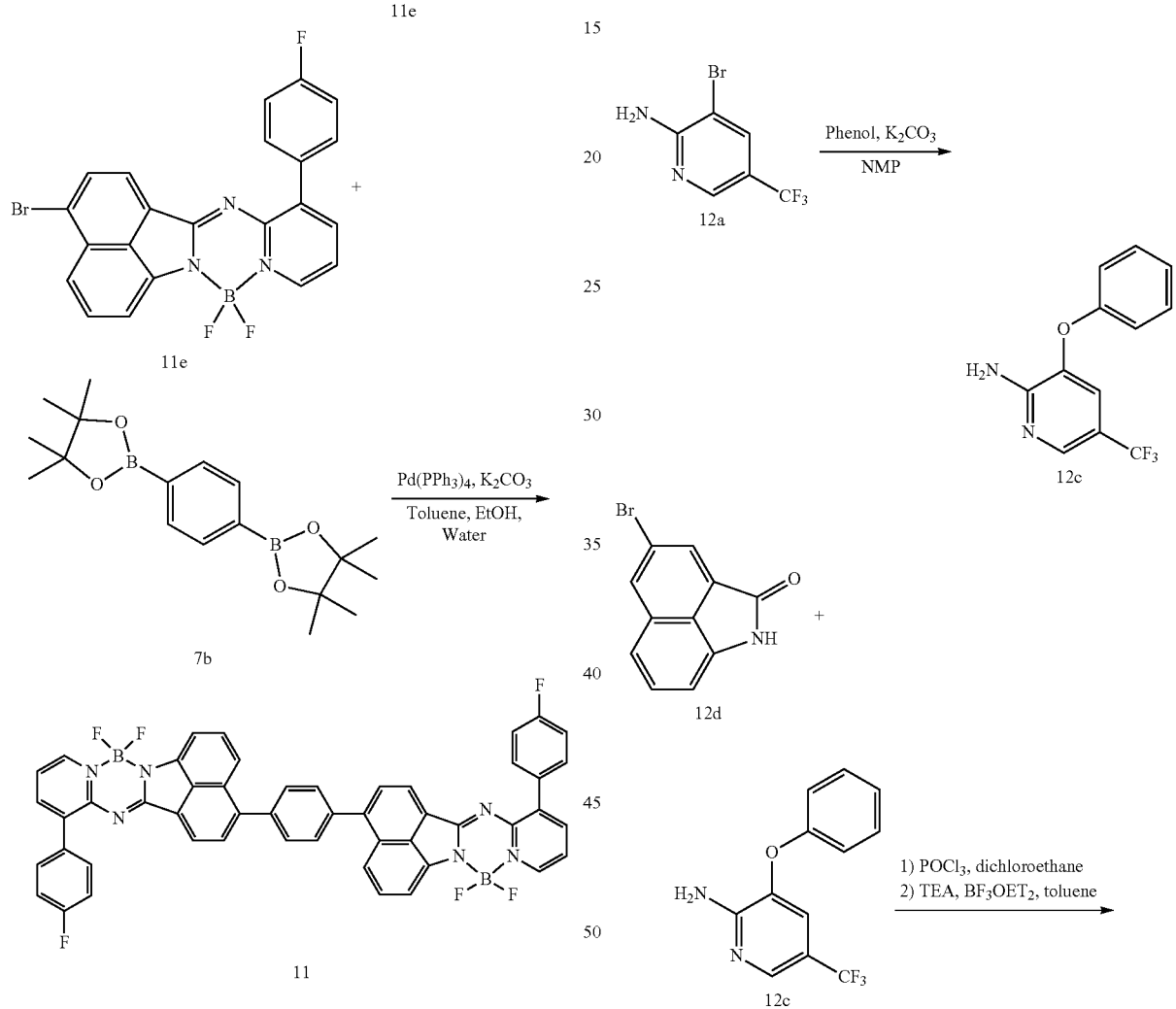

3) Synthesis of Compound 11

A synthesis was performed in the same manner as in the synthesis of Compound 1, except that 0.40 g (1.21 mmol, 1 equivalent) of Compound 7b was used instead of using Compound 1b, and 2.2 equivalents of Compound 11e were used instead of using Compound 1c. 0.708 g (yield 69%) of Compound 11 could be obtained.

HR LC/MS/MS m/z calcd for $C_{50}H_{28}B_2F_6N_6(M+)$: 848.2466; found: 848.2471.

Preparation Example 12. Synthesis Example 12

1) Synthesis of Compound 11c

A synthesis was performed in the same manner as in the synthesis of Compound 6e, except that 3.00 g (17.3 mmol, 1 equivalent) of Compound 11a was used instead of using Compound 6c, and 2 equivalents of Compound 11b were used instead of Compound 6d. 1.53 g (yield 47%) of Compound 11c could be obtained.

2) Synthesis of Compound 11e 1.41 g (yield 75%) of Compound 11e could be obtained by the method of [Reaction Formula 1] using 1.00 g (4.03 mmol, 1 equivalent) of Compound 11d and 1.5 equivalents of 11c.

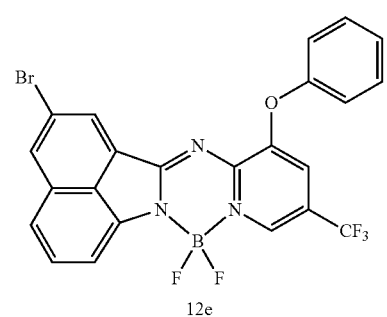

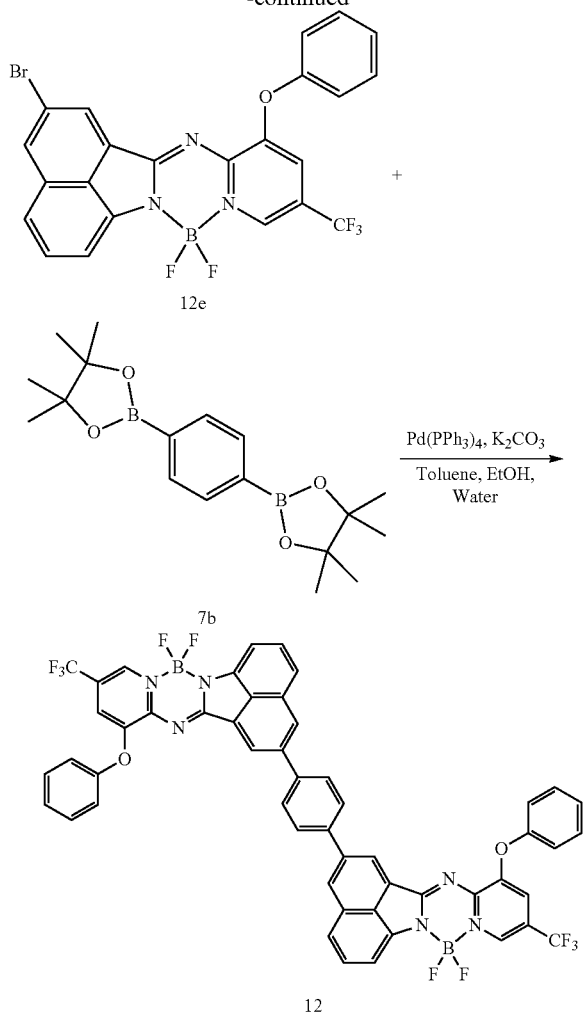

1) Synthesis of Compound 12c 2.00 g (12.4 mmol, 1 equivalent) of Compound 12a, 10 equivalents of phenol, and 5 equivalents of potassium carbonate were stirred under an NMP solvent. The temperature was adjusted to 90° C., and a reaction was performed under a nitrogen atmosphere. After the reaction was terminated, the resulting product was cooled to room temperature and a solid was formed by pouring HCl(aq) to the resulting product. After the produced solid was separated from the solution through a filter, the solid was dissolved in a chloroform solution and extraction was performed by using water. After the remaining moisture in the organic layer was removed over anhydrous magnesium sulfate, the residue was concentrated through distillation under reduced pressure, and 2.90 g (yield 92%) of Compound 12b could be obtained through column purification.

2) Synthesis of Compound 12d 2.70 g (yield 84%) of Compound 12d could be obtained by the method of [Reaction Formula 1] using 1.50 g (6.05 mmol, 1 equivalent) of Compound 12c and 1.5 equivalents of 12b.

3) Synthesis of Compound 12

A synthesis was performed in the same manner as in the synthesis of Compound 1, except that 0.45 g (1.36 mmol, 1 equivalent) of Compound 7b was used instead of using Compound 1b, and 2.2 equivalents of Compound 12d were used instead of using Compound 1c. 0.935 g (yield 70%) of Compound 12 could be obtained.

HR LC/MS/MS m/z calcd for $C_{52}H_{28}B_2F_{10}N_6O_2$ (M+): 980.2300; found: 980.2305.

Preparation Example 13. Synthesis Example 13

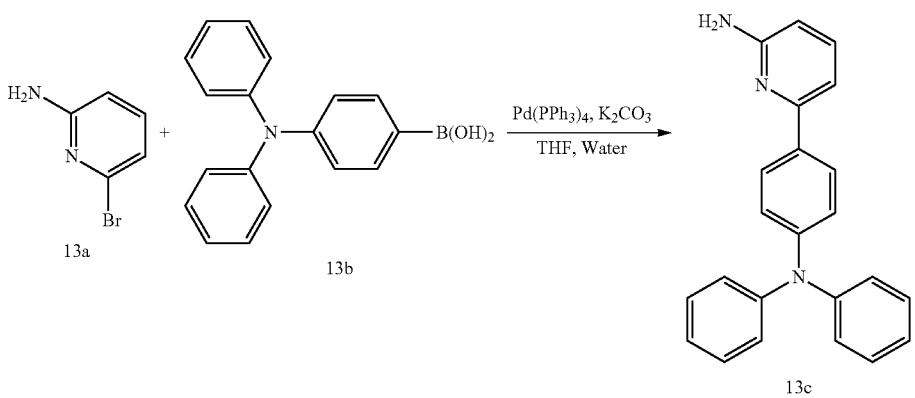

-continued

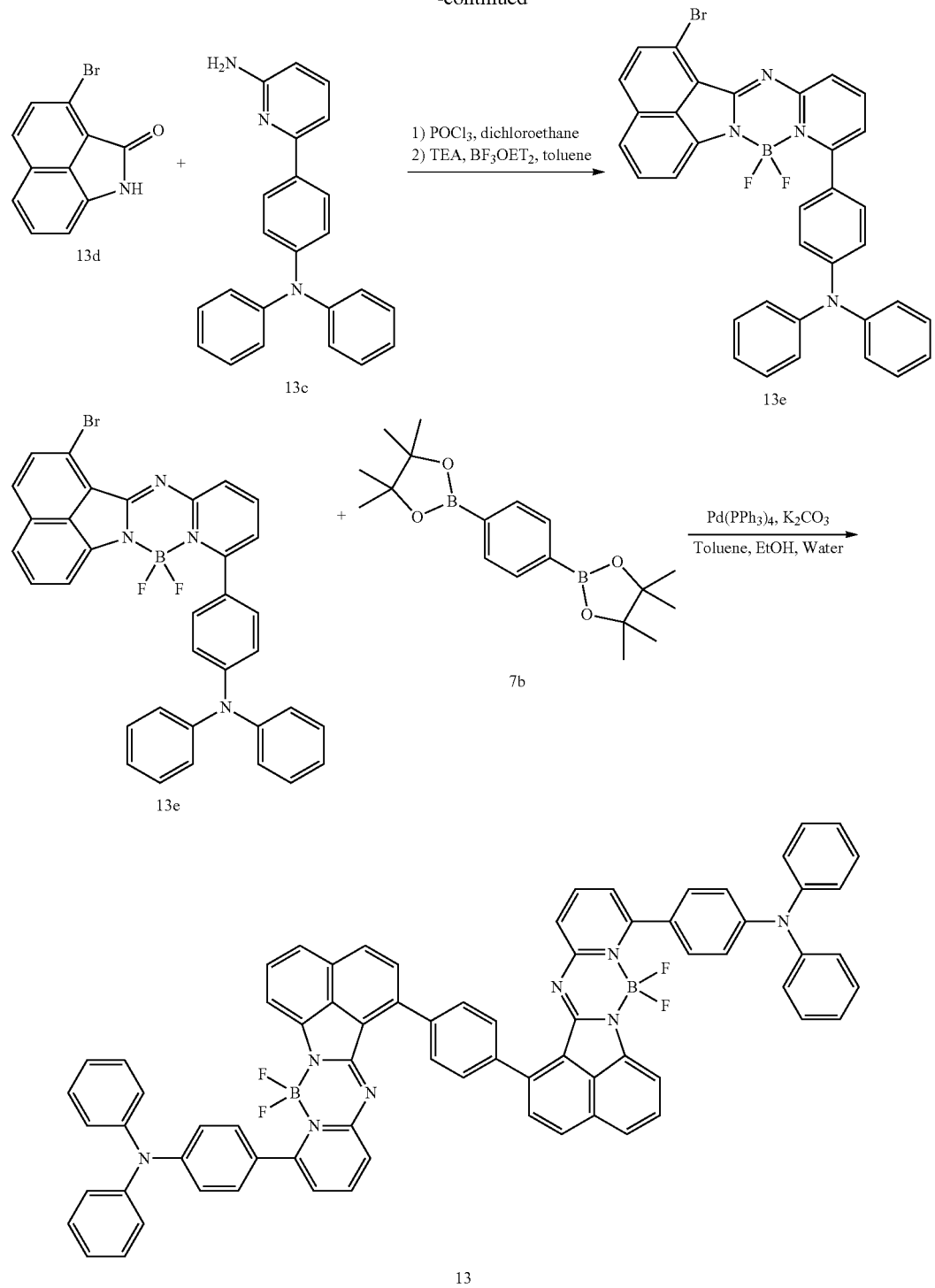

1) Synthesis of Compound 13c

A synthesis was performed in the same manner as in the synthesis of Compound 6e, except that 2.00 g (11.6 mmol, 1 equivalent) of Compound 13a was used instead of using Compound 6c, and 1.5 equivalents of Compound 13b were used instead of Compound 6d. 3.20 g (yield 82%) of Compound 13c could be obtained.

2) Synthesis of Compound 13e 1.93 g (yield 78%) of Compound 13e could be obtained by the method of [Reaction Formula 1] using 1.00 g (4.03 mmol, 1 equivalent) of Compound 13d and 1.5 equivalents of 13c.

3) Synthesis of Compound 13

A synthesis was performed in the same manner as in the synthesis of Compound 1, except that 0.40 g (1.21 mmol, 1 equivalent) of Compound 7b was used instead of using Compound 1b, and 2.2 equivalents of Compound 13e were used instead of using Compound 1c. 1.05 g (yield 76%) of Compound 13 could be obtained.

HR LC/MS/MS m/z calcd for $C_{74}H_{48}B_2F_4N_8$(M+): 1146.4124; found: 1146.4118.

Preparation Example 14. Synthesis Example 14

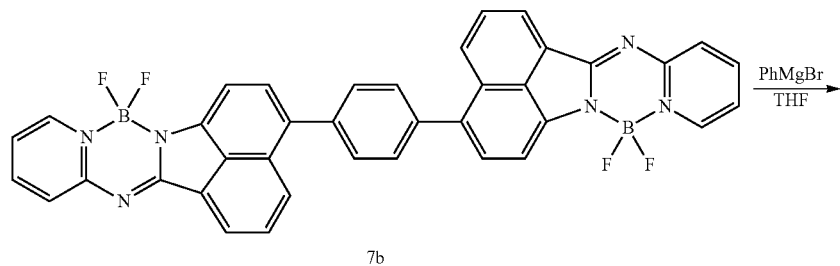

7b

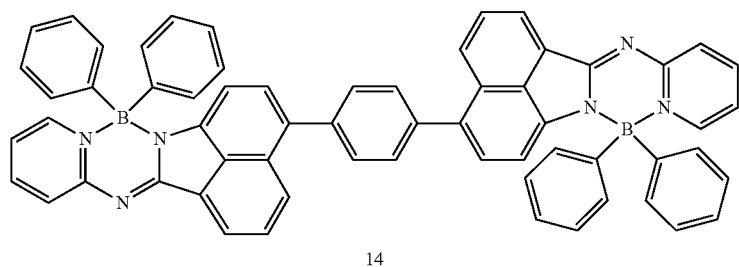

14

1) Synthesis of Compound 14

1.50 g (2.27 mmol, 1 equivalent) of Compound 7b was dissolved in THF, and the resulting solution was prepared at a dropping funnel, and was slowly dropped to 2.2 equivalents of a PhMgBr solution dissolved in a THF solvent. After the reaction was terminated, the reaction was quenched by adding an aqueous NH₄Cl solution thereto. After extraction with chloroform, the remaining moisture was removed. After the residue was concentrated through distillation under reduced pressure, 1.21 g (yield 60%) of Compound 14 could be obtained through column purification.

HR LC/MS/MS m/z calcd for $C_{62}H_{42}B_2N_6$ (M+): 892.3657; found: 892.3652.

Preparation Example 15. Synthesis Example 15

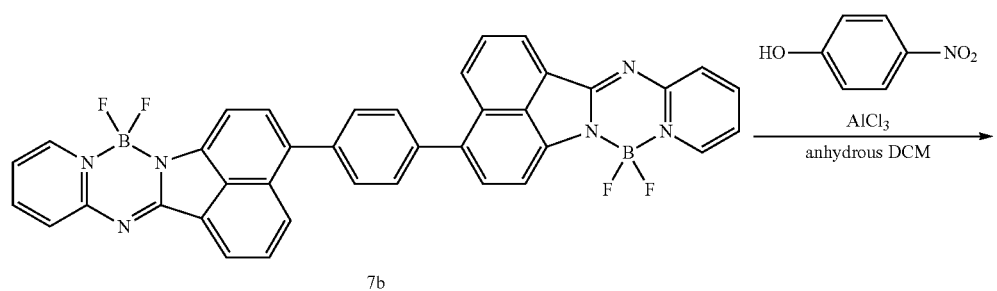

7b

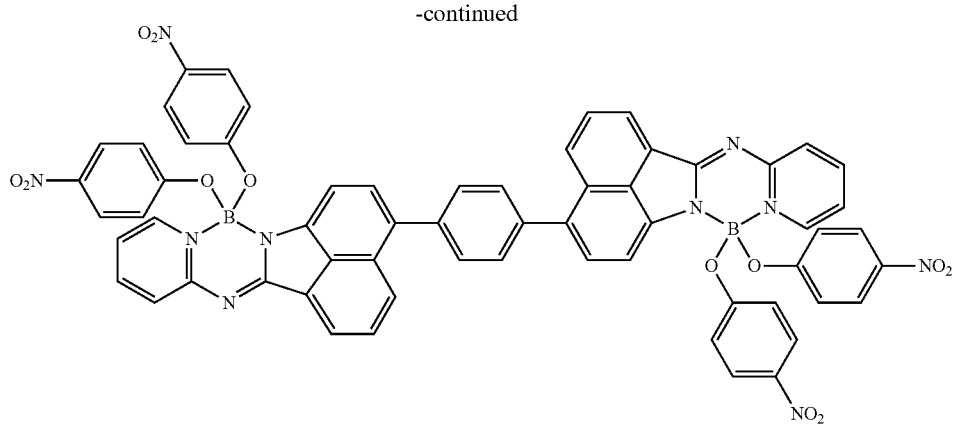

15

1) Synthesis of Compound 15

1.50 g (2.27 mmol) of Compound 7b was added to a dichloromethane solvent in which aluminum chloride was dissolved, and the resulting mixture was heated and stirred under a nitrogen atmosphere at 55° C. for about 10 minutes. Nitrophenol dissolved in a dichloromethane solvent was slowly added dropwise thereto by using a syringe, and the resulting mixture was heated and stirred. After the reaction was terminated, alumina was removed through silica gel column and the residue was purified. 1.34 g (yield 52%) of Compound 15 could be obtained.

HR LC/MS/MS m/z calcd for $C_{62}H_{38}B_2N_{10}O_{12}$ (M+): 1136.2857; found: 1136.2851.

Physical properties of Compounds 1 to 15 are shown in the following Table 1.

TABLE 1

| Compound | Solution Abs. (nm) | Solution PL (nm) | Q.E. (%) | FWHM (nm) |
| --- | --- | --- | --- | --- |
| 1 | 490 | 558 | 85 | 79 |
| 2 | 462 | 528 | 82 | 81 |
| 3 | 466 | 533 | 80 | 82 |
| 4 | 468 | 535 | 84 | 80 |
| 5 | 483 | 560 | 75 | 85 |
| 6 | 478 | 538 | 85 | 71 |
| 7 | 470 | 525 | 88 | 73 |
| 8 | 462 | 512 | 89 | 78 |
| 9 | 452 | 503 | 79 | 76 |
| 10 | 465 | 518 | 88 | 79 |
| 11 | 468 | 520 | 87 | 77 |
| 12 | 464 | 515 | 85 | 75 |
| 13 | 466 | 515 | 84 | 76 |
| 14 | 461 | 512 | 87 | 77 |
| 15 | 462 | 511 | 86 | 79 |

The physical properties were measured after each of the compounds was prepared at a concentration of $10^{-5}$ M under a toluene solvent.

The Abs. was measured by using MEGA-2100 equipment manufactured by Scinco Co., Ltd., and the PL was measured by using FS-2 equipment manufactured by Scinco Co., Ltd.

Example 1

1.5 parts by weight of Compound 2 (maximum absorption wavelength 462 nm, maximum light emission wavelength 528 nm, and full width at half maximum 81 nm in a toluene solution) prepared in Preparation Example 2, 33.9 parts by weight of an acrylic binder, 59.3 parts by weight of a polyfunctional monomer (pentaerythritol triacrylate, Nippon Kayaku Co., Ltd.), 2.3 parts by weight of a bonding aid and a surfactant (KBM 503, Shinetsu), and 3.0 parts by weight of a photoinitiator (Tinuvin® 477, BASF) were dissolved in a solvent propylene glycol monomethyl ether acetate (PGEMA), such that the solid content was 21 wt %, thereby preparing a solution. After the mixed solution was sufficiently stirred, a thin film was coated onto a glass substrate, and then dried to prepare a color conversion film. The brightness spectrum of the prepared color conversion film was measured by a spectroradiometer (SR series manufactured by Topcon, Inc.). Specifically, the prepared color conversion film was stacked on one surface of a light guide plate of a backlight unit including an LED blue backlight (maximum light emission wavelength 450 nm) and the light guide plate, a prism sheet and a DBEF film were stacked on the color conversion film, and then an initial value was set, such that the luminance of the blue LED light was 600 nit based on the film.

Example 2

An experiment was performed in the same manner as in Example 1, except that in Example 1, Compound 4 (maximum absorption wavelength 468 nm, maximum light emission wavelength 535 nm, and full width at half maximum 80 nm in a toluene solution) was used instead of Compound 2.

Example 3

An experiment was performed in the same manner as in Example 1, except that in Example 1, Compound 6 (maximum absorption wavelength 478 nm, maximum light emission wavelength 538 nm, and full width at half maximum 71 nm in a toluene solution) was used instead of Compound 2.

Example 4

An experiment was performed in the same manner as in Example 1, except that in Example 1, Compound 7 (maximum absorption wavelength 470 nm, maximum light emission wavelength 525 nm, and full width at half maximum 73 nm in a toluene solution) was used instead of Compound 2.

Example 5

An experiment was performed in the same manner as in Example 1, except that in Example 1, Compound 8 (maximum absorption wavelength 462 nm, maximum light emission wavelength 512 nm, and full width at half maximum 78 nm in a toluene solution) was used instead of Compound 2.

Example 6

An experiment was performed in the same manner as in Example 1, except that in Example 1, Compound 14 (maximum absorption wavelength 461 nm, maximum light emission wavelength 512 nm, and full width at half maximum 77 nm in a toluene solution) was used instead of Compound 2.

Comparative Example 1

An experiment was performed in the same manner as in Example 1, except that in Example 2, a commercially available Dye Y-083 (manufactured by BASF Corporation) was used instead of Compound 2.

Comparative Example 2

An experiment was performed in the same manner as in Example 1, except that in Example 1, the following Dye Comparative Compound (Chem. Eur. J. 2015, 21, 12996-13003.) was used instead of Compound 2.

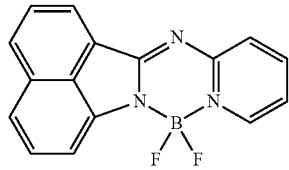

[Comparative Compound 1]

The light emission wavelengths, quantum efficiencies, and Abs. intensity ratios of the thin films in Examples 1 to 4 and Comparative Examples 1 and 2 are measured and shown in Table 2.

TABLE 2

| | Compound | Thin film light emission wavelength λmax (nm) | FWHM (nm) | Quantum efficiency (QY, %) | Abs intensity ratio |
|---|---|---|---|---|---|
| Example 1 | 2 | 530 | 85 | 80.2 | 1.85 |
| Example 2 | 4 | 539 | 87 | 81.0 | 1.80 |
| Example 3 | 6 | 541 | 80 | 80.3 | 2.03 |
| Example 4 | 7 | 531 | 78 | 79.5 | 1.94 |
| Example 5 | 8 | 525 | 77 | 83.1 | 1.79 |
| Example 6 | 14 | 526 | 79 | 82.6 | 1.81 |
| Comparative Example 1 | Y-083 | 526 | 50 | 48.5 | 1.20 |
| Comparative Example 2 | Comparative Compound 1 | 512 | 81 | 80.4 | 1 |

In Table 2, the thin film light emission wavelength was measured by using FS-2 equipment manufactured by Scinco Co., Ltd., and the quantum efficiency was measured by using Quantaurus-QY equipment manufactured by Hamamatsu Corp. The Abs intensity ratio is a numerical value indicating a ratio when the intensity at the maximum absorption wavelength of Comparative Example 1 is set to 1, and MEGA-2100 equipment manufactured by Scinco Co., Ltd was used.

The invention claimed is:
1. A compound represented by the following Chemical Formula 1:

[Chemical Formula 1]

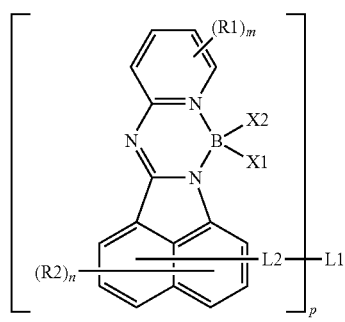

in Chemical Formula 1,
p is 2, and structures in the parenthesis are the same as each other,
L1 and L2 are the same as or different from each other, and are each independently a direct bond; —SiR$_{101}$R$_{102}$—; —SO$_2$—; —O—; —NR$_{103}$—; —C(=O)O—; a substituted or unsubstituted alkylene group; a substituted or unsubstituted cycloalkylene group; a substituted or unsubstituted arylene group; or a substituted or unsubstituted divalent heterocyclic group,
R1 and R2 are the same as or different from each other, and are each independently hydrogen; deuterium; a halogen group; a cyano group; a nitro group; a carbonyl group; a carboxyl group (—COOH); an ether group; a hydroxy group; —C(=O)NR$_{104}$R$_{105}$; —C(=O)OR$_{106}$; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted silyl group; a substituted or unsubstituted amine group; a substituted or unsubstituted alkylamine group; a substituted or unsubstituted arylamine group; a substituted or unsubstituted aryl group; or a substituted or unsubstituted heterocyclic group, or adjacent groups are optionally bonded to each other to form a ring,
m is an integer of 0 to 4, and when m is 2 or more, R1's are the same as or different from each other,
n is an integer of 0 to 5, and when n is 2 or more, R2's are the same as or different from each other,
X1 and X2 are the same as or different from each other, and are each independently a halogen group; a cyano group; an ether group; an ester group; a substituted or unsubstituted alkyl group; a substituted or unsubstituted alkynyl group; a substituted or unsubstituted alkoxy group;
a substituted or unsubstituted aryloxy group; a substituted or unsubstituted aryl group; or a substituted or unsubstituted heterocyclic group, or X1 and X2 are bonded to each other to form a substituted or unsubstituted ring, and
R$_{101}$ to R$_{106}$ are the same as or different from each other, and are each independently hydrogen; deuterium; a substituted or unsubstituted alkyl group; a substituted or unsubstituted fluoroalkyl group; a substituted or unsubstituted aryl group; or a substituted or unsubstituted heterocyclic group.

2. The compound of claim 1, wherein Chemical Formula 1 is represented by any one of the following Chemical Formulae 2 to 7:

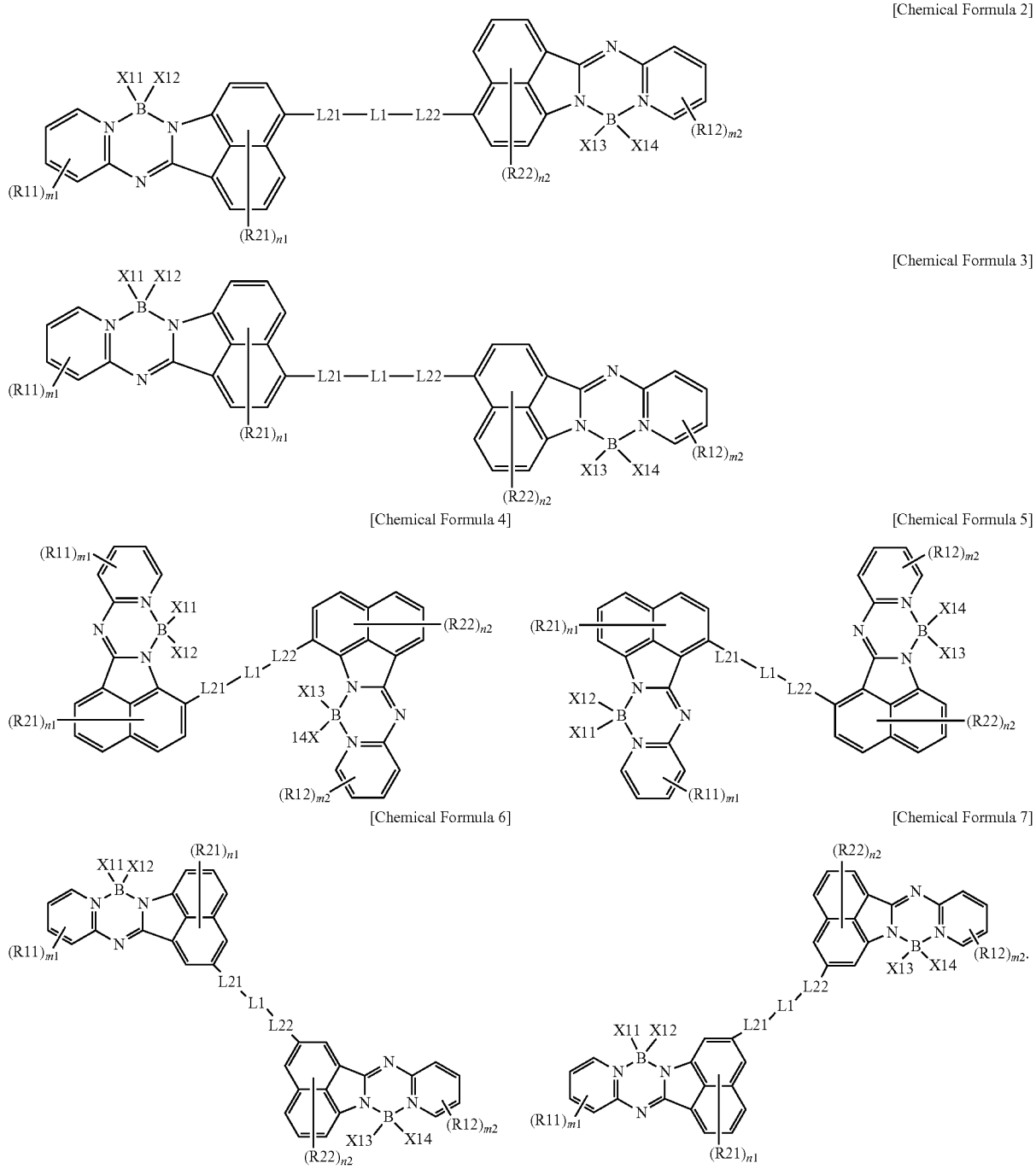

in Chemical Formulae 2 to 7,
L1 is the same as the definition in Chemical Formula 1,
L21 and L22 are the same as the definition of L2 of Chemical Formula 1, and L21 and L22 are the same as or different from each other,
the definitions of R11, R12, R21, and R22 are the same as those of R1 and R2 of Chemical Formula 1, R11 and R12 are the same as each other, and R21 and R22 are the same as each other, the definitions of m1 and m2 are the same as the definition of m of Chemical Formula 1, and m1 and m2 are the same as each other,
the definitions of n1 and n2 are the same as the definition of n of Chemical Formula 1, and n1 and n2 are the same as each other, and
the definitions of X11 to X14 are the same as the definitions of X1 and X2 of Chemical Formula 1, X11 is the same as X14, and X12 is the same as X13.

3. The compound of claim 1, wherein L1 and L2 are the same as or different from each other, and are each independently a direct bond; —SiR$_{101}$R$_{102}$—; —SO$_2$—; —O—; —NR$_{103}$—; —C(=O)O—; a substituted or unsubstituted methylene group; a substituted or unsubstituted ethylene group; a substituted or unsubstituted propylene group; a substituted or unsubstituted butylene group; a substituted or unsubstituted pentanylene group; a substituted or unsubstituted cyclohexanylene group; a substituted or unsubstituted phenylene group; a substituted or unsubstituted biphenylene group; a substituted or unsubstituted naphthylene group; a substituted or unsubstituted anthracenylene group; a substituted or unsubstituted phenanthrenylene group; a substituted or unsubstituted pyrenylene group; a substituted or unsubstituted fluorenylene group; a substituted or unsubstituted spirobifluorenylene group; a substituted or unsubstituted pyridinylene group; a substituted or unsubstituted pyrimidinylene group; a substituted or unsubstituted pyrrolene group; a substituted or unsubstituted furanylene group; a substituted or unsubstituted thiophenylene group; a substituted or unsubstituted oxazolylene group; a substituted or unsubstituted triazolylene group; a substituted or unsubstituted indolene group; a substituted or unsubstituted benzoxadiazolene group; a substituted or unsubstituted triazolene group; a substituted or unsubstituted benzothiadiazolene group; a substituted or unsubstituted benzoxadiazolylene group; a substituted or unsubstituted dibenzofuranylene group; a substituted or unsubstituted carbazolylene group; a substituted or unsubstituted xanthenylene group; a substituted or unsubstituted dihydroantharcenylene group; a substituted or unsubstituted dihydroacridinylene group; or a substituted or unsubstituted phenoxathinylene group, and R$_{101}$ to R$_{103}$ are the same as or different from each other, and are each independently hydrogen; deuterium; a methyl group; or a phenyl group.

4. The compound of claim 1, wherein X1 and X2 are the same as or different from each other, and are each independently fluorine; chlorine; a cyano group; a phenoxy group substituted with a nitro group; a methoxy group; a phenyl group; an ethynyl group substituted with a trimethylsilyl group; or —OC(=O)R$_{107}$, and R$_{107}$ is a trifluoromethyl group.

5. The compound of claim 1, wherein R1 is hydrogen; deuterium; fluorine; a carboxyl group; a hydroxy group; a cyano group; a phenoxy group; a butylamine group; a diphenylamine group; a phenyl group unsubstituted or substituted with fluorine, a phenethyl group, a carboxyl group, a carbazole group, a butyl group, a diphenylamine group, or a trifluoromethyl group; a naphthyl group; an anthracenyl group; a pyrenyl group; a bipyridine group; a carbazole group unsubstituted or substituted with a butyl group; a trifluoromethyl group; a tetraphenylmethyl group; a tetraphenylsilyl group; a triphenylsilyl group; a dimethylfluorenyl group; a spirobifluorenyl group; an ethoxy group substituted with a carbazole group; an indole group unsubstituted or substituted with a carboxyl group; a triazaindene group; a triazole group substituted with a phenyl group; a dimethyldihydroacridine group; a dimethylxanthene group; a tetramethyldihydroanthracene group; or —C(=O)OR$_{106}$, and R$_{106}$ is a butyl group.

6. The compound of claim 1, wherein Chemical Formula 1 is any one selected from the following structural formulae:

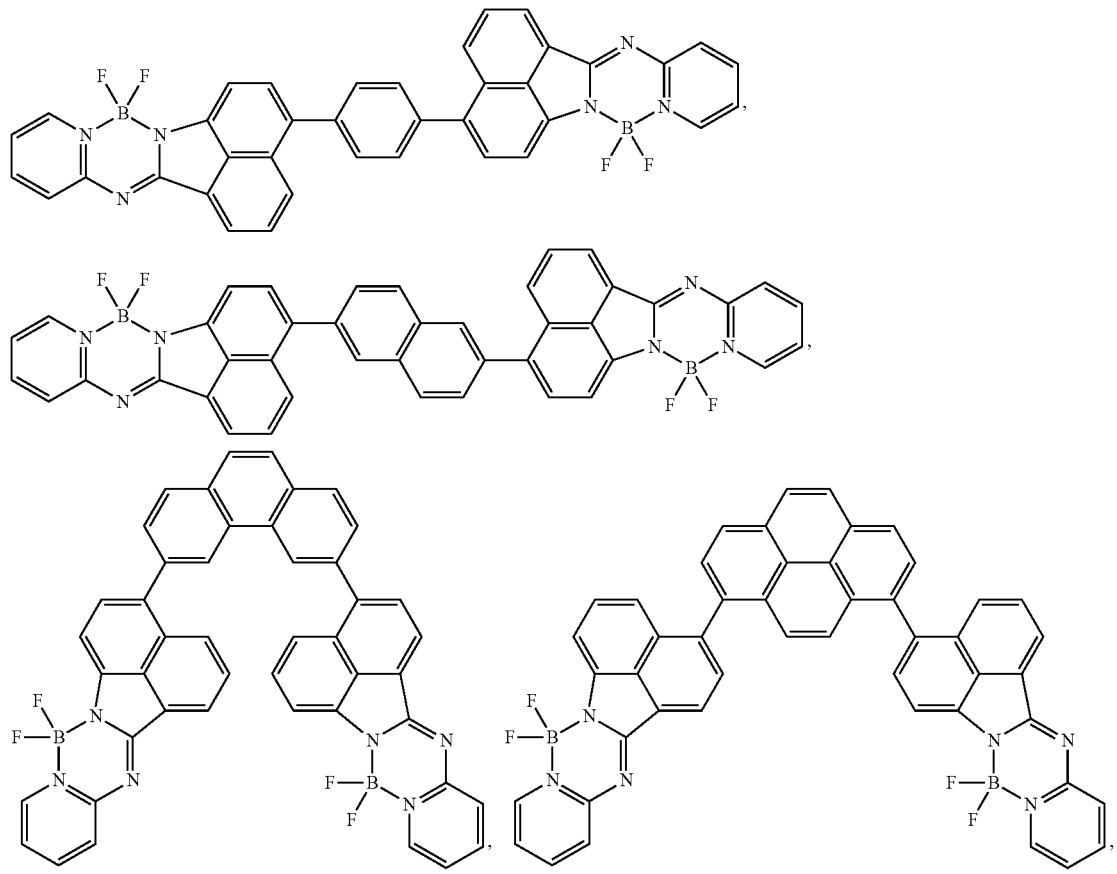

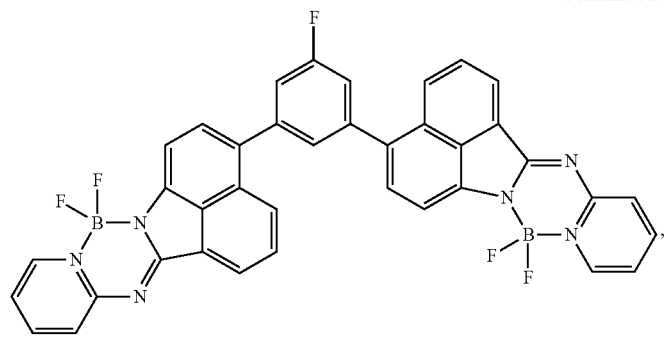
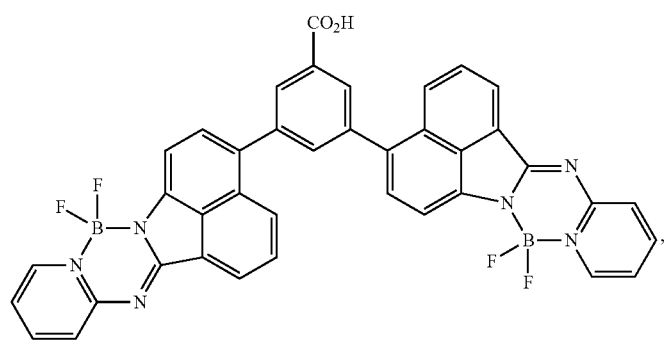
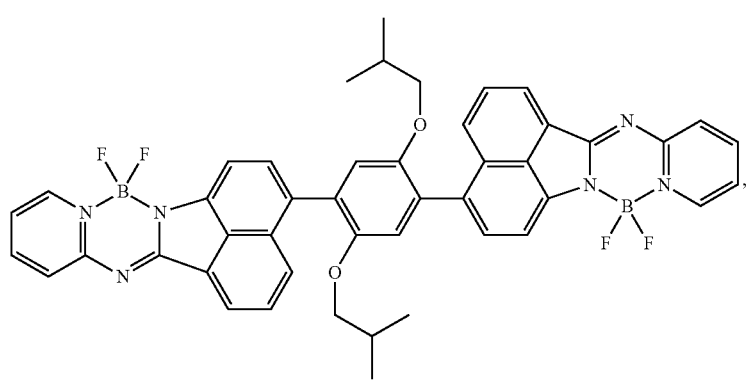
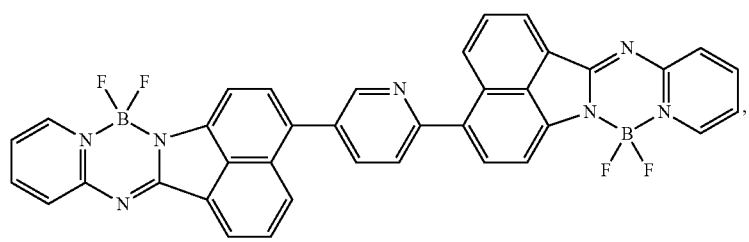
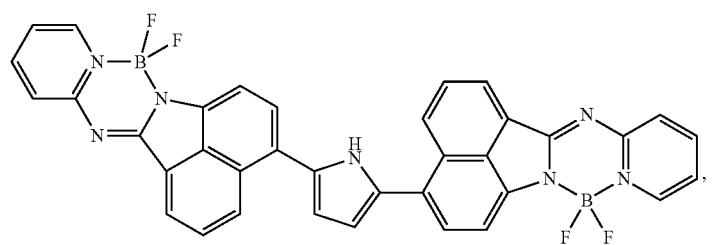

-continued
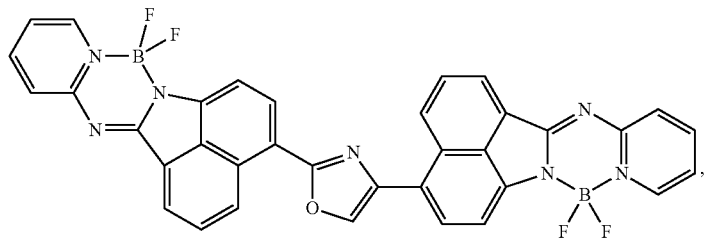
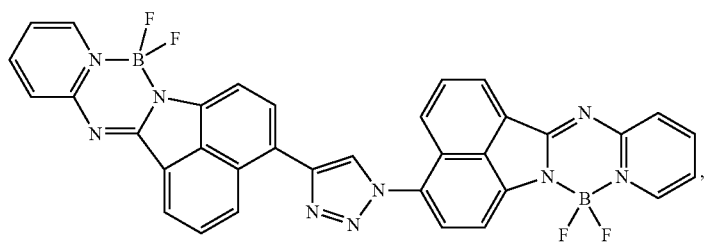
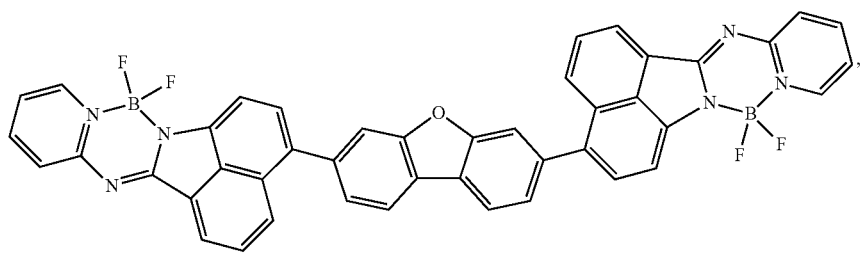
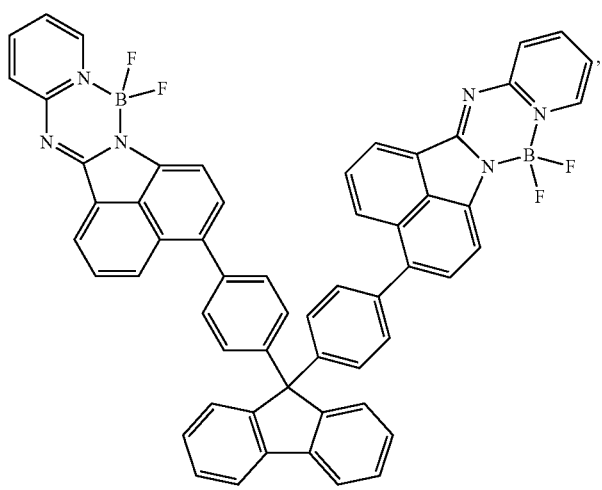
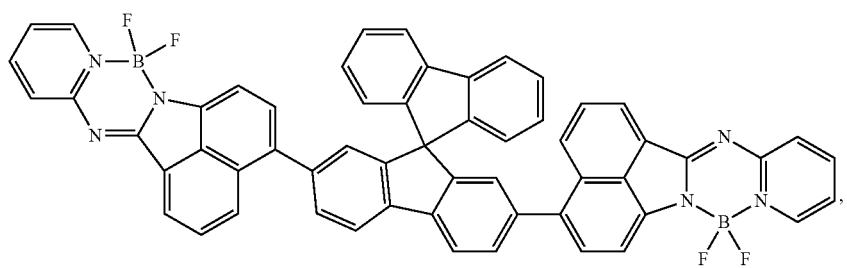

-continued
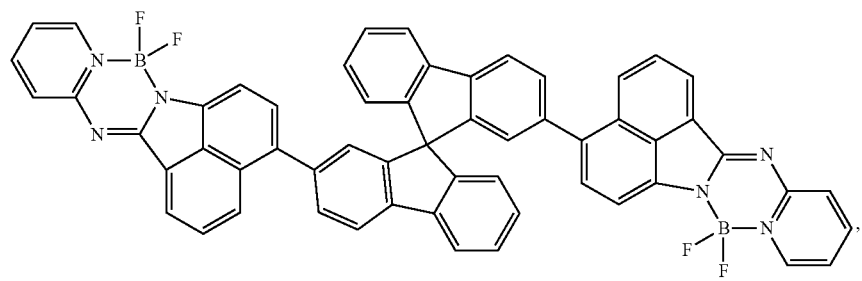
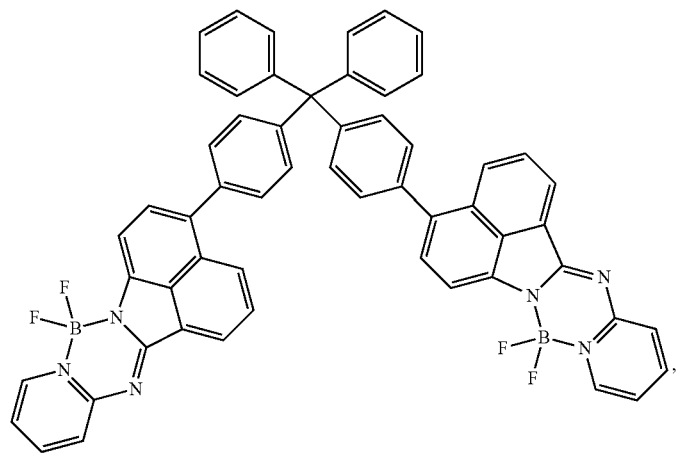
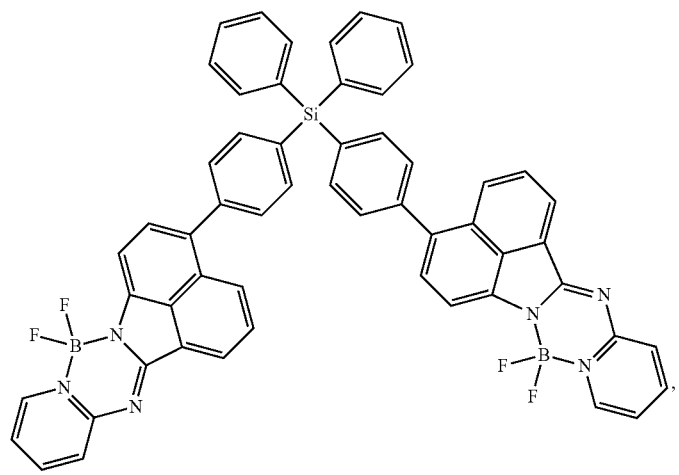
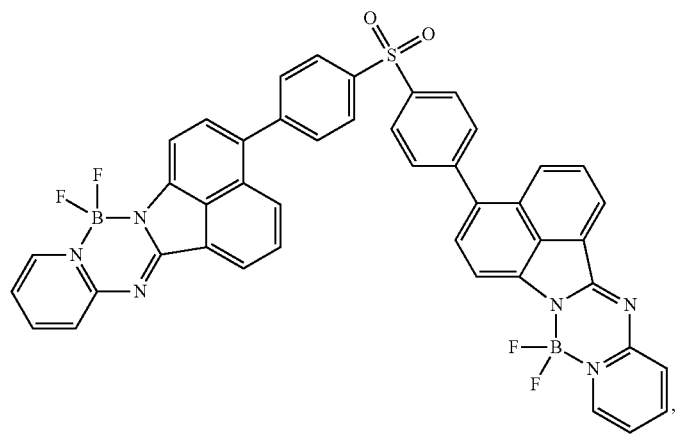

-continued
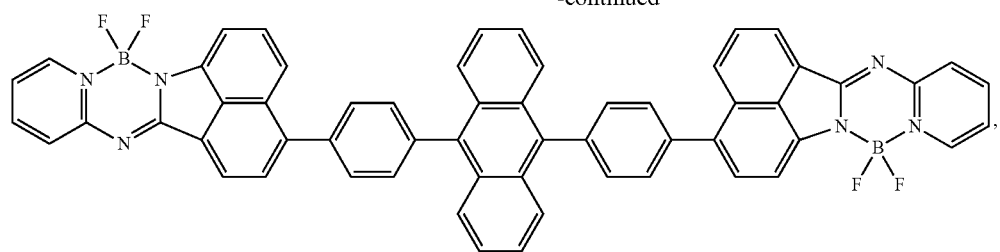
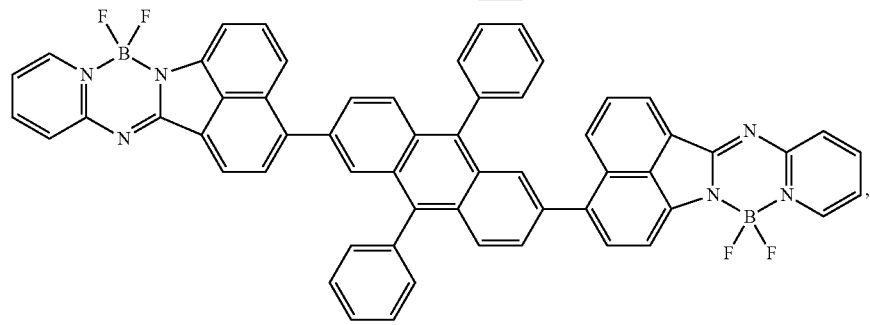
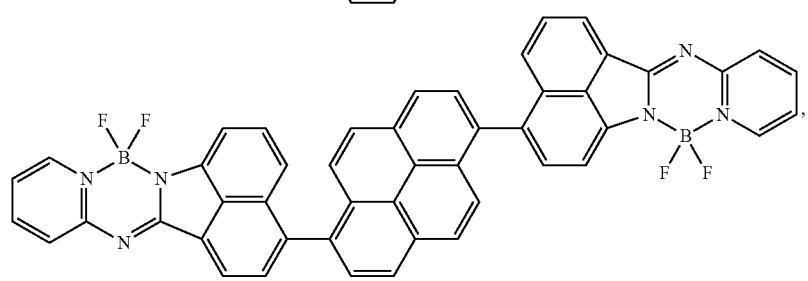
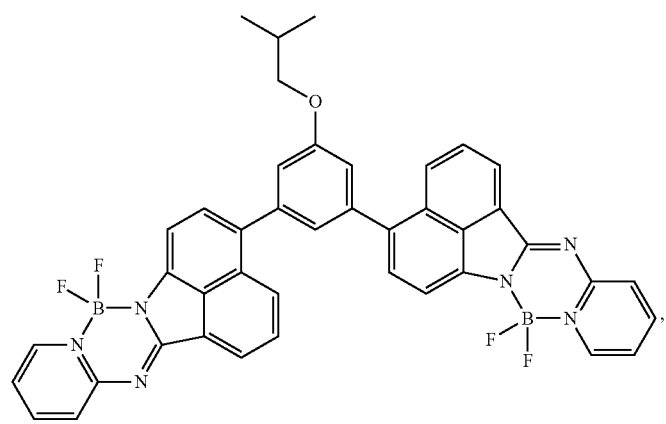
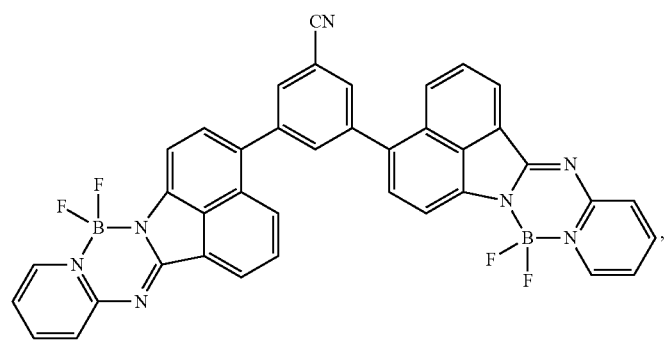

-continued
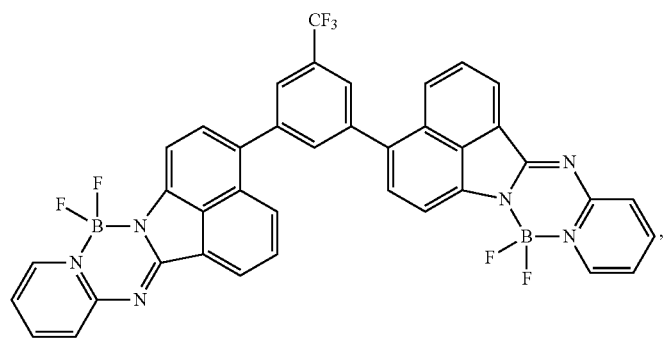
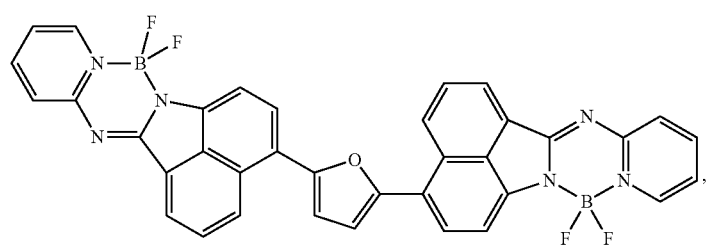
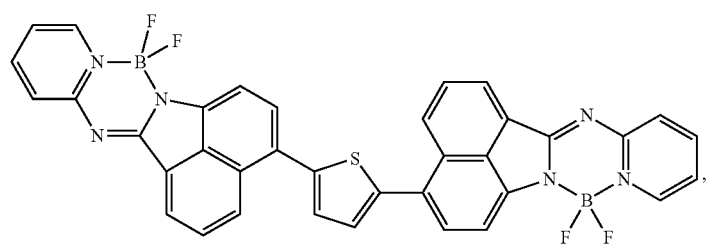
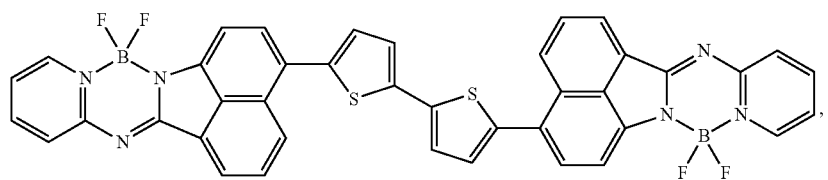
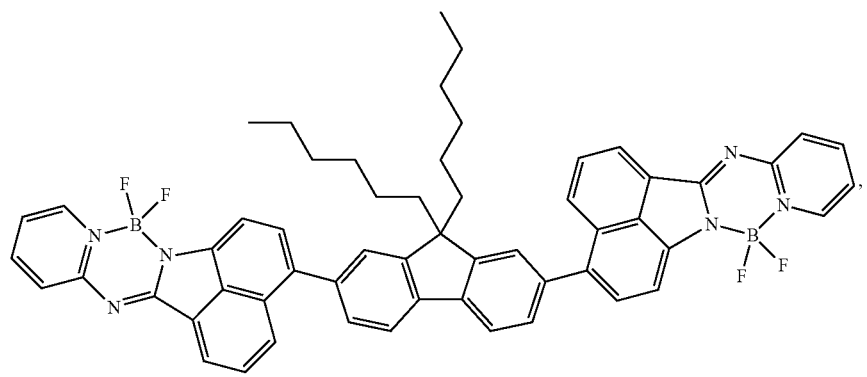
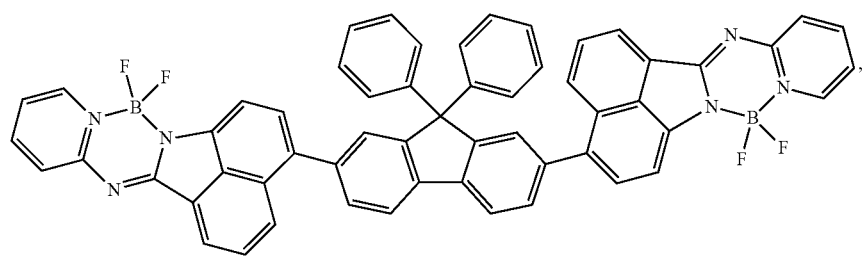

-continued
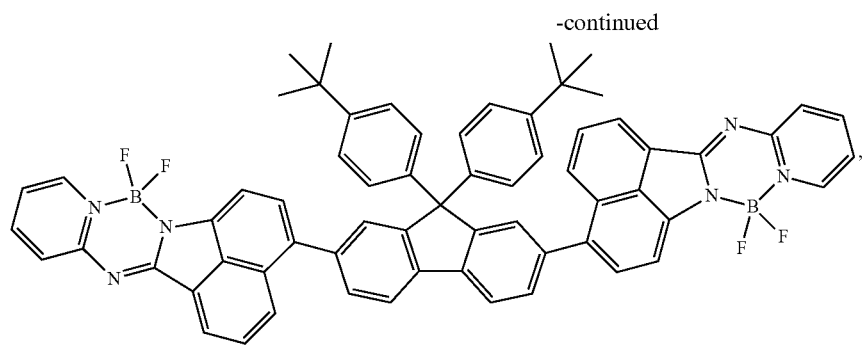
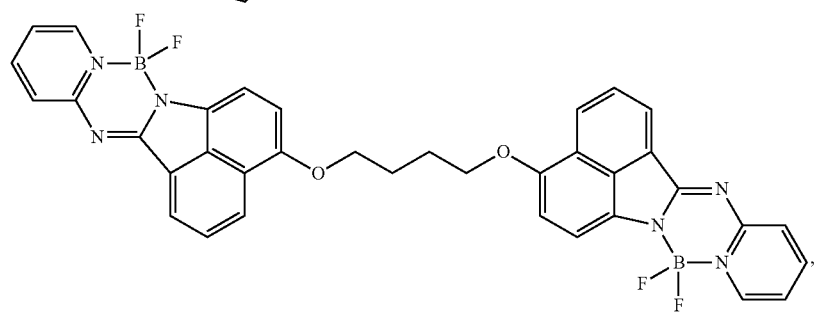
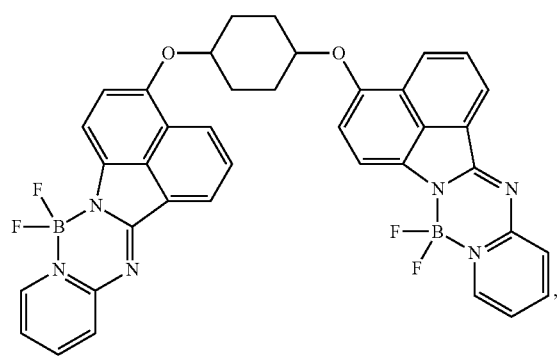
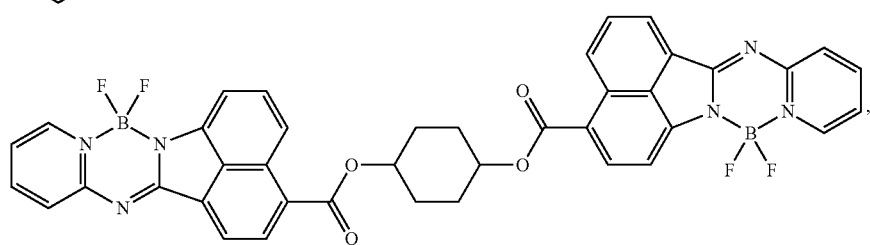
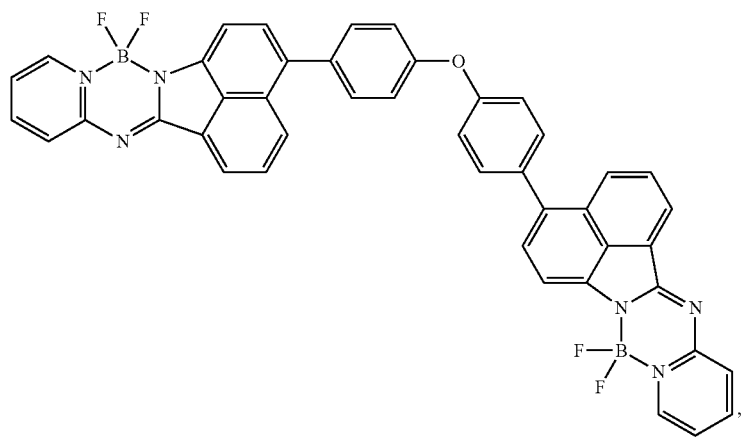

-continued
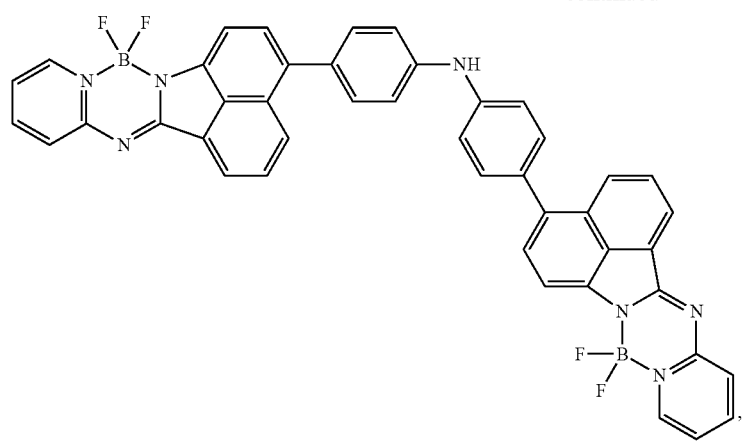
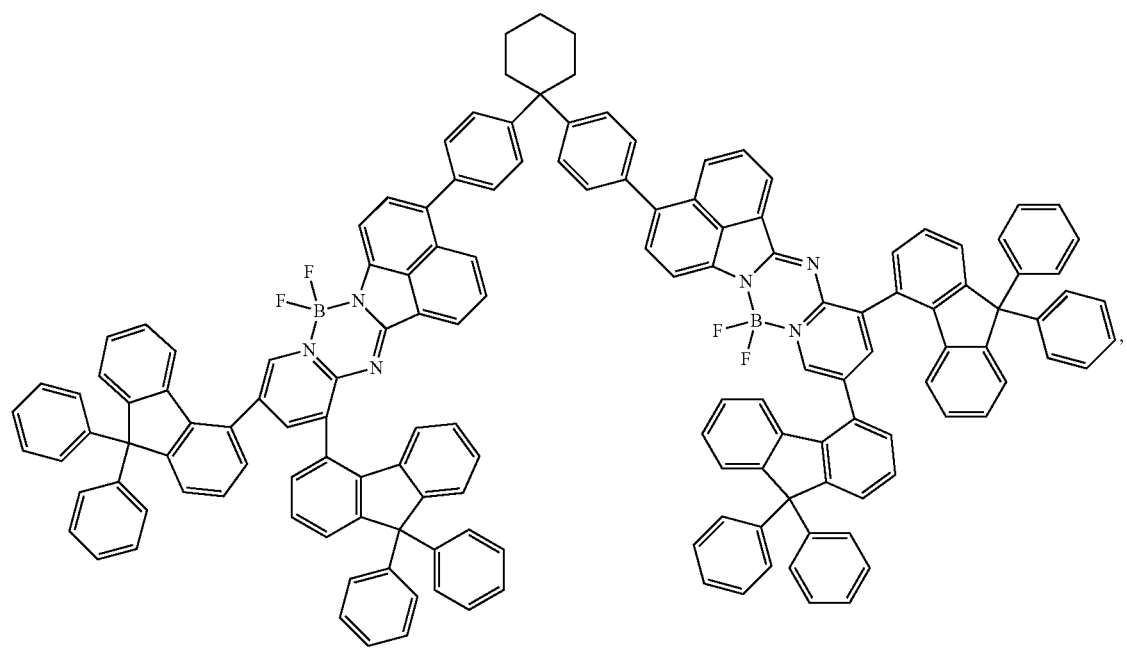
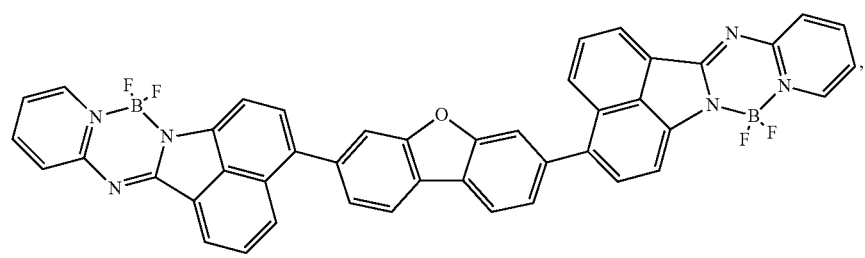

129
130
-continued
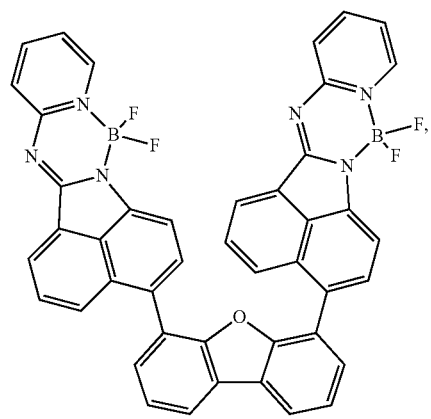
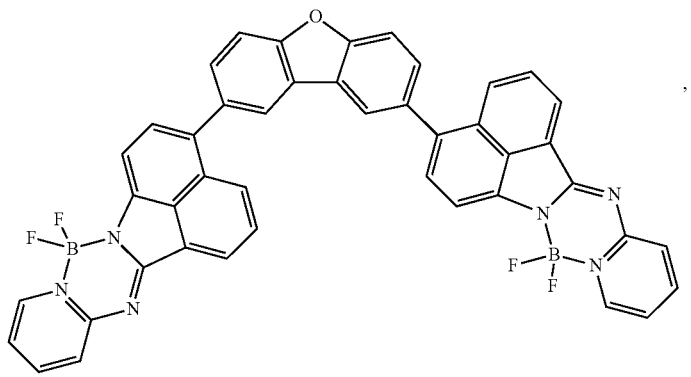
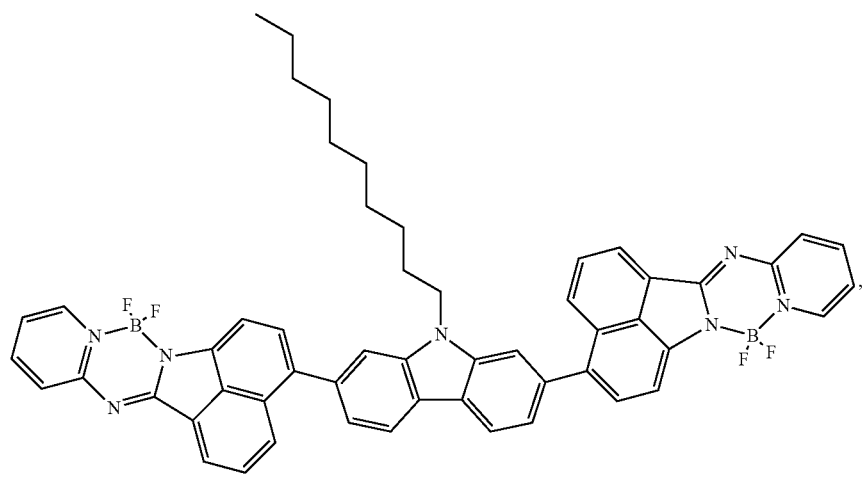
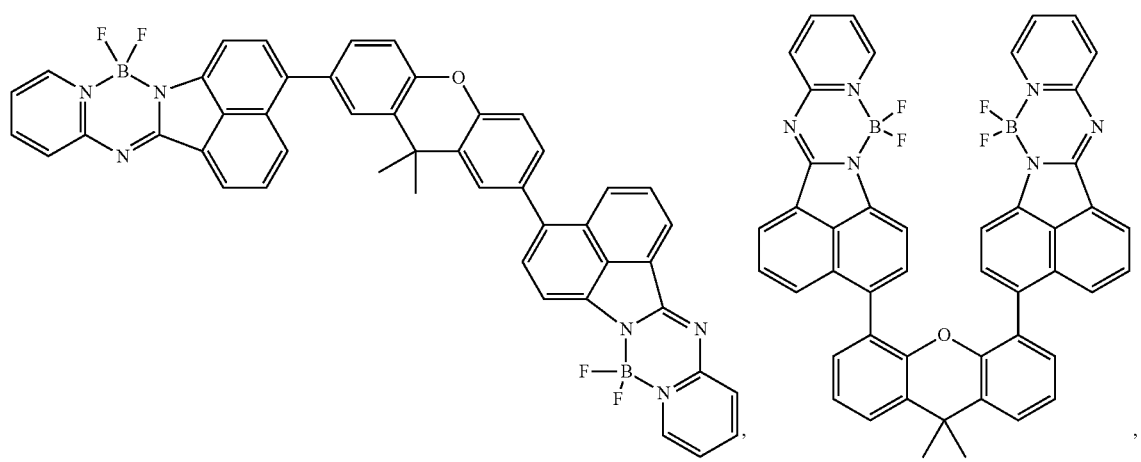

-continued
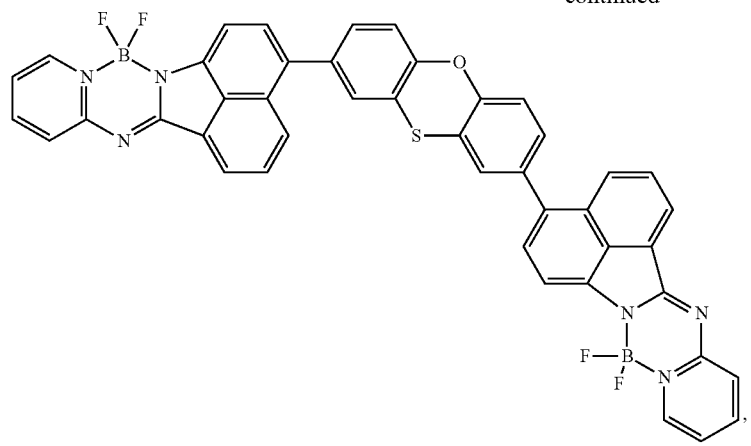
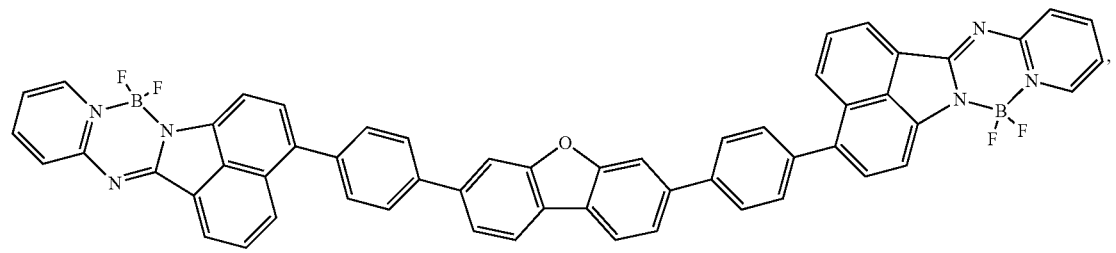
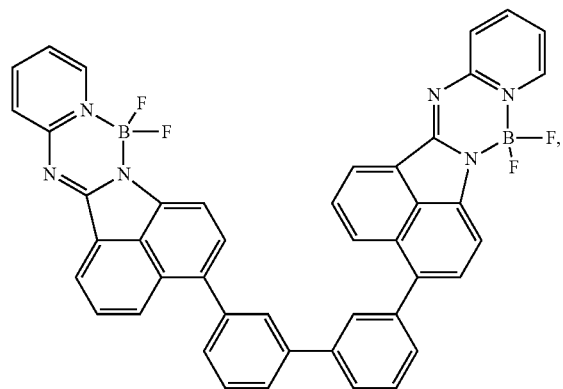
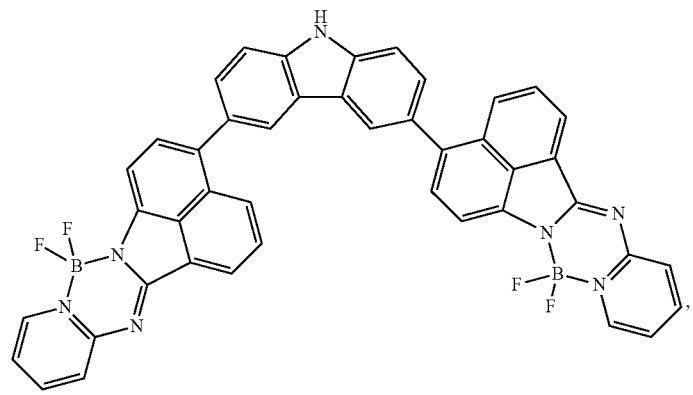
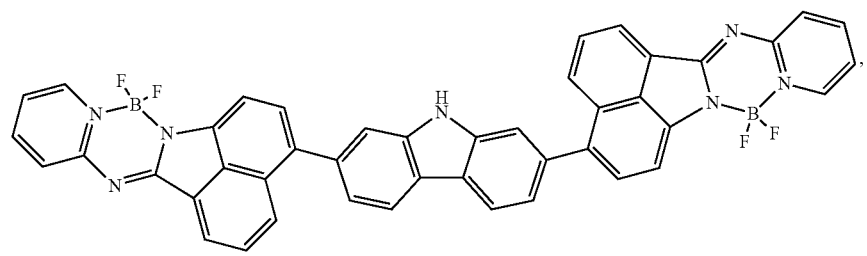

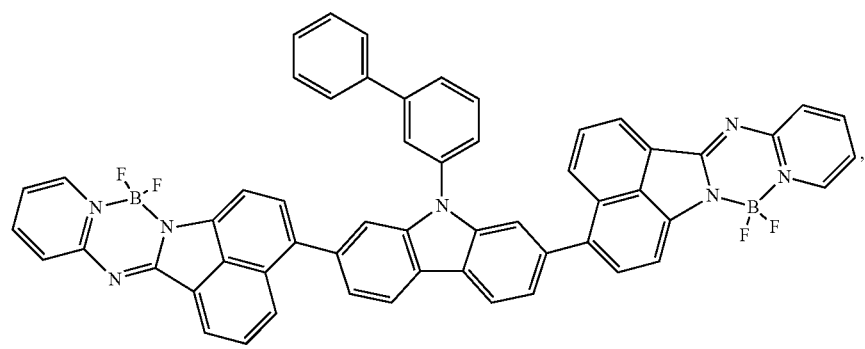
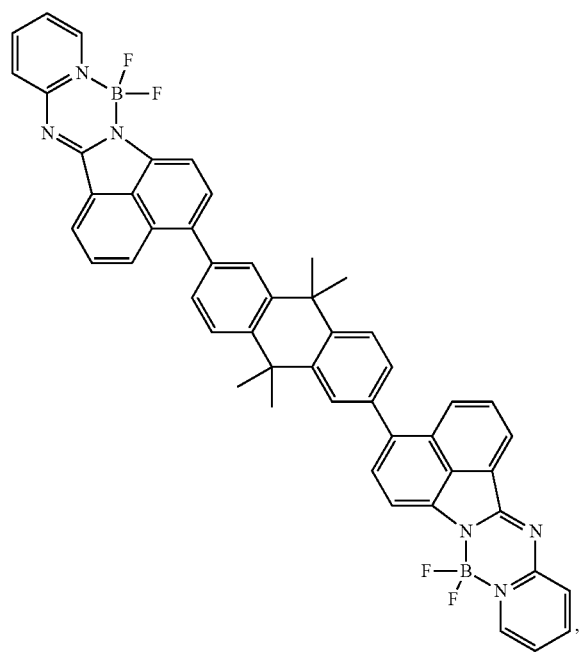
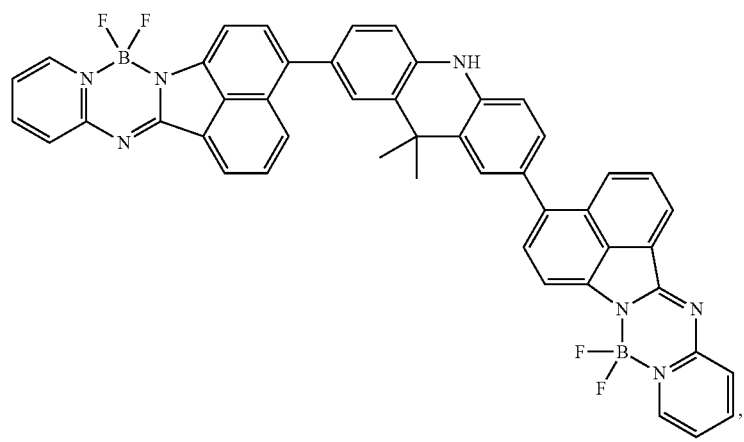

-continued
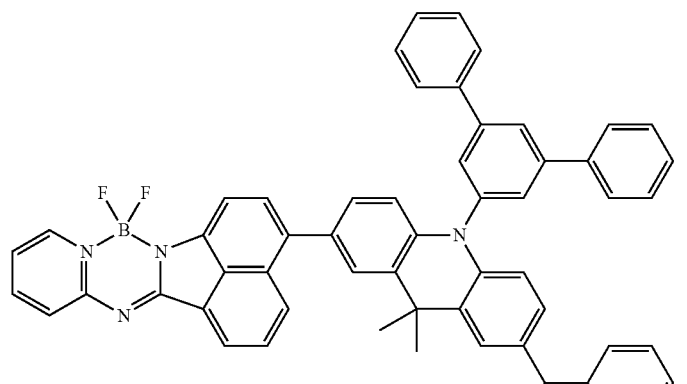
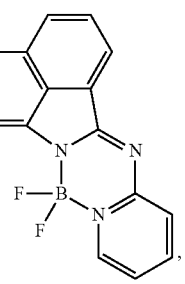
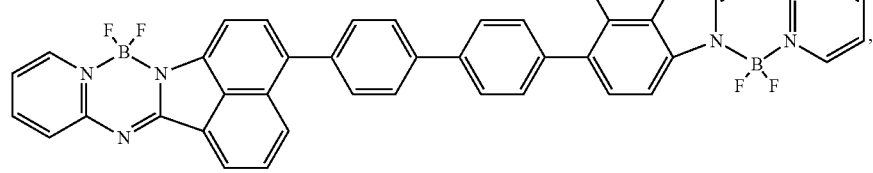
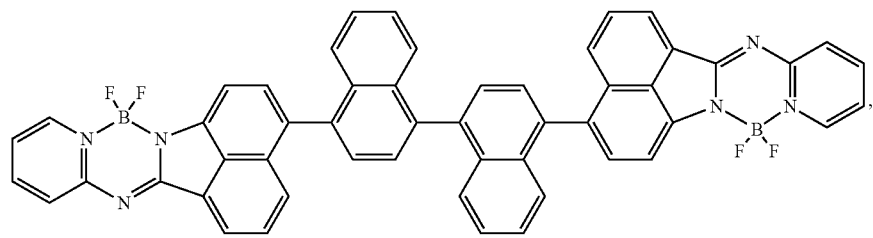
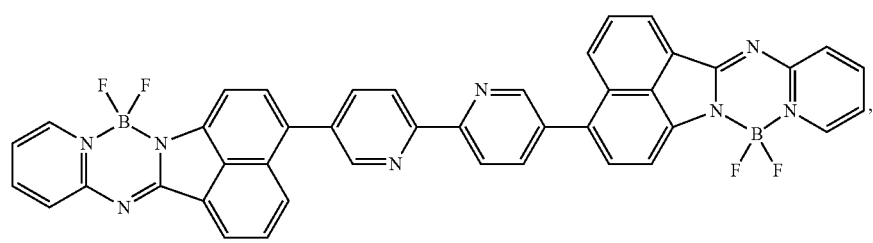
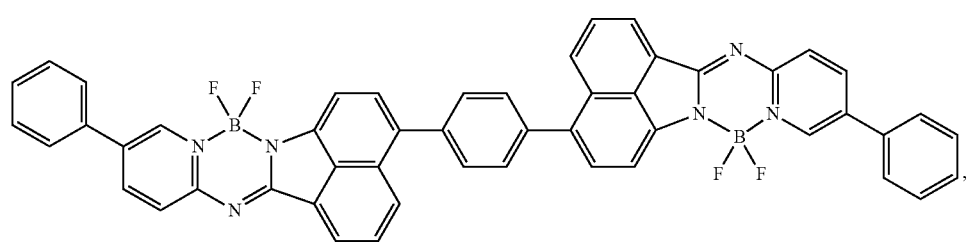

-continued
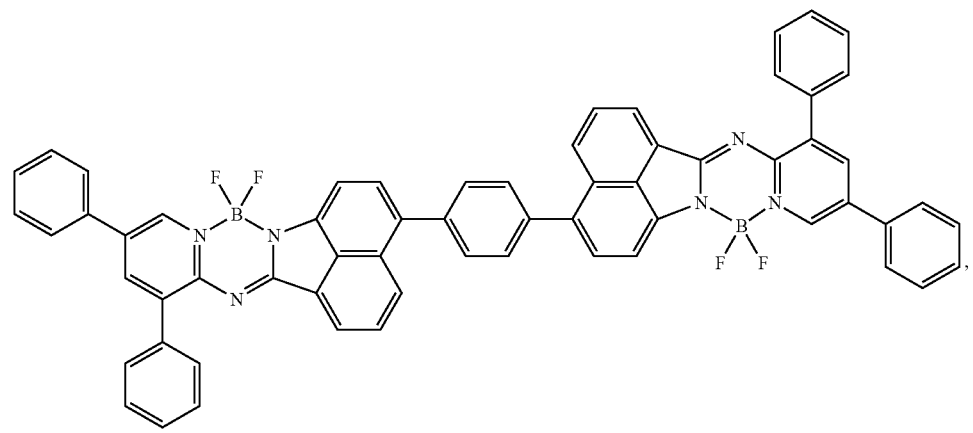
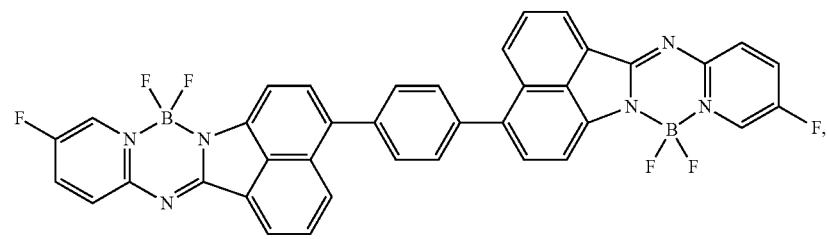
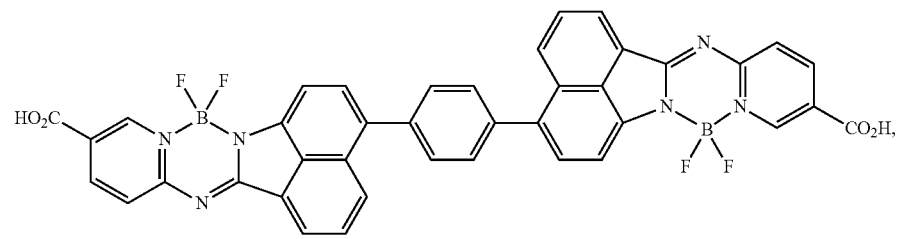
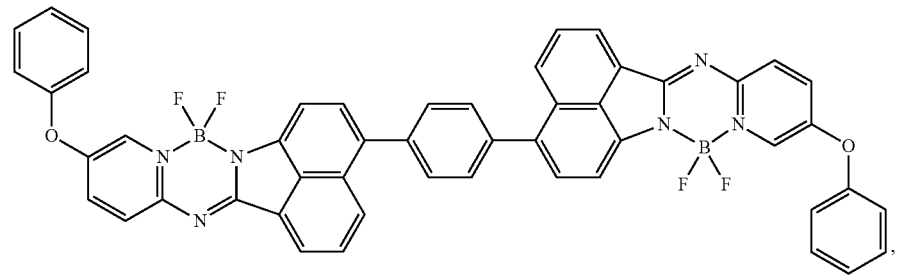
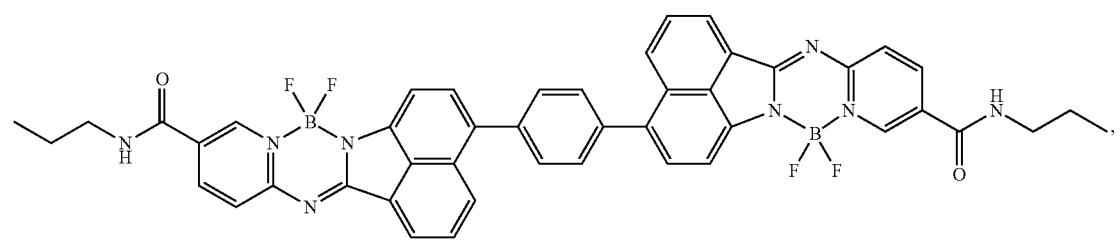
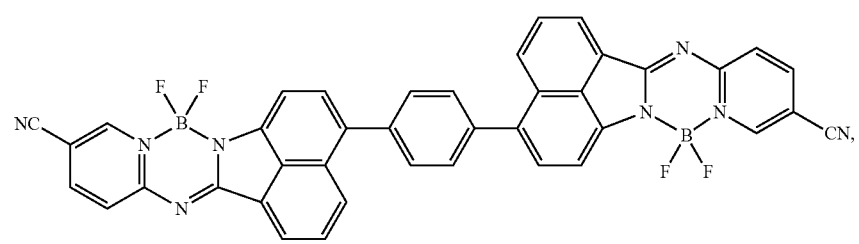

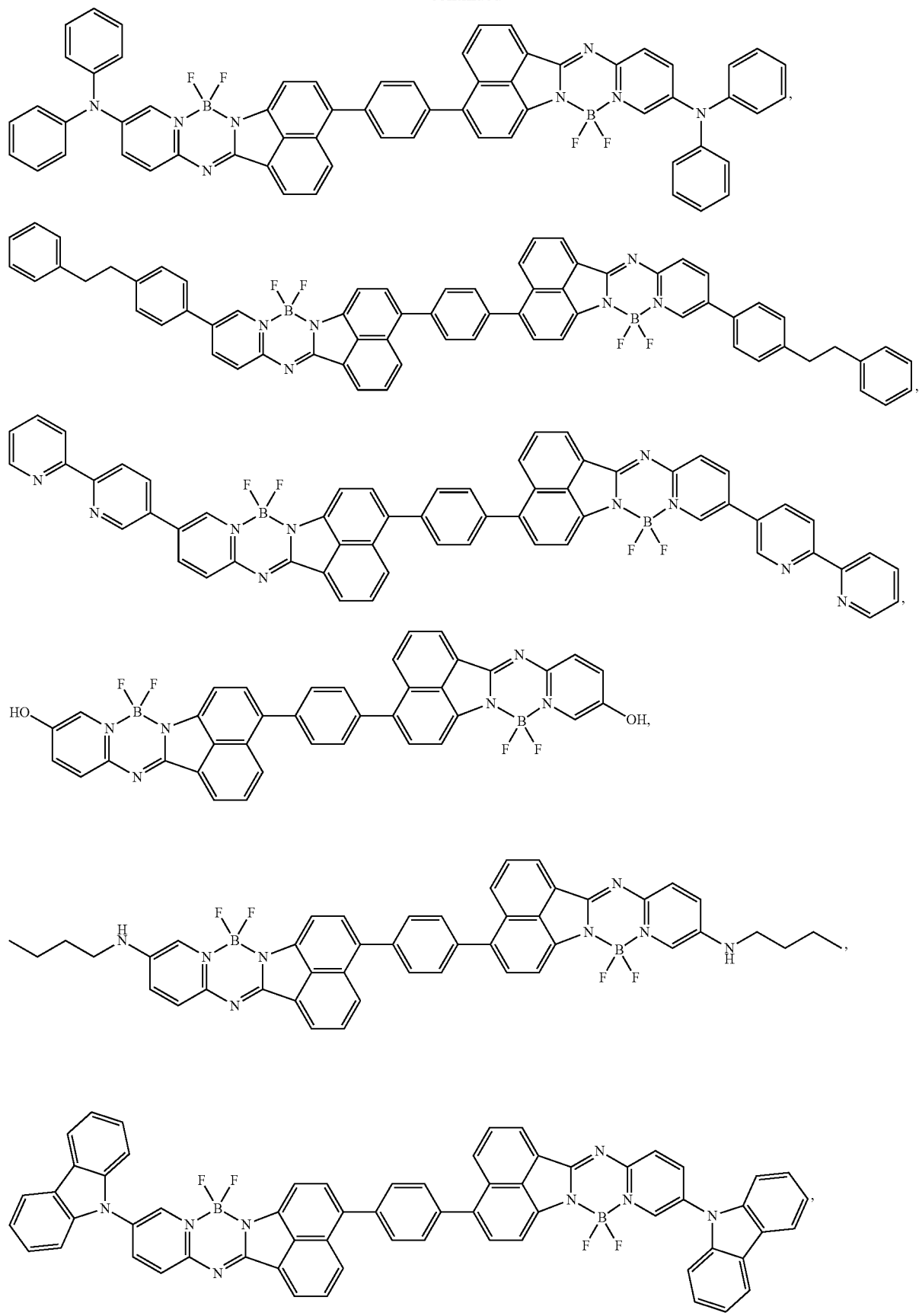

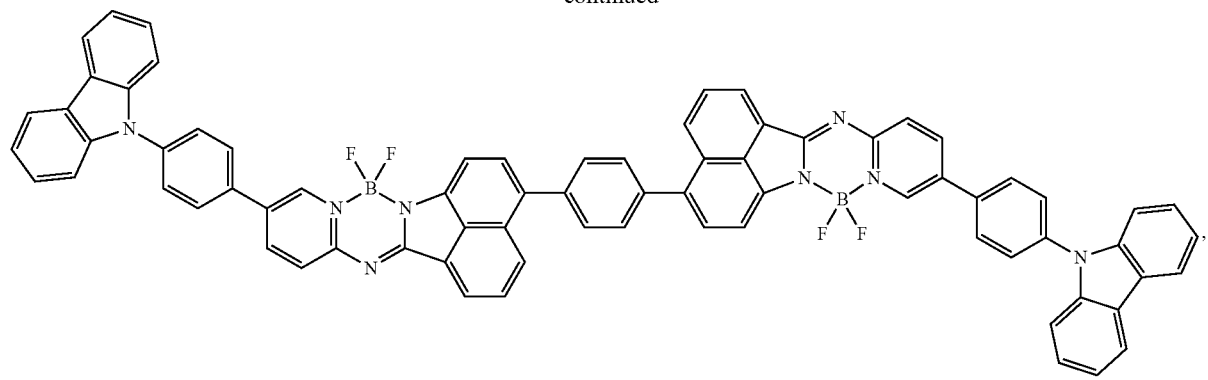
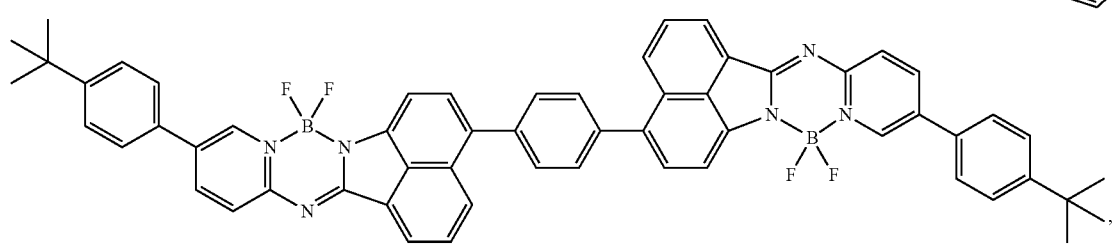
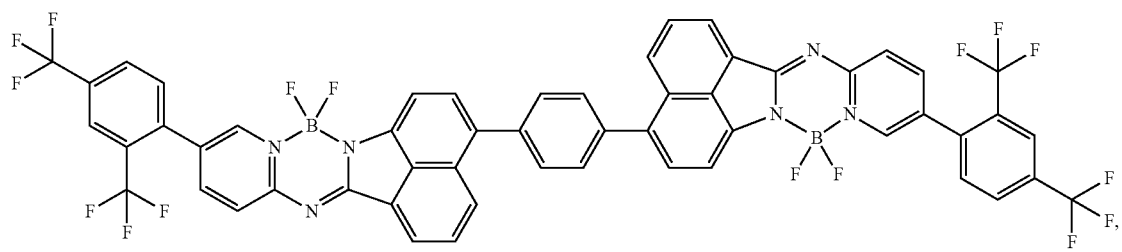
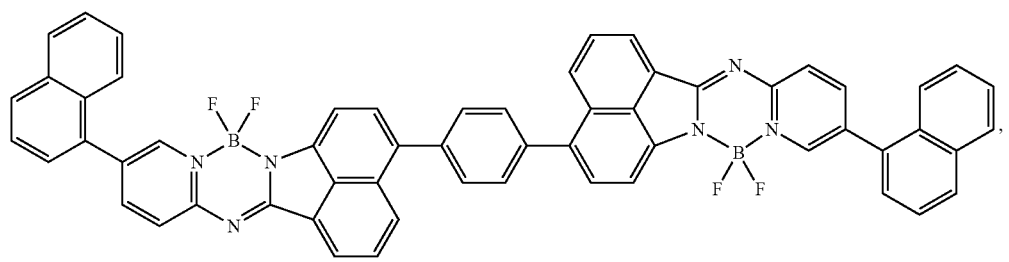
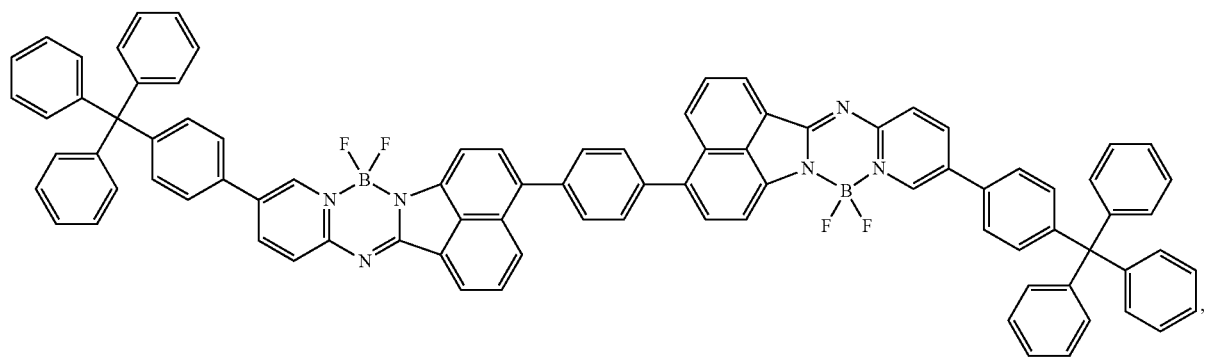

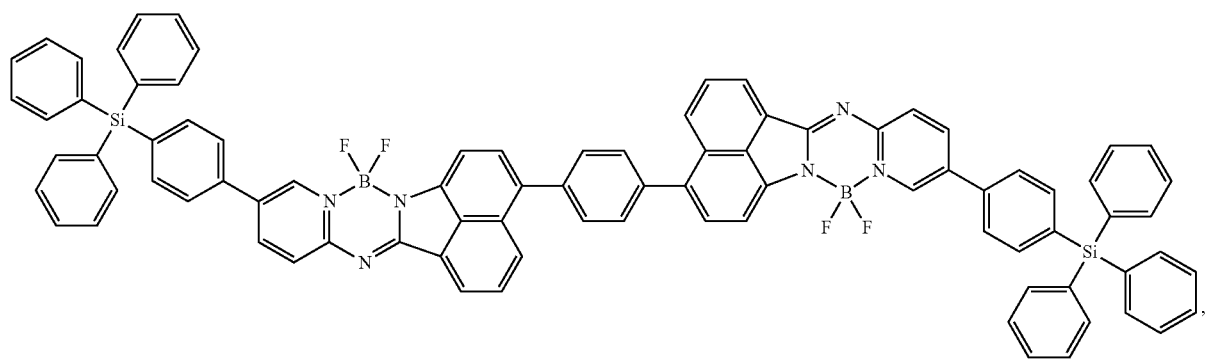
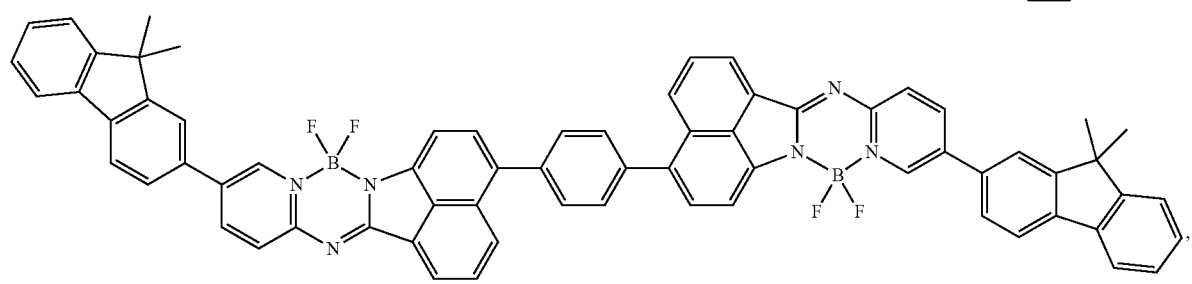
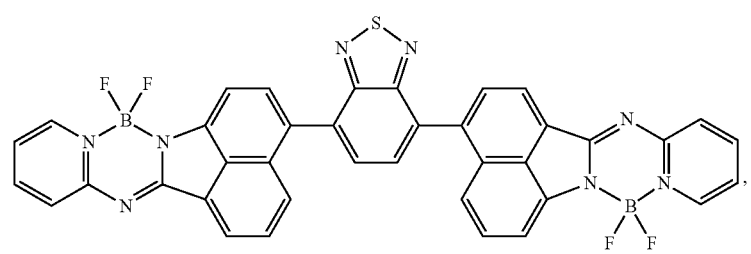
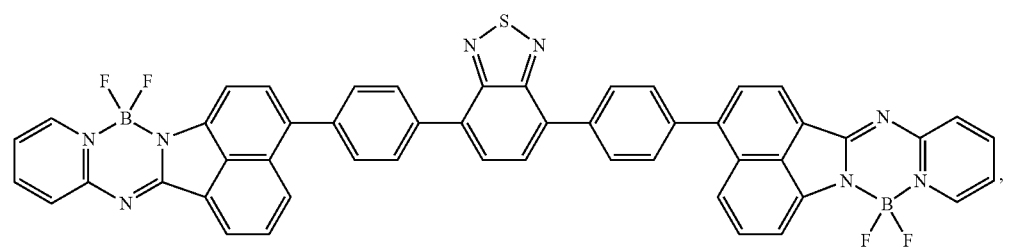
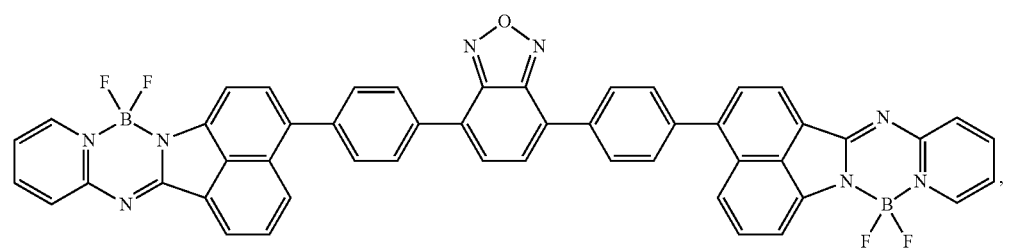

-continued
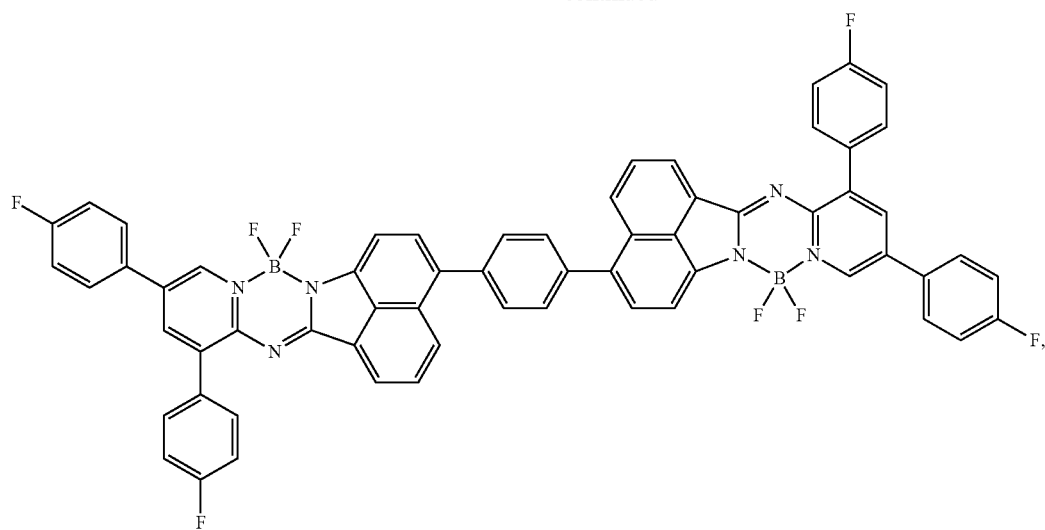
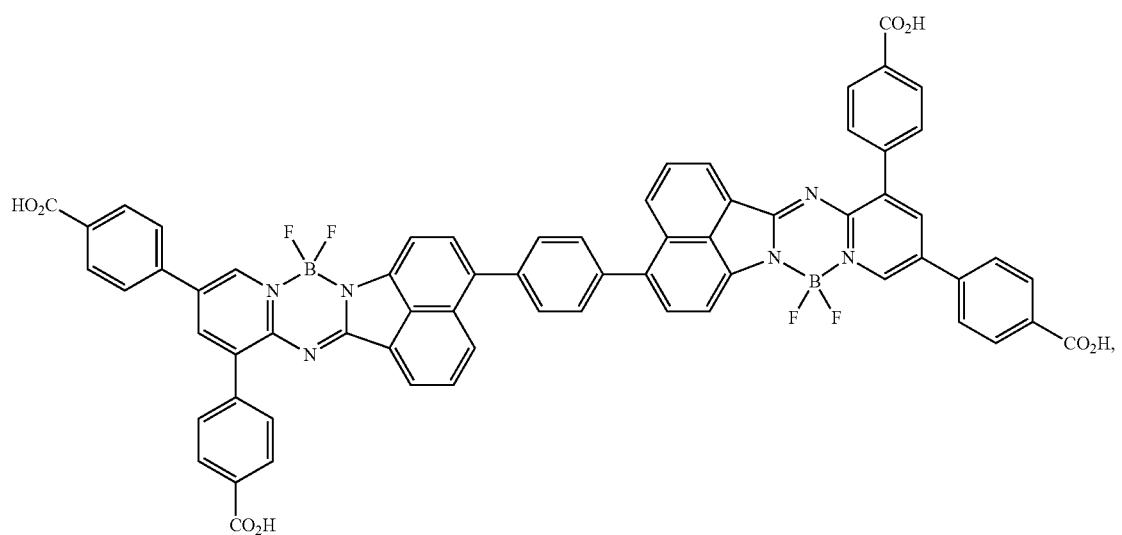
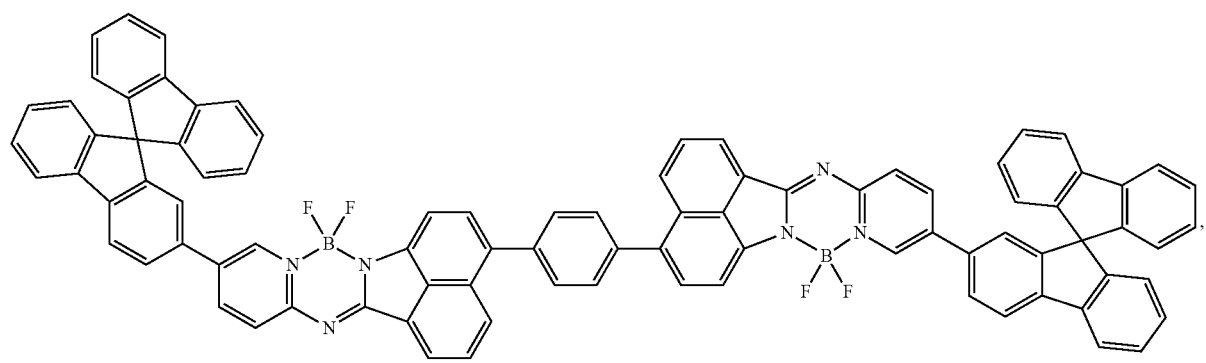

147                                                                                148
-continued
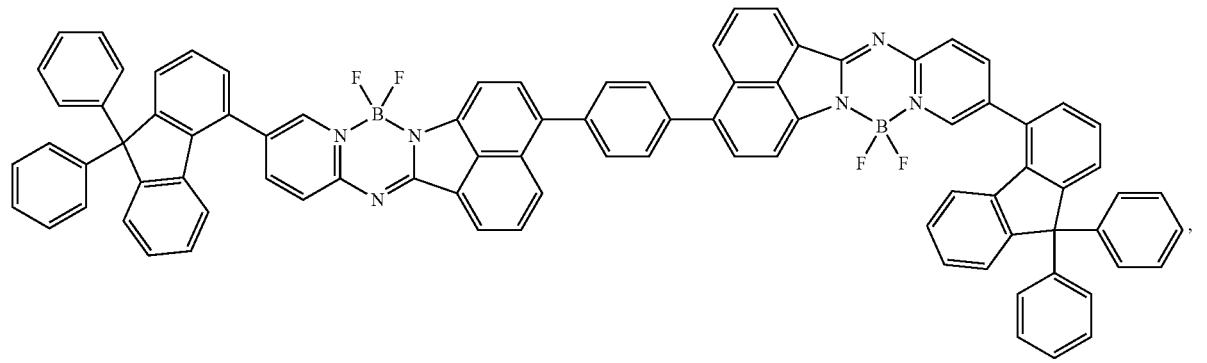
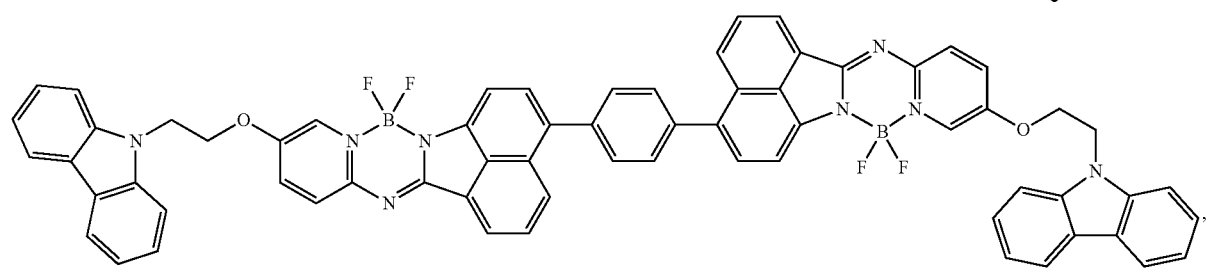
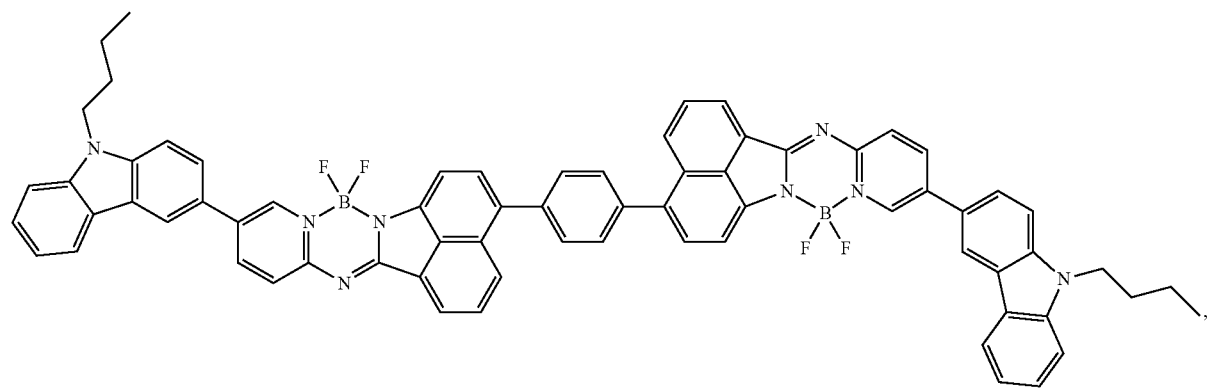
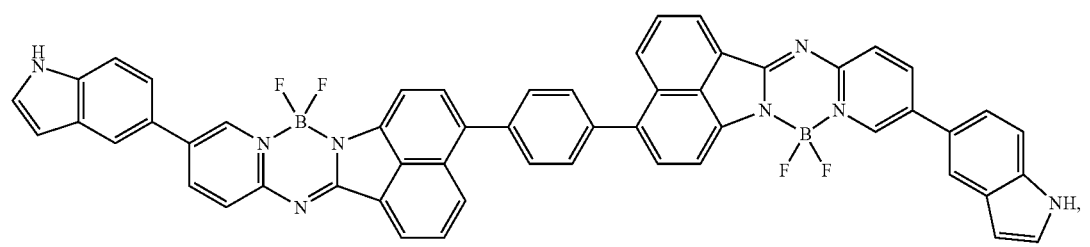
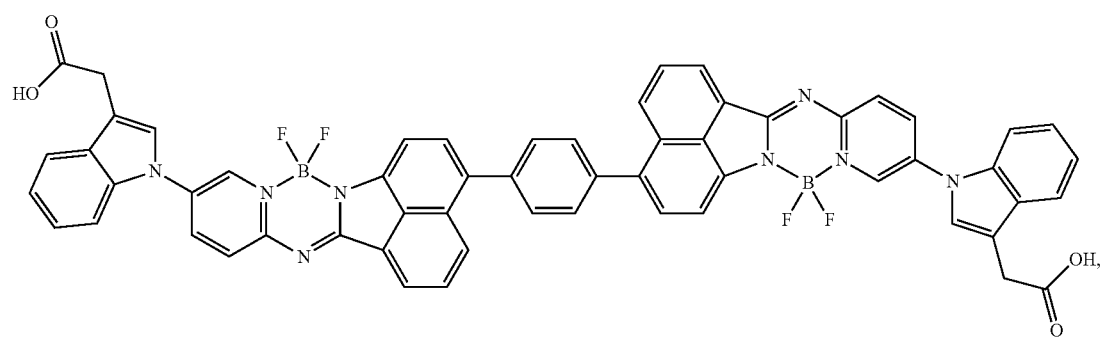

-continued
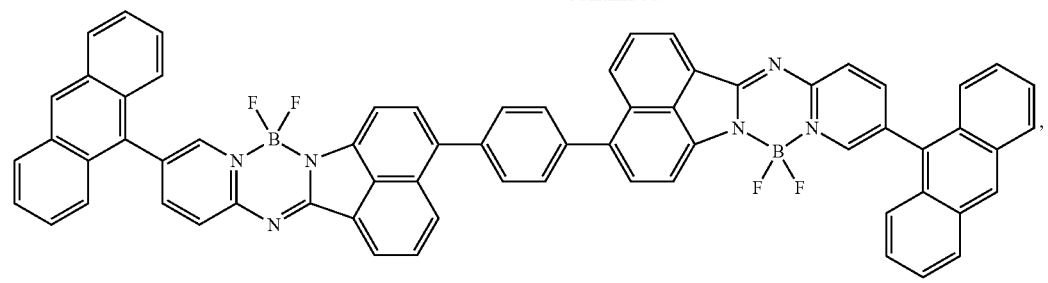
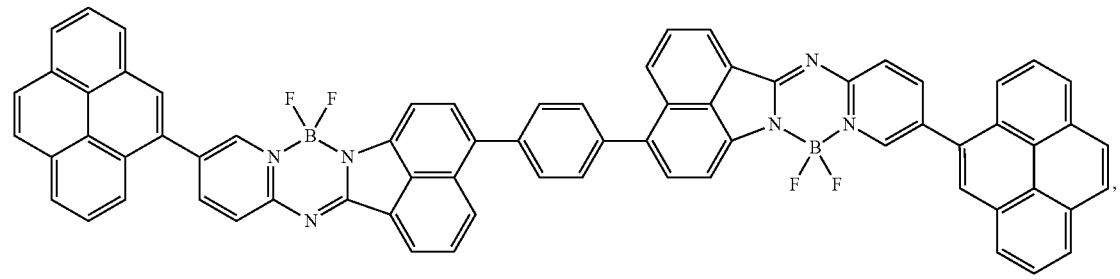
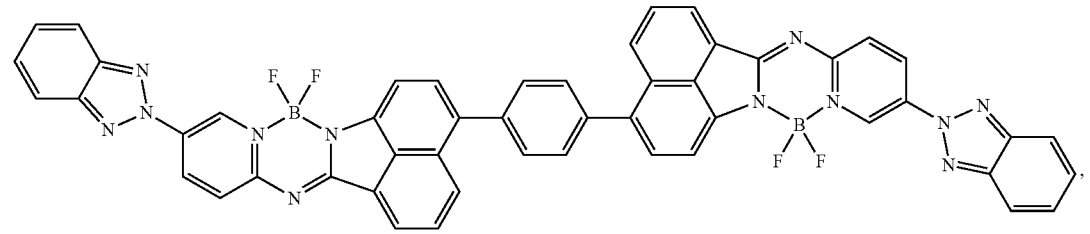
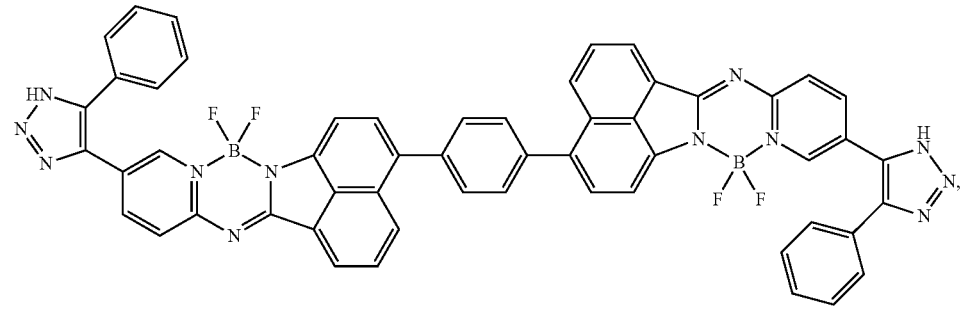
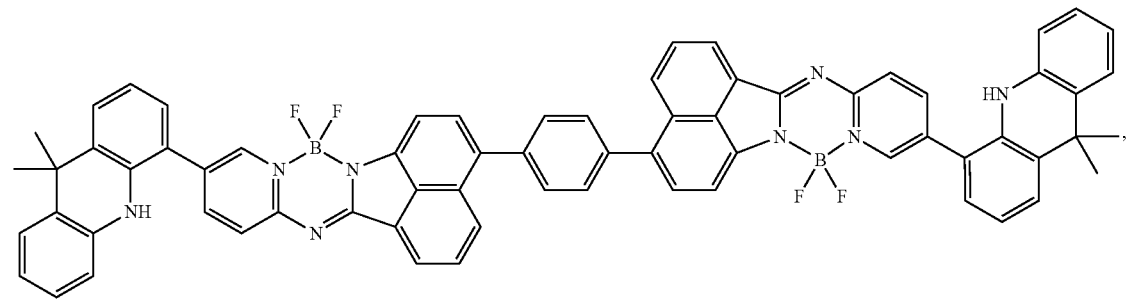
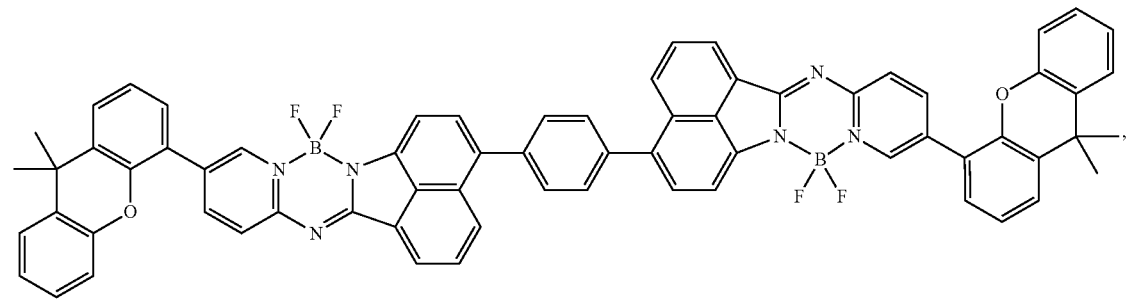

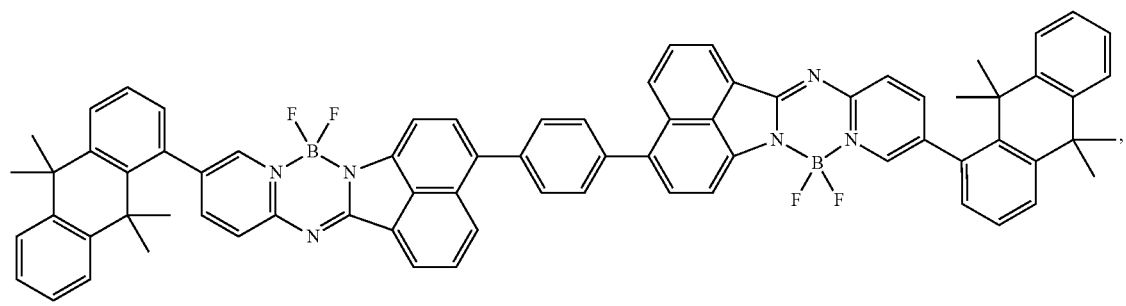
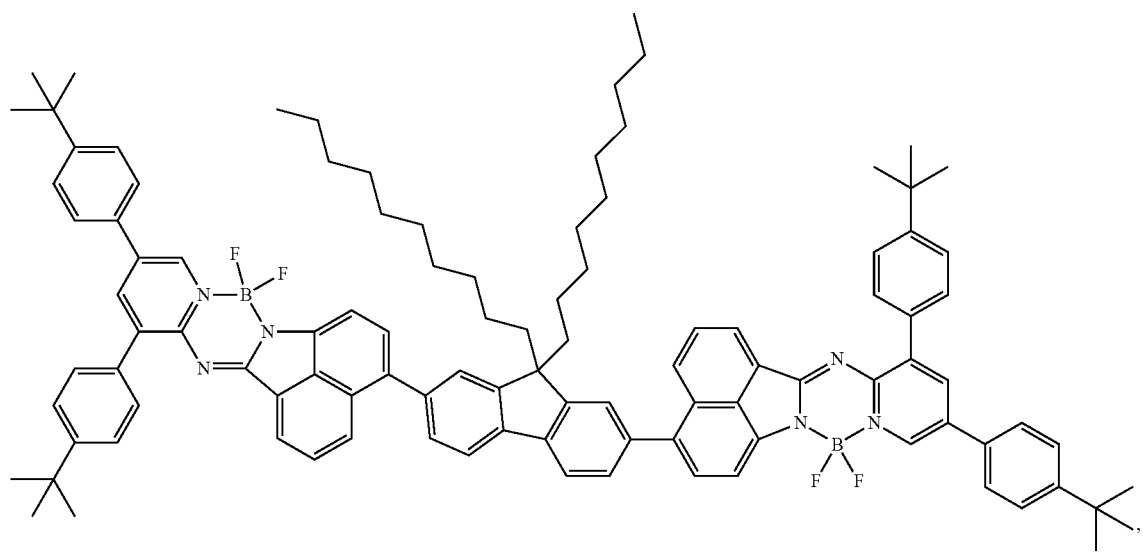
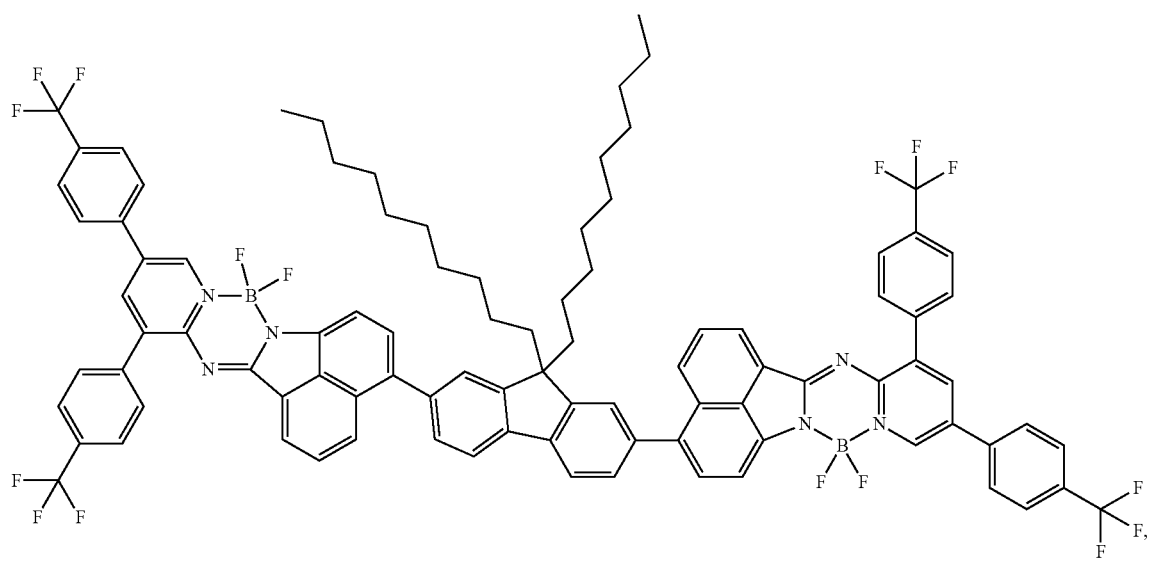

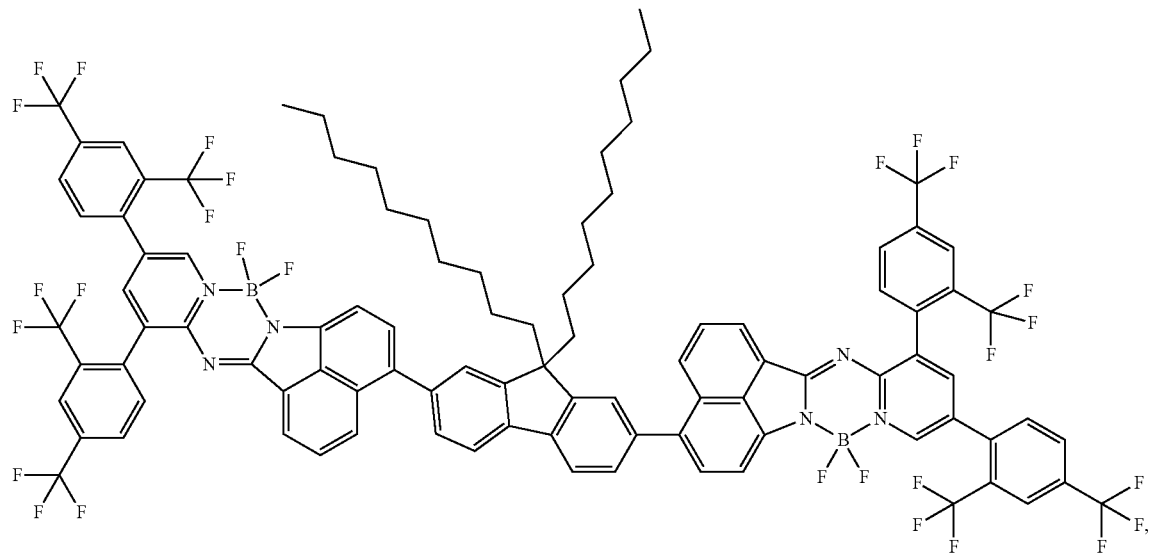
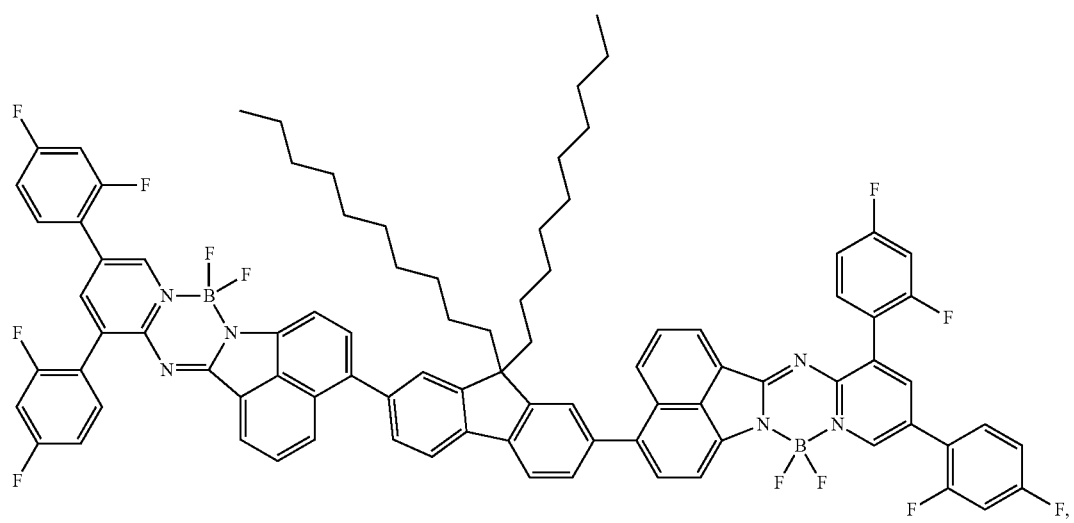
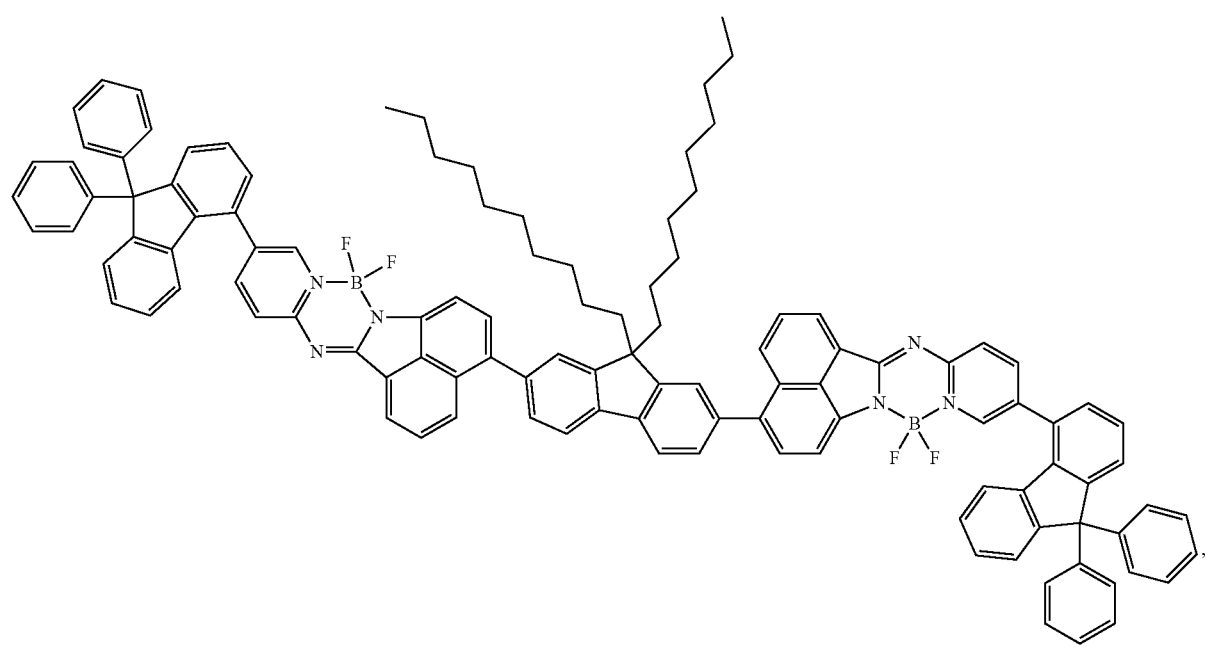

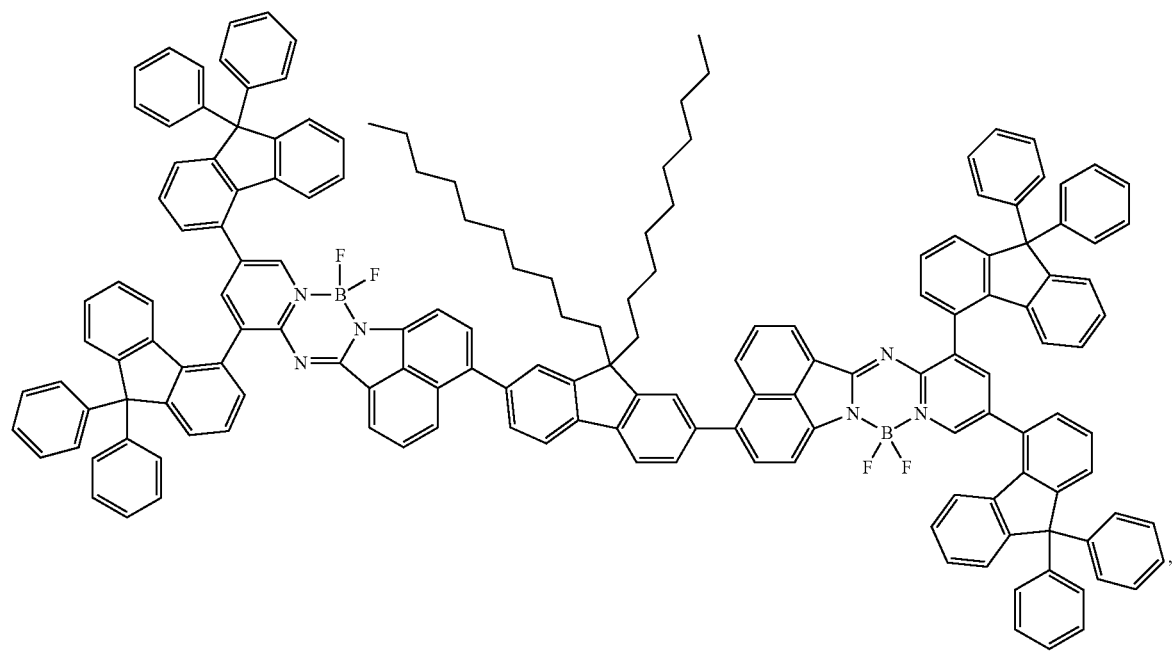
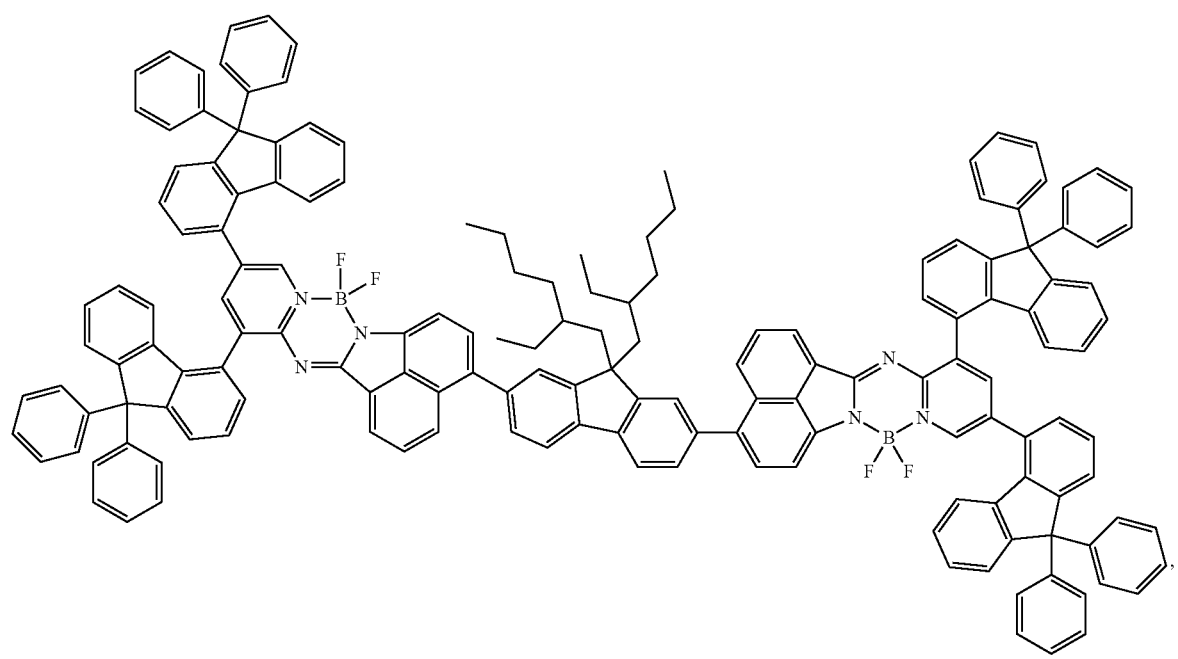

-continued
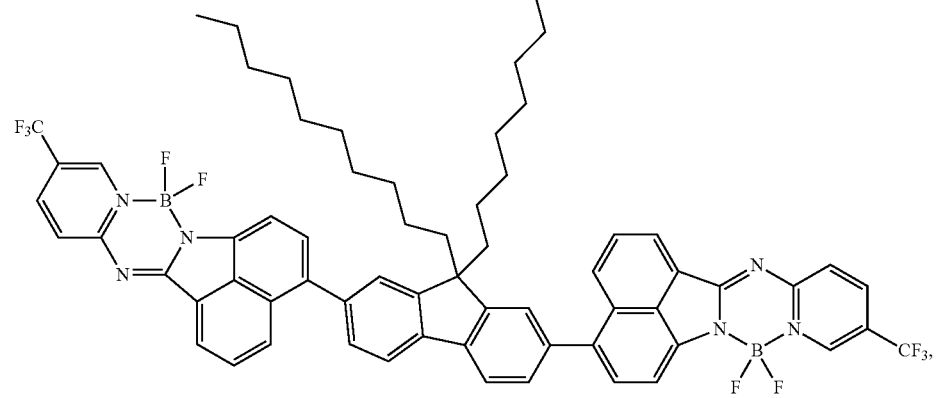
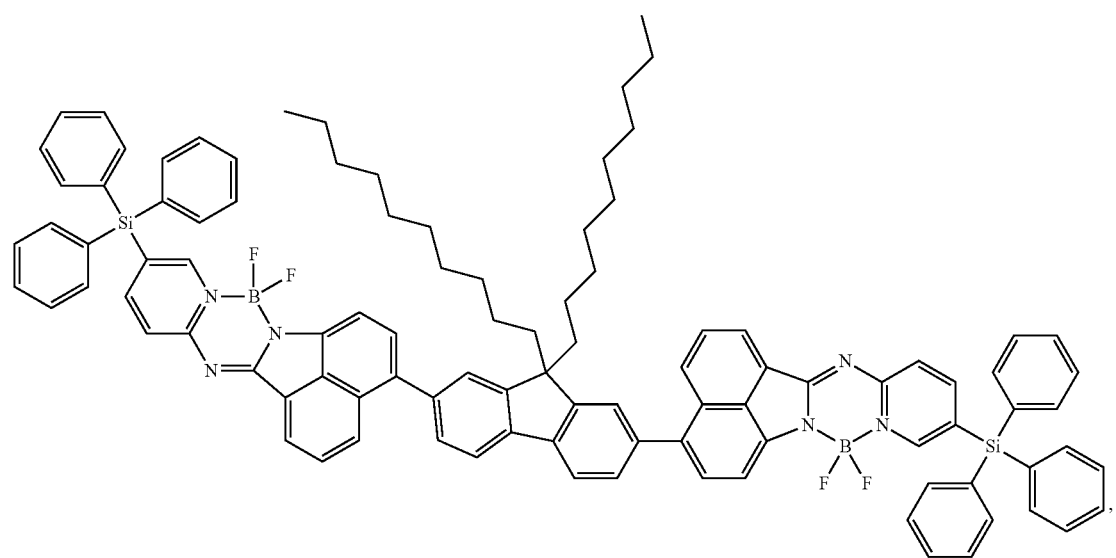
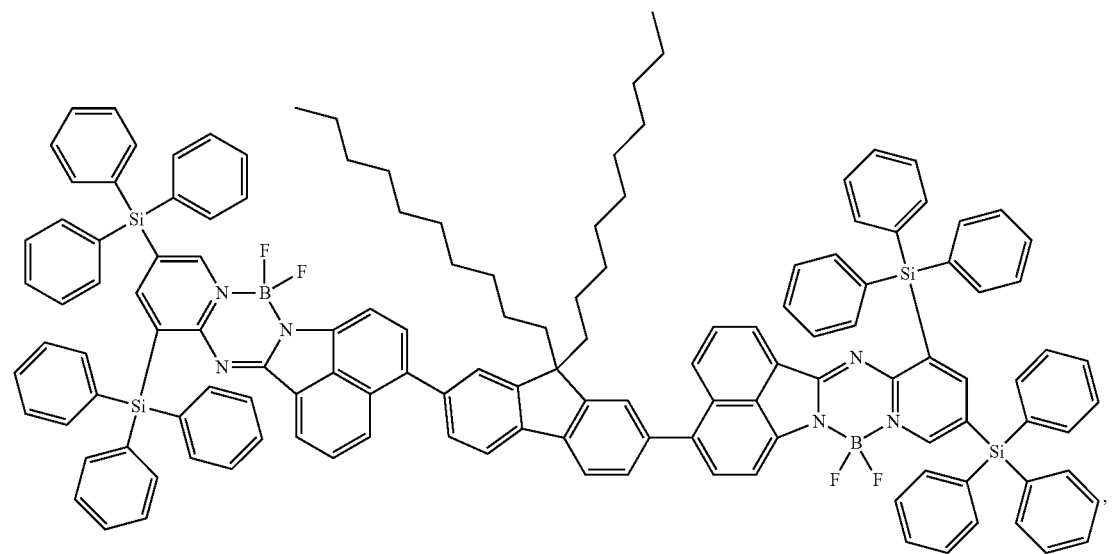

-continued
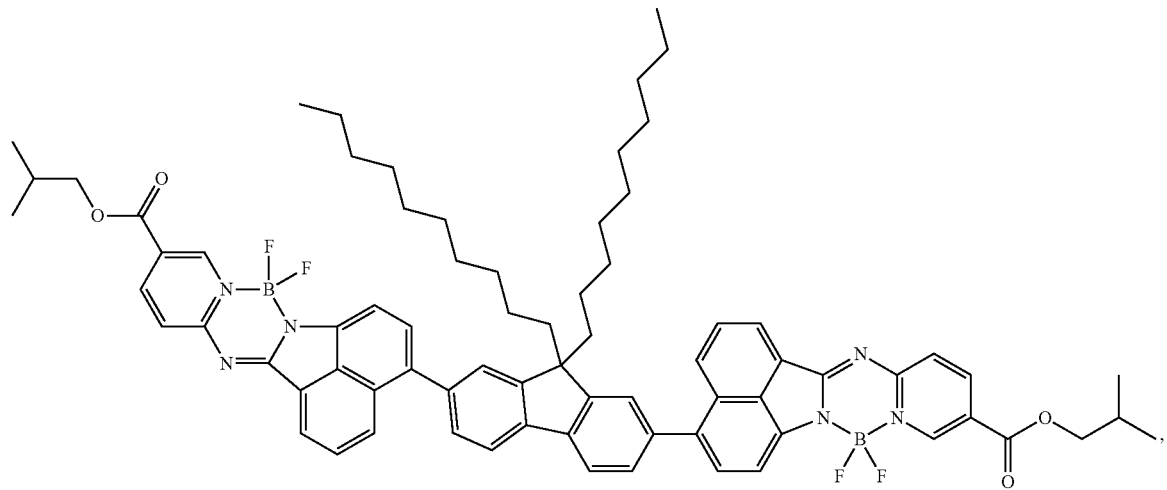
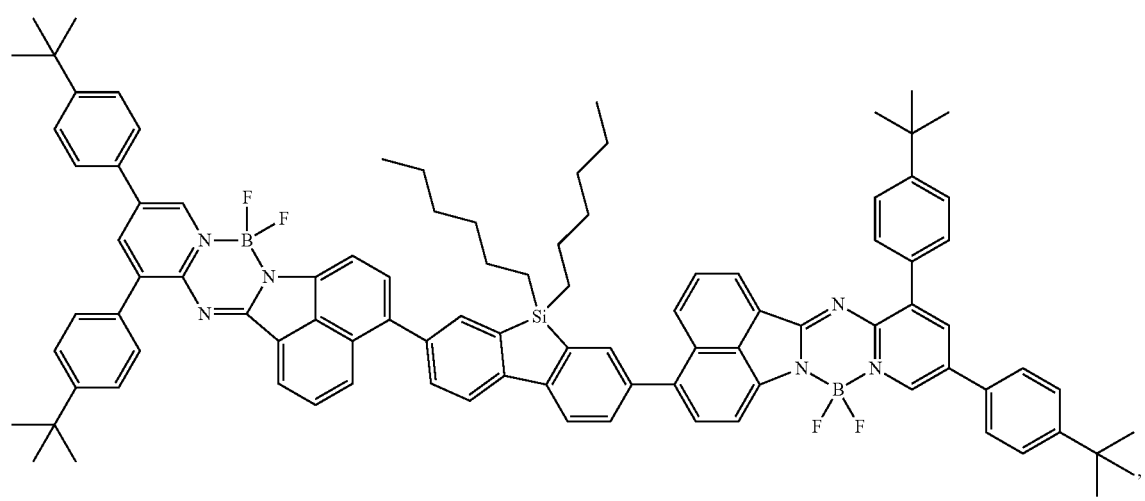
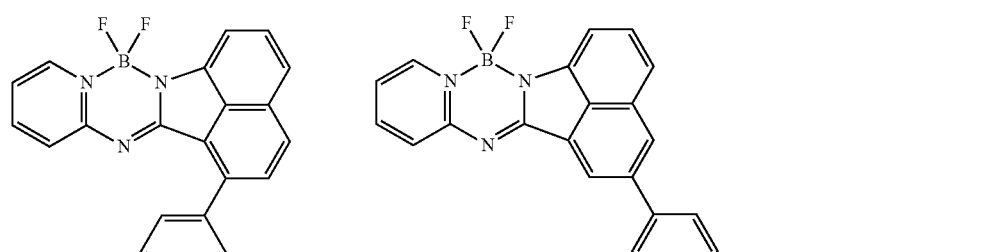
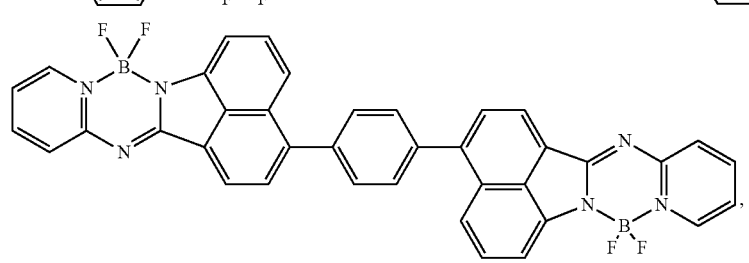

-continued
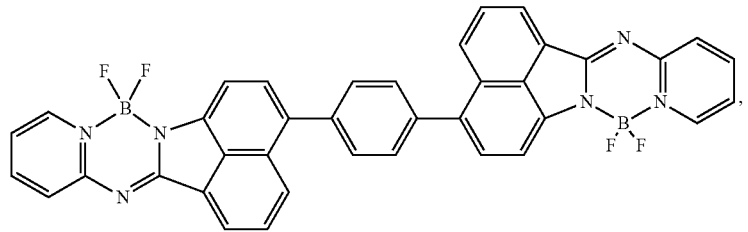
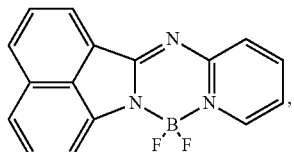
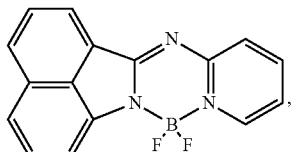
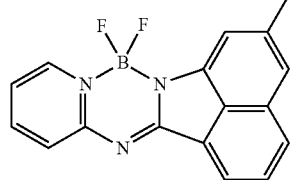
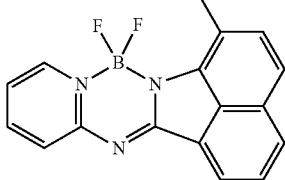
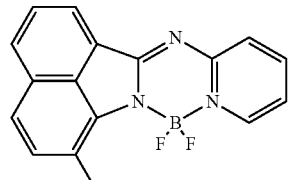
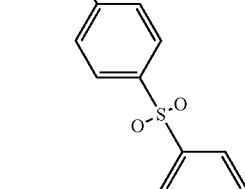
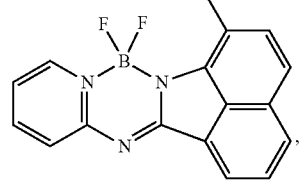
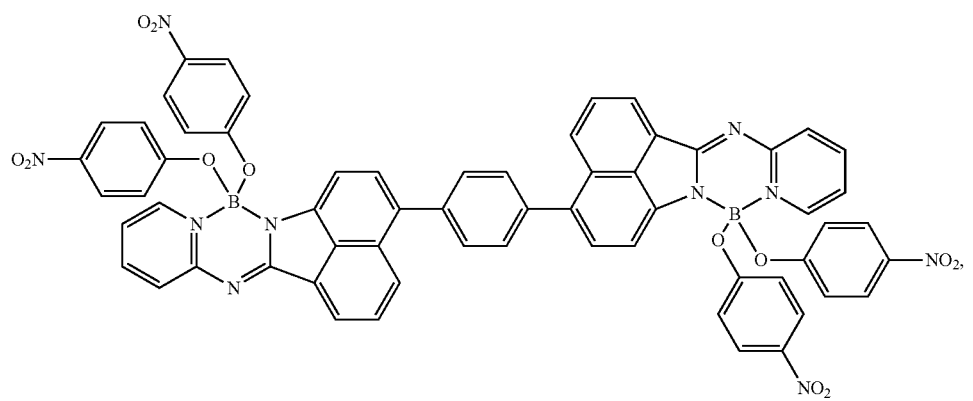

-continued
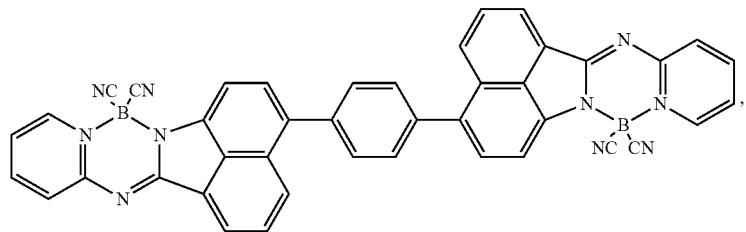
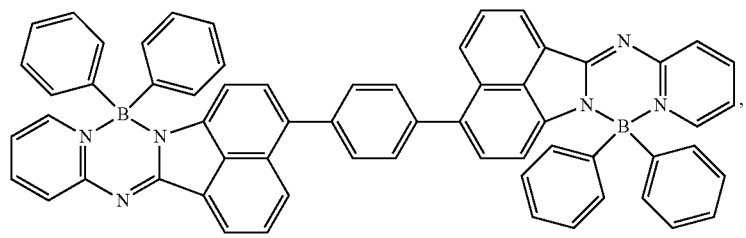
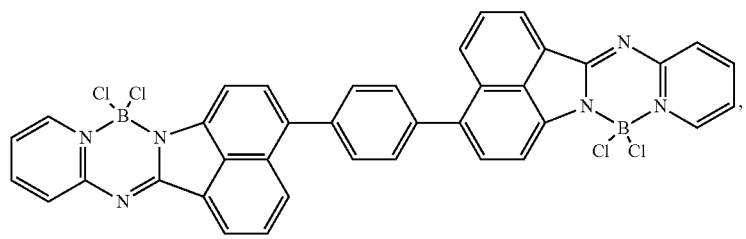
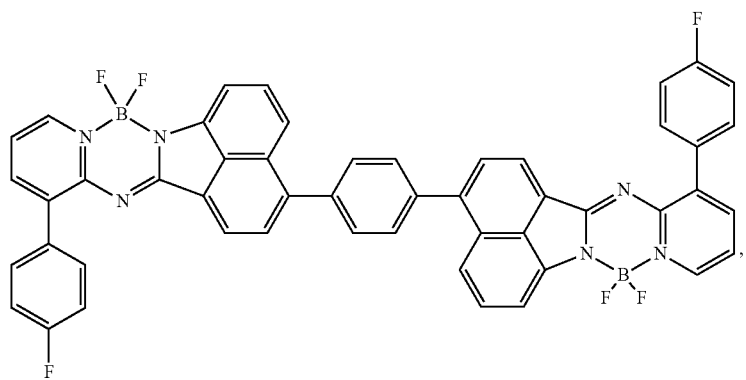
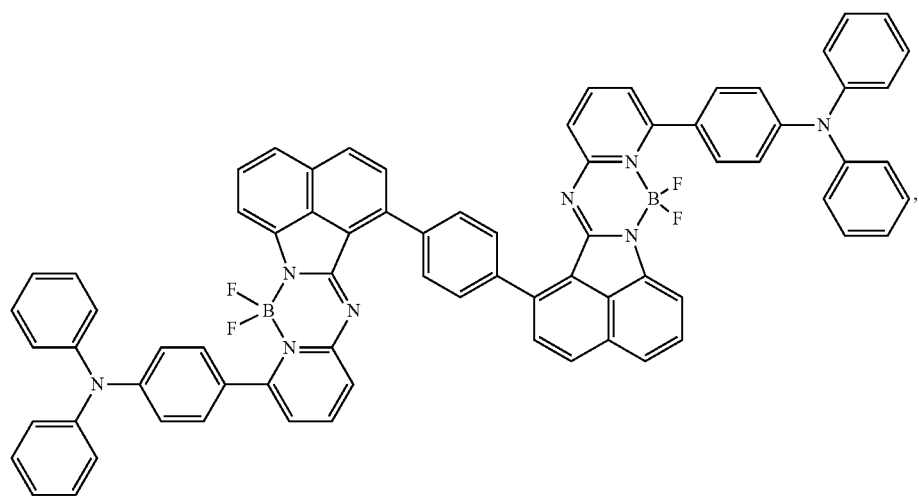

-continued
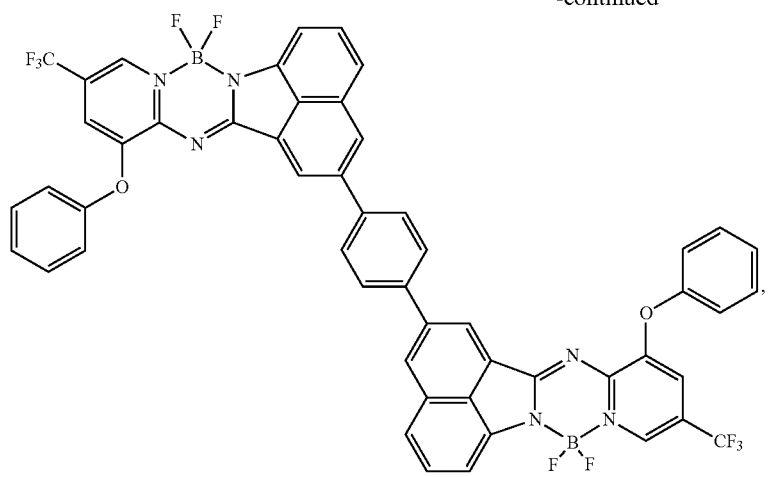
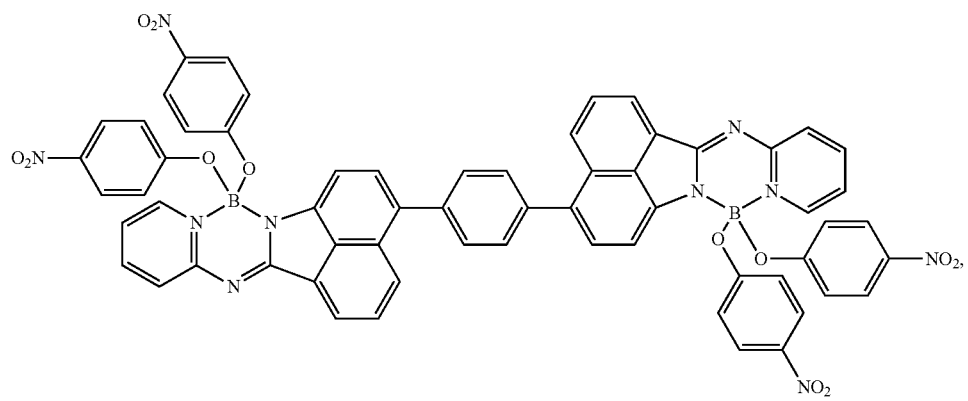
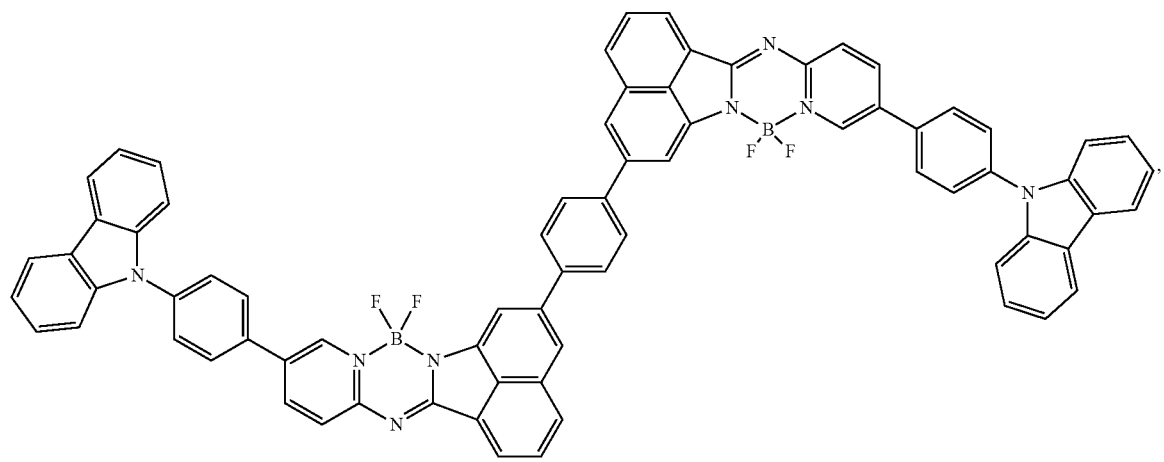
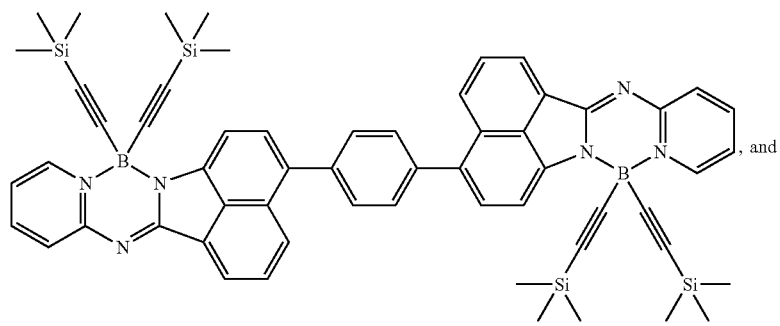
, and

-continued
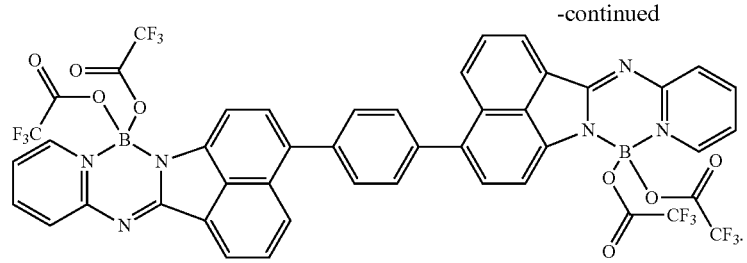
7. A color conversion film comprising:
a resin matrix; and
the compound represented by Chemical Formula 1 according to claim 1, which is dispersed in the resin matrix.
8. A backlight unit comprising the color conversion film according to claim 7.
9. A display device comprising the backlight unit according to claim 8.
* * * * *